United States Patent [19]
Hancock

[11] Patent Number: 6,155,836
[45] Date of Patent: Dec. 5, 2000

[54] SYSTEM FOR TEACHING MATHEMATICS

[76] Inventor: Tapp Hancock, 8000 Kroll Way #2, Bakersfield, Calif. 93311

[21] Appl. No.: 09/241,094

[22] Filed: Feb. 1, 1999

[51] Int. Cl.[7] .............................. G09B 19/02; G09B 23/02
[52] U.S. Cl. .......................... 434/188; 434/191; 434/209; 434/259; 446/901; 2/159; 2/160
[58] Field of Search ..................................... 434/188, 156, 434/159, 167, 170, 191, 207, 209, 395, 433, 233, 259; 446/26, 901; 2/158, 159, 160, 163

[56] References Cited

U.S. PATENT DOCUMENTS

| | | | |
|---|---|---|---|
| 4,519,781 | 5/1985 | Boyd | 434/156 |
| 4,583,952 | 4/1986 | De La Paz Rios | 434/191 |
| 5,486,112 | 1/1996 | Troudet et al. | 434/250 |
| 5,571,020 | 11/1996 | Troudet | 434/233 |

FOREIGN PATENT DOCUMENTS

| | | |
|---|---|---|
| 295723 | 5/1929 | United Kingdom . |
| 2209234 | 4/1989 | United Kingdom . |

*Primary Examiner*—Jacob K. Ackun
*Assistant Examiner*—Bena B. Miller

*Attorney, Agent, or Firm*—Richard C. Litman

[57] ABSTRACT

A system for teaching mathematics to beginning students includes a series of gloves and/or finger puppets, with the digits representing non-sequential number series (e.g., two, four, six, etc.). Students are taught to count various non-sequential number series using visual and tactile senses by using the gloves and/or finger puppets and associated hand patterns, with further audible reinforcement being provided by stories corresponding to each of the non-sequential series. Various caricatures corresponding to the plots of the stories may be used as further mnemonic aids for students in remembering the procedures and operations taught, with additional caricatures being provided for two and three place (i.e., tens and hundreds) digits for removable installation on the glove or finger puppet digits. Once the non-sequential series are learned, students are taught to multiply, divide, solve fraction problems, and factor numbers using the corresponding factor (e.g., two, for the two, four, six, etc. sequence). As a student advances, the gloves and/or finger puppets may be removed, with the student continuing to solve various mathematical problems in accordance with the hand patterns initially learned.

20 Claims, 40 Drawing Sheets

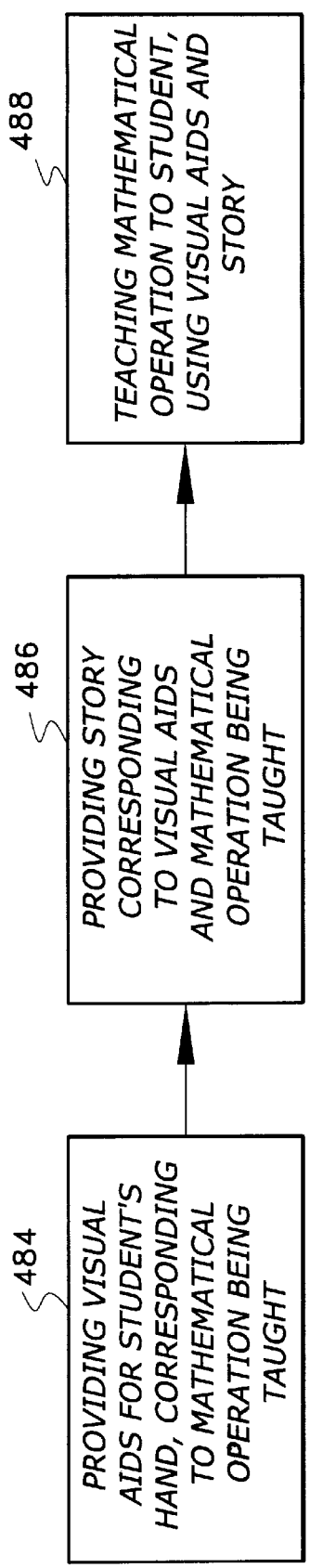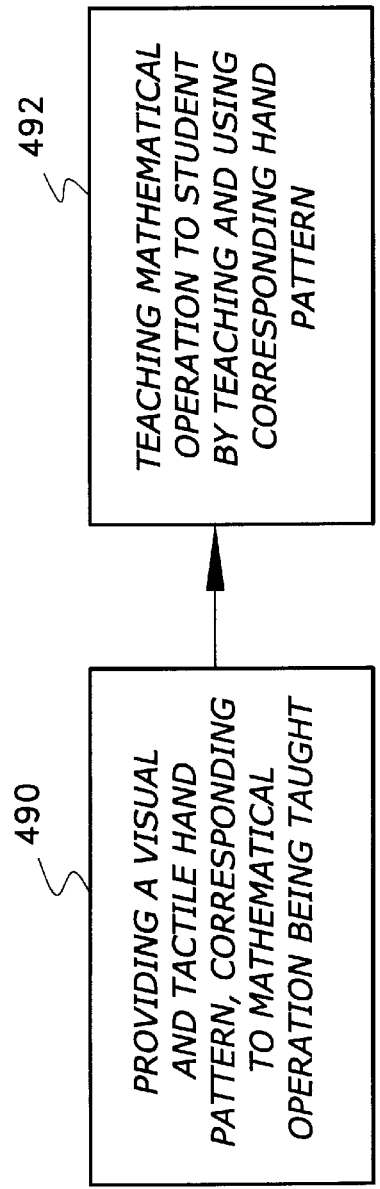

SYSTEM FOR TEACHING MATHEMATICS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to teaching and instructional methods and apparatus, and more specifically to a system for teaching basic mathematics to beginning mathematics students by using their hands and fingers as mnemonic aids. The present system incorporates mnemonic methods for assisting students in remembering specific mathematical procedures and relationships, as well as apparatus (gloves, finger puppets, etc.) for assisting students in learning the mathematical methods and procedures.

2. Description of the Related Art

Mathematics, beginning with basic numbers and arithmetic, is not necessarily an intuitively obvious process, particularly when advancing past basic addition and subtraction. While many students are able to grasp quickly the operational concepts involved, many others are left behind and have a great deal of trouble following the logic and procedures involved. Accordingly, many methods and devices have been developed in the past in attempts to facilitate the teaching of mathematics, particularly basic arithmetic and fractional skills. These systems and methods of the prior art have generally not received widespread popularity for various reasons.

Therefore, a need exists for a system for teaching mathematics which incorporates a method using various mnemonic and educational devices to involve the visual, auditory, and kinesthetic senses of the student. The present system is quite effective, as it has long been recognized that the reception of information using all of the available senses, results in superior retention of the information received. The present system basically involves a two step process, with the first step generally comprising the use of the present system to teach students different hand patterns for counting by various factors (e.g., by threes—3, 6, 9, 12, etc.) and a second step comprising using the learned hand patterns in multiplying, dividing, and working fractional problems and prime factors.

A discussion of the related art of which the present inventor is aware, and its differences and distinctions from the present invention, is provided below.

U.S. Pat. No. 4,519,781 issued on May 28, 1985 to Jeanette D. Boyd, titled "Teaching Tool," describes various glove embodiments to which various tags or the like may be removably applied. The tags comprise words, letters, numbers, and symbols for teaching very early learners very basic concepts, such as the basic numerical order from one to ten. Boyd is silent regarding any method of teaching hand patterns using a glove as a mnemonic device, or of teaching more advanced number concepts and mathematical operations, as provided by the present invention.

U.S. Pat. No. 4,583,952 issued on Apr. 22, 1986 to Evelyn De La Paz Rios, titled "Method For Teaching Multiplication And Division With Numbers 6 Through 9," describes such a method using only the two hands, with no additional apparatus being used. The De La Paz Rios system works when a student knows his or her multiplication tables and can work division problems, but does nothing to teach the student the various numerical relationships required of such operations. For example, De La Paz Rios provides an example in multiplying six times seven, but requires students to know that four times three equals twelve, which is added to thirty to arrive at the correct answer. In contrast, the present system provides students with a method of multiplying four times three, six times seven, etc. without specific knowledge of multiplication tables, and also enables students to perform division and factoring problems as well, none of which is taught by De La Paz Rios.

U.S. Pat. No. 5,486,112 issued on Jan. 23, 1996 to Farideh Troudet et al., titled "Autonomous Wearable Computing Device And Method Of Artistic Expression Using Same," describes gloves having letters, numbers, and/or symbols on each finger, corresponding to the letter or number on a conventional keyboard which would be struck by that finger by a touch typist. The Troudet et al. gloves and method provide for learning touch typing or keyboard work by a student. While Troudet et al. disclose gloves which show mathematical operations on their fingers, they do not disclose any means of teaching or showing a student how to perform basic mathematical operations using the glove or fingers.

U.S. Pat. No. 5,571,020 issued on Nov. 5, 1996 to Farideh Troudet, titled "Education Device For Assisting In The Learning Of Keyboarding," describes a series of gloves, finger puppets, and/or rings quite similar to the apparatus disclosed in the '112 U.S. Patent to the same inventor, discussed immediately above. Troudet in the '020 U.S. Patent cites the same example used in the Troudet et al. '112 U.S. Patent for showing mathematical operations, but again does not provide any means of teaching or showing a student how to perform basic mathematical operations using the glove or fingers. In contrast, the present invention provides a means of teaching beginning mathematics or arithmetic students how to count by various factors and how to multiply, divide, and work out factor problems, all by using various gloves and other numerical mnemonic aids as well as the fingers of both hands.

British Patent Publication No. 295,723 accepted on May 2, 1929 to Sara Heijmans, titled "Method Of Teaching Elementary Arithmetic And Apparatus To Be Used In Carrying Out Such Method," describes an artificial hand with hinged fingers for use in teaching counting and basic numbers. Heijmans does not disclose any numbering of the fingers, nor any means of teaching counting by various factors, multiplication, division, fractions, or factoring numbers, which each operation may be taught using the present system. Also, Heijmans does not disclose any form of audible reinforcement for her system, whereas the present invention may make use of stories to provide further enforcement of the operation being learned.

Finally, British Patent Publication No. 2,209,234 published on May 4, 1989 to Richard J. Croston, titled "Apparatus For Teaching Counting," describes a board having two hand-shaped devices thereon, with foldable fingers for counting from one to ten. An additional series of ten numbers, from ten to one hundred by tens, is provided along the upper portion of the board. The Croston apparatus provides only for teaching serial counting, with Croston making no disclosure of any means for using his apparatus for teaching multiplication, division, or fractions, as provided by the present inventive method and apparatus.

Moreover, Croston provides no mnemonic devices in the form of stories, finger puppets, etc. for assisting beginners in learning counting and basic arithmetic, as provided by the present system of teaching mathematics.

None of the above inventions and patents, either singly or in combination, is seen to describe the instant invention as claimed.

SUMMARY OF THE INVENTION

The present invention comprises a system for teaching mathematics, including gloves, finger puppets, and other devices serving as mnemonic aids for assisting students in learning counting by different numerical factors, multiplying, dividing, and working with fractions and factors. The present system also includes further mnemonic aids in the form of stories, which provide auditory reinforcement of the mathematical concepts being taught, with the gloves, puppets, etc. providing visual and tactile reinforcement of the concepts.

A series of gloves or finger puppets is provided for each non-sequential numerical series from two through nineteen (excepting seven, ten, and seventeen), e.g., 4, 8, 12, 16, etc. The gloves or puppets may also include removably attachable place digits for numbers over nine or 99, according to the specific series selected. After the present system is used to teach the counting of a non-sequential numerical series, the present system may be used to teach the student multiplication, division, work with fractions, and factoring numbers, particularly using the factor of the specific non-sequential number series represented by a specific glove or finger puppet set (e.g., multiplication or division by six, for the numerical series 6, 12, 18, 24, etc.). More advanced students may forgo use of the gloves, puppets, and/or other aids, and work directly with their fingers after having learned the specific finger patterns as taught using the present system.

Accordingly, it is a principal object of the invention to provide an improved system for teaching mathematics comprising the teaching of hand patterns for counting non-sequential number series by different factors, e.g., two, four, six, eight, etc., using visual, tactile, and auditory reinforcement means.

It is another object of the invention to provide an improved system for teaching mathematics which visual and tactile reinforcement means comprise the use of gloves or finger puppets and the learning of specific hand patterns for counting.

It is a further object of the invention to provide an improved system for teaching mathematics which auditory reinforcement means comprises the use of stories specific to each non-sequential numerical series.

An additional object of the invention is to provide an improved system for teaching mathematics including the teaching of multiplication, division, working fractions, and factoring numbers, using factors corresponding to the factors of the non-sequential counting series taught by the present system.

Still another object of the invention is to provide an improved system for teaching mathematics, using the hand and finger patterns learned by means of the present gloves, finger puppets, and stories to perform numerical manipulation without the use of those devices once the patterns have been learned.

These and other objects of the present invention will become readily apparent upon further review of the following specification and drawings.

BRIEF DESCRIPTION OF THE DRAWINGS

FIG. 22 is a flow chart of the general steps involved in providing and using the apparatus of the present system for teaching mathematics.

FIG. 23 is a flow chart of the basic steps for teaching and using the hand patterns taught by the present system.

Similar reference characters denote corresponding features consistently throughout the attached drawings.

DETAILED DESCRIPTION OF THE PREFERRED EMBODIMENTS

The present invention comprises a system for teaching mathematics to early arithmetic or mathematics students, and involves various visual, kinesthetic, and auditory means of reinforcing the knowledge being taught. A series of visual and tactile aids are applied to one or both hands of the student, and serve as guides or mnemonic devices to assist the student in remembering numerical patterns and relationships. Stories are also provided which provide auditory reinforcement of the concepts being taught.

The present system involves a two step process, with the first step comprising teaching a student how to count a non-sequential number series, e.g., 2, 4, 6, 8, etc., by teaching a hand pattern. (For the purposes of the present disclosure, the term "non-sequential" means a series of integers with one or more integers being omitted between each number of the series, and with each number of the series being evenly divisible by another integer used as a factor for the series, e.g., the number two, in the exemplary series noted above.) The second step comprises the application of the learned hand pattern with additional mathematical operations, to teach the student how to multiply, divide, solve fraction problems, and determine factors of larger numbers, using the corresponding numerical factor of the given non-sequential series.

Figure 1:
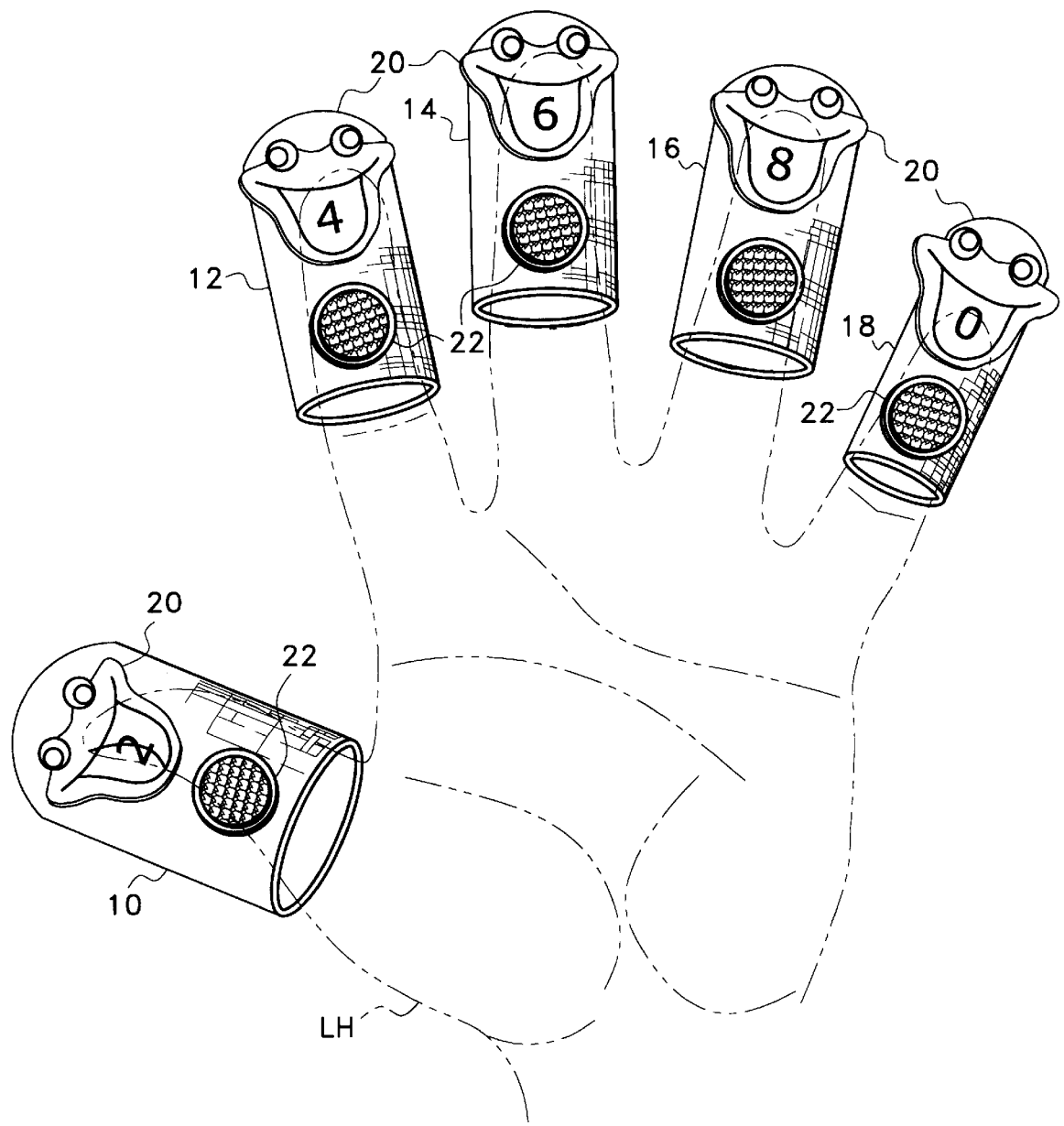
FIG. 1 is a perspective view of a series of finger puppets for teaching counting and numerical manipulation by a factor of two.

FIG. 1 illustrates a series of five visual and tactile aids used in the present system, with the devices comprising a series of finger puppets indicated by the respective reference characters 10, 12, 14, 16, and 18. Each of the finger puppets 10 through 18 is provided with a number of a non-sequential series, e.g., the number "2" for the first finger puppet 10 which is applied to the thumb of the left hand LH, "4" for the puppet 12 applied to the index finger, "6" for the puppet 14 applied to the second or longest finger of the hand, "8" for the puppet 16 of the third or ring finger of the hand, and "0" for the last puppet 18 applied to the last finger of the hand opposite the thumb.

Each of the finger puppets 10 through 18 may include a caricature of some sort with the number of that puppet or digit, to add some entertainment to the teaching process, and to correspond with a story which may be told to the student to provide additional reinforcement and add interest to the process. "Froggie face" caricatures 20 are used for the finger puppets 10 through 18 of FIG. 1, although it will be seen that any form or style of caricature or other device may be used as desired.

In addition, each of the finger puppets 10 through 18 is provided with some means for removably attaching additional numbers or articles thereto, such as the patches or pads of hook and loop fastener material 22 (e.g., Velcro™) applied to each of the puppets. Additional numbers for use in forming two digit (or higher) numbers are provided with conventional mating material for removable attachment to the pads 22, as described further below.

In teaching younger children the method of counting non-sequential numerical series, such as the series of FIG. 1 where the numbers are divisible by a factor of two, a story is of assistance in providing an auditory means of reinforcing the skill. Accordingly, the present inventor has developed a series of short stories, copyrighted by the inventor and incorporated herein by reference, which correspond to each of the non-sequential numerical series to which the present invention may be applied. An exemplary story (copyright 1988, Tapp Hancock) is provided immediately below:

TWO NOTES HIGHER

Once not so long ago, there lived an opera singer by the name of Lady Diva 10. Lady Diva 10 was a very rich and famous frog who sang in opera houses all over the world. She enjoyed traveling and being a big star until one day she woke up and decided she wanted more out of life. She wanted to settle down and have her own family.

It didn't take her long to meet her prince charming and when they KISSED "SMOOCH" the rest was "HIS . . . Story." Ten years later, Lady Diva 10 was happily married to her husband and they had five lovely children. Their names were 2, 4, 6, 8, and 0, because they were born two years after one another.

2, 4, 6, 8, and 0 dreamed of one day becoming a famous opera singer like their mom; so, everyday they would practice by trying to out-sing each other around the house.

Daughter 2 would sing, "2, 2, 2, 2." Then Daughter 4 would come along and say, "I can sing two notes higher than you can!" And she would sing "4, 4, 4, 4,." Then Daughter 6 would come along and say, "I can sing two notes higher than you can!" And she would sing, "6, 6, 6, 6." Then Daughter 8 would come along and say, "I can sing two notes higher than you can!" And she would sing, "8, 8, 8, 8." But when Daughter 0 came along to sing, "0, 0, 0, 0" nothing came out. Well, Lady Diva 10 became very concerned. She couldn't understand why her other four daughters could sing so well and then Daughter 0 couldn't even hit a note. So she decided to help her Daughter 0 by giving her 10 of her own musical notes. Daughter 0 started singing, "10, 10, 10, 10." (because 10+0=10)

The sound rang out of her mouth so beautifully and Lady Diva 10 was so happy that all of her girls could finally sing on key.

But, right after she gave her Daughter 0, 10 notes, Daughters 2, 4, 6, and 8 became very jealous because they could not sing that high. They told Lady Diva 10 that she must love Daughter 0 more than she loved them because she didn't give all of them 10 musical notes. Well, Lady Diva was crushed because she loved all of her girls the same way; so she said, "Okay since I gave Daughter 0, 10 musical notes I will give each one of you the same 10 musical notes too." This made Daughter 2 sing "12, 12, 12, 12." (because 10+2=12). Daughter 4 sang, "14, 14, 14, 14" (because 10+4=14). Daughter 6 sang, "16, 16, 16, 16" (because 10+6=16). Daughter 8 sang, "18, 18, 18, 18" (because 10+8=18).

But when Daughter 0 opened her mouth again nothing came out. She had worn off her 10 musical notes. Well, Lady Diva 10 jumped in and said, "Okay, I can help you. The next 10 is 20 so I will give you 20 musical notes." Daughter 0 started singing, "20, 20, 20, 20." (because 20+0=20) Well, when this happened, once again the other four girls became very jealous. All of them had worn off their 10 musical notes and told their mom that they wanted 20 notes as well. Lady Diva 10 said, "Okay, I will give all four of you the same 20 musical notes." Daughter 2 started singing, "22, 22, 22, 22." (20+2=22) Daughter 4 started singing, "24, 24, 24, 24." (20+4=24) Daughter 6 started singing, "26, 26, 26, 26." (20+6=26) And Daughter 8 started singing, "28, 28, 28, 28." (20+8=28).

Then when Daughter 0 came along, once again she had worn off her 20 musical notes and couldn't sing anything. Lady Diva said, "Okay, I can give you 10 more musical notes so after 20 comes 30." Daughter 0 started singing, "30, 30, 30, 30." (30+2=32).

Now this story and number pattern can go on forever because of Lady Diva 10's love for her children. Every time she gave Daughter 0, 10 musical notes, she would give her other four daughters the same 10 notes. As these girls continued to grow up, they continued to sing higher and higher and they all became famous opera singers . . . just like their mom.

THE END

The above story serves as an auditory memory aid to describe not only the progression of counting by twos, but also provides some interest to small children just beginning to learn numbers and basic numerical operations. The present inventor has developed further stories for each of the non-sequential numerical series from two to nine (excluding seven). Additional stories may be developed for other non-sequential numerical series, and/or other stories may be developed in addition to those already developed. However, the principle remains the same, with the provision of a story to young students providing another means of reinforcing the mathematical concepts involved, in addition to the visual and tactile means used with the finger puppet visual and tactile aids.

Figure 2A:
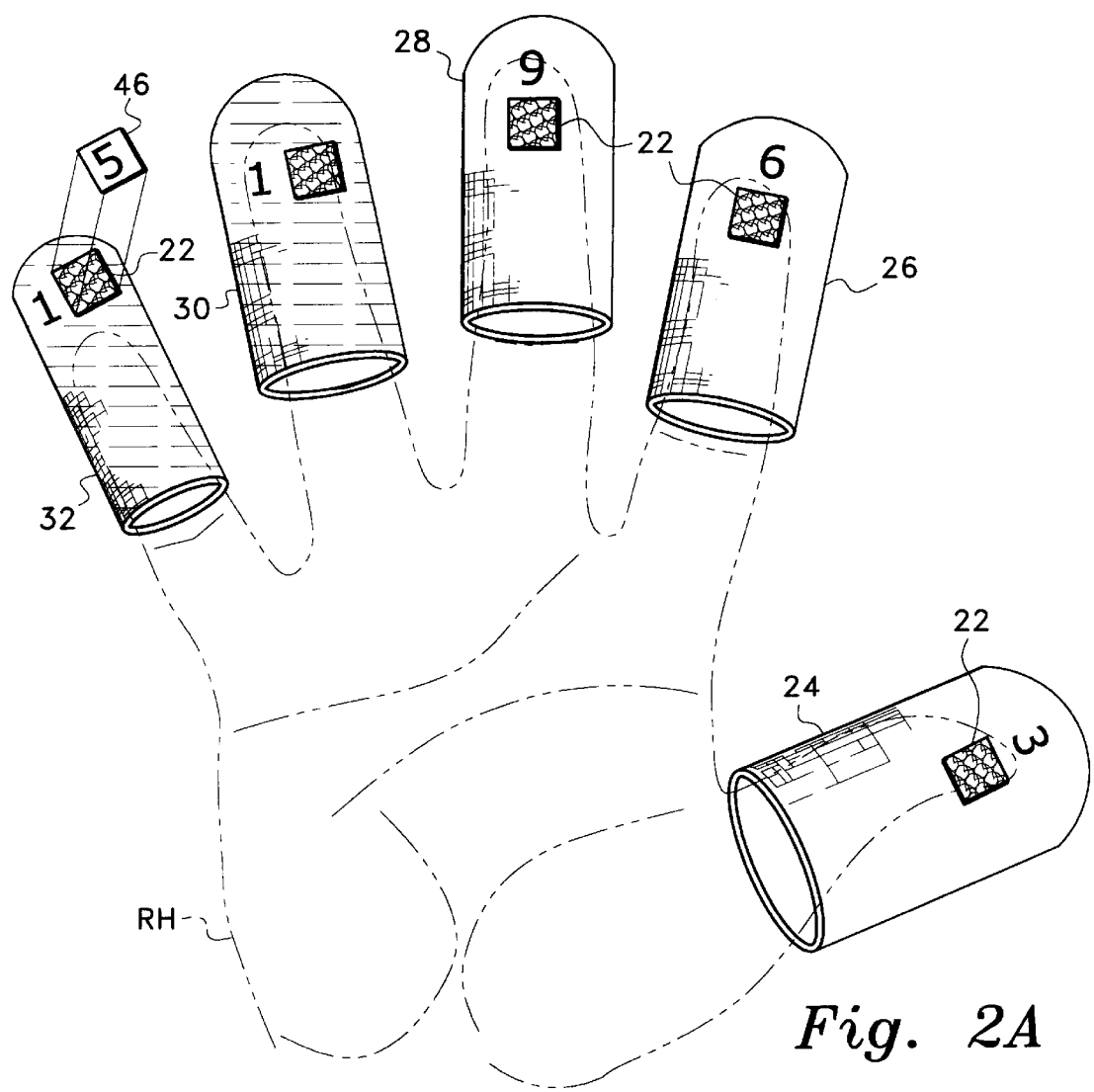
FIGS. 2A and 2B are perspective views of another series of finger puppets for teaching counting and numerical manipulation by a factor of three, with digits representing numbers below ten, from ten to nineteen, and twenty and above being colored or marked differently from one another.

FIG. 2A provides a perspective view of a series of five finger puppets, respectively 24, 26, 28, 30, and 32, for counting and working with a non-sequential numerical series with three as the numerical factor (i.e., 3, 6, 9, 12, etc.). However, it should be noted that the finger puppets 24 through 32 are disposed from right to left in FIG. 2A, upon a right hand RH, as opposed to the display on the left hand LH of FIG. 1. (The palm of the left hand LH and right hand RH are facing the viewer, in each of the drawing Figures.) It will be seen that the hand used, and the direction of increase of the numbers, is not critical to the present invention, and that the finger puppets may be applied to either hand, as desired. Normally, the left hand would be used in the case of a right handed student, with the right hand being used as a visual indicator of the count or other mathematical operation.

Figure 2C:
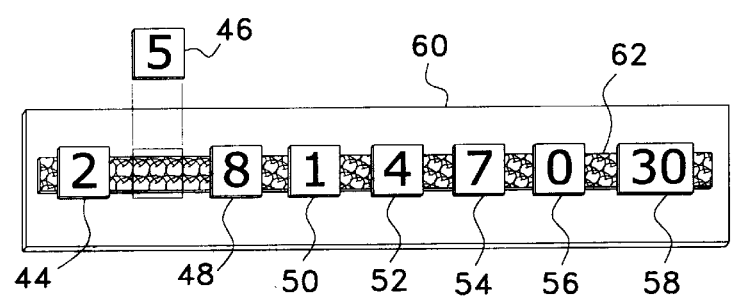
FIG. 2C is a top plan view of a board for holding single digit numbers, and one two digit number, for removable attachment to the finger puppets of FIGS. 2A and 2B.
Figure 2B:
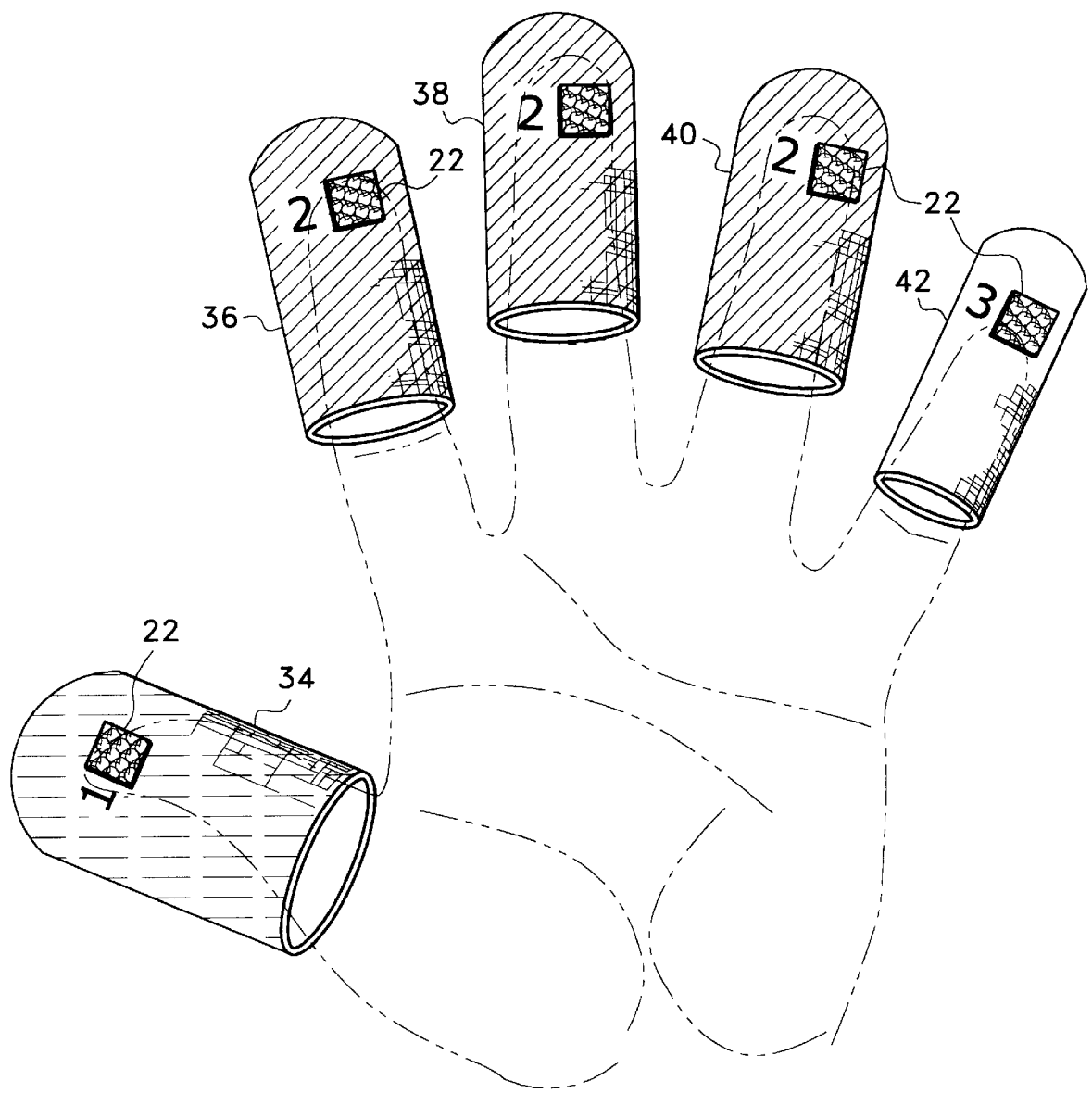

FIG. 2B provides a view of a left hand LH with a continuing series of finger puppets, respectively 34 through 42 disposed upon the fingers and thumb of the hand, as in the other drawing Figures discussed to this point. The ten finger puppets 24 through 42 of FIGS. 2A and 2B represent the first ten numbers of a non-sequential series using three as the numerical factor of the series, i.e., 3, 6, 9, 12, 15, etc.

It will be noted that the first three digits of the series shown in FIG. 2A, beginning with the thumb puppet or sleeve 24 through the second finger puppet or sleeve 28, have only single digits thereon, i.e., 3, 6, and 9, the first three numbers of the numerical series. However, the next three digits comprising puppets 30 and 32 (in FIG. 2A) and 34 (in FIG. 2B), are each preceded by a "1," signifying that the continuing addition of three to the next three numbers in the series beyond nine, comprises a two digit number in the teens (i.e., 12, 15, and 18). It should be noted that these three digits 30 through 34 are colored, shaded, or marked differently than the first three digits 24 through 28 of FIG. 2A, in order to alert the student of the addition of a second place digit to the numbers.

In a like manner, the next three digits or finger puppets 36 through 40 are shaded differently from the other devices 24 through 34, as the next three numbers in the series of FIGS. 2A and 2B are in the twenties, i.e., 21, 24, and 27. The different marking or color of the puppets 36 through 40 serve to indicate that these three puppets or digits belong in the next higher tens level.

Finally, the tenth puppet or digit 42, disposed upon the little or last finger of the left hand LH of FIG. 2E, extends the numerical series into the thirties, and is accordingly shaded, marked, or colored in the same manner as the first three puppets 24 through 28 of the right hand RH of FIG. 2A. It will be seen that this is a logical progression, as the counting by threes would continue at this point with 33, 36, 39, etc., on the puppets or digits of the right hand RH of FIG. 2A, and may continue indefinitely using the present system, as described specifically further below. Also, while no caricatures of any sort are shown on the finger puppets 24 through 42 of FIGS. 2A and 2C, it should be noted that such may be provided if desired, to correspond with characters of a story developed for teaching the system.

Each of the finger puppet tactile and visual aids 24 through 32 of FIG. 2A and 34 through 42 of FIG. 2B includes some means of temporarily and removably attaching an additional place number thereto, e.g., mating hook and loop fastener material 22, as used for the devices 10 through 18 of FIG. 1. (The square or round shape of the attachment patches in the various drawing Figures is not critical to the present invention.) These attachment points 22 each serve to hold temporarily in place a numerical place indicator, with such place indicators shown in FIG. 2C and designated as indicators 44 through 58. The numerical place indicators 44 through 58 may be stored upon a board 60 or the like, having mating hook and loop fastening material 62, or other suitable retention means, thereon.

The visual and tactile finger devices 24 through 42 of FIGS. 2A and 2B are used to teach the counting of a numerical series using three as the numerical factor of the series, i.e., 3, 6, 9, 12, etc. The first three digits or puppets 24 through 28 each have a consecutive single digit number in the non-sequential series, i.e., 3, 6, and 9, disposed thereon. The next three digits or puppets, i.e., the last two digits 30 and 32 of FIG. 2A and the first digit or puppet 34 of FIG. 2B, each include a "1" immediately in front of the hook and loop fastener material 22 of each respective digit. This signifies that the next numbers in the series are two digit numbers beginning with a "1". The corresponding single place numbers, i.e., 2, 5, and 8, are installed upon the corresponding hook and loop material 22 of the puppets 30 through 34, to create the two digit numbers 12, 15, and 18 comprising the fourth, fifth, and sixth numbers in the series.

FIG. 2C shows the "5" numerical place indicator 46 being removed from the board 60, with FIG. 2A showing that indicator 46 being installed upon the fifth finger device 32, to create the fifth number "15" in the series. Other numbers in the series, i.e., 18, 21, 24, 27, and 30, are formed in a similar manner, by installing the appropriate numerical place indicator 48 through 58 in place upon the corresponding finger puppet or digit 34 through 42, shown in FIG. 2B. As noted further above, a story may accompany the exercise, in order to provide a greater variety of stimulus to the student.

Figure 3A:
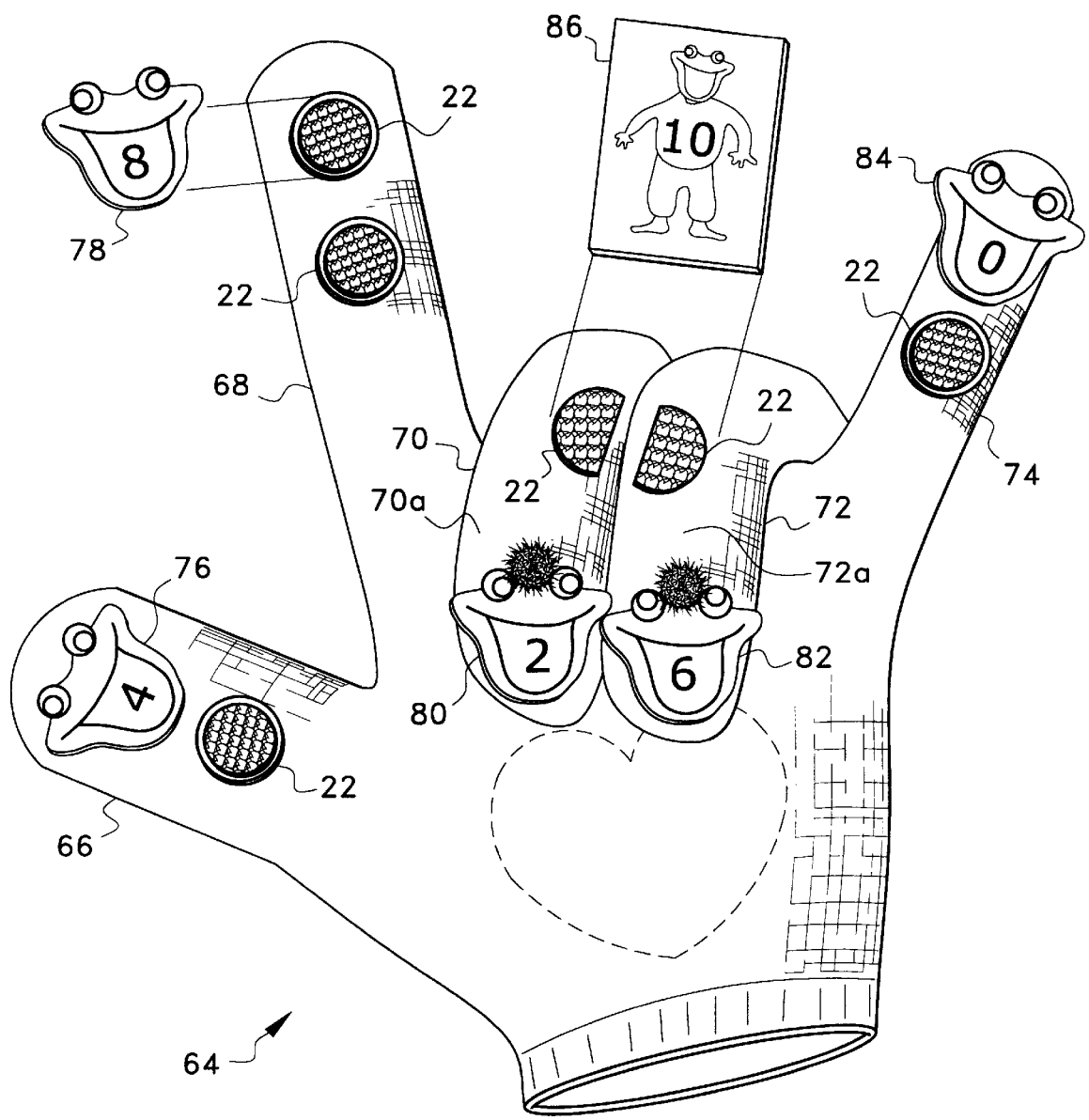
FIG. 3A is a perspective view of a left hand glove palm for teaching counting and numerical manipulation by a factor of four, and showing the hand pattern used.
Figure 3B:
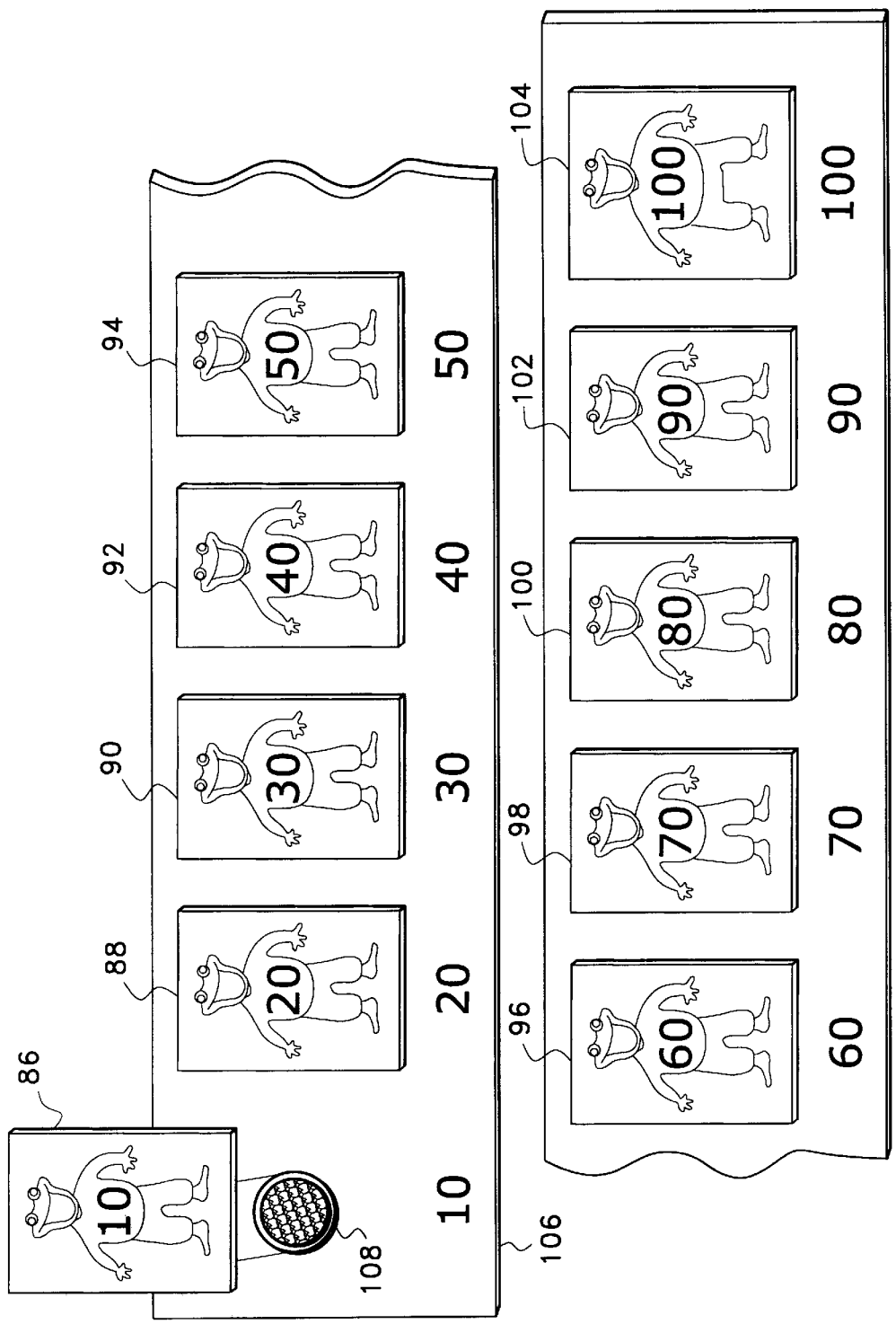
FIG. 3B is a top plan view of a board for holding two digit numbers for removable attachment to the glove of FIG. 3A.

FIG. 3A illustrates a visual and tactile device comprising a left glove 64 for teaching counting and mathematical operations using a factor of four, with FIG. 3B providing a view of a series of numerical place indicators which may be used with the glove 64. The left glove 64 (a mirror image right glove could be used, if desired) includes first through fifth finger enclosures (including the thumb), respectively 66 through 74, with each having (or being capable of receiving) a different number or numerical indicator thereon. It should be noted that when counting by fours, the fifth number (20) is divisible by ten, thus allowing the sequence to begin again using the same hand, as in the "Two Notes Higher" story and sequence described further above for counting by twos. Thus, only a single glove 64 (or series of five finger puppets) is required in order to count indefinitely using a factor of four.

Each of the fingers 66 through 74 includes a numbered caricature, respectively 76 through 84, thereon. (While the caricatures 76 through 84 are shown to be removably attached using hook and loop fastening means 22, they may be permanently installed upon the corresponding fingers 68 through 76 of the glove 64, if so desired.) It will be noted that the second and third digits or fingers 70 and 72 are in the teens, comprising the numbers 12 and 16 when counting by a factor of four. Accordingly, the numerical caricatures 80 and 82 are secured to the back surfaces, respectively 70a and 72a, of these two fingers.

Thus, when the two middle fingers 70 and 72 are folded forward with all other digits extended, to form a "love" sign in American Sign Language, the two central fingers 70 and 72 display their respective caricatures 80 and 82 in the same orientation as those of the extended fingers 68 and 74. This provides an excellent mnemonic aid for the student to remember that the two central fingers have a common property, i.e., that they are both "teen" numbers, comprising a two digit number beginning with a one, when using the glove 64 for counting by fours.

As in the case of the finger puppets described further above (which could also be formed as gloves, if so desired), a series of first through tenth place indicators, respectively 86 through 104, and a board or holder 106 for the place holders, is also provided. The various place holders 86 through 104 respectively indicate multiples of ten ranging from ten through one hundred; more or fewer such place holders may be provided as desired. Each of the place holders 86 through 104 may include a caricature thereon ("froggies," etc.) which relates to a story specific to the numerical operation being taught, as in the case of the finger puppets discussed further above. The place holders 86 through 104 are removably secured in place on the board 106 by means of mating hook and loop fastening material 108, or other suitable means, and are removably secured to the fingers of the glove 64 by additional areas of mating hook and loop material 22 or other suitable attachment means, as in the place holders and finger puppets described further above.

In FIG. 3C, the first place holder 86 is shown removed from its hook and loop attachment 108, with the first place holder 86 shown being applied to the adjacent attachment points 22 of the backs 70a and 72a of the two middle fingers 70 and 72. The hand pattern shown in FIG. 3A by the glove 64, in addition to an appropriate story serving as a mnemonic device, enable a student to learn counting a non-sequential series with a factor of four, i.e., counting by fours, quickly and easily. The first two digits (thumb 66 and index finger 68) of the glove 64 are extended, as the two numbers represented (four and eight) are both single digit numbers. However, the next two digits 70 and 72 are folded forward, to show the need for a different step to continue the process of counting by four. Here, ten must be added to the "2" of the second finger 70 to make twelve, and to the "6" of the third finger to make sixteen. This is done by removing the ten place marker 86 from its position on the board 106, as shown in FIG. 3B, and applying it to the two adjacent attach points 22 on the backs 70a and 72a of the second and third fingers 70 and 72 as shown in FIG. 3A.

The fourth finger 74 is extended with the "fours" hand pattern, to indicate the need for another step. As this is the fifth finger of the glove 64, and the fifth number when counting by fours is twenty, the second or "twenties" place holder 88 is removed from the board 106 and installed on the attach point 22 of the last finger 74. This finger 74 has a zero indicated thereon, with the twenty of the place holder 88 and zero of the last finger 74 adding to a total of twenty.

The above described process may be repeated as long as desired, with the twenties place holder 88 being transferred to the thumb 66 with its count of four to equal twenty four, thence to the index finger 68 to add to twenty eight. The thirties place holder 90 is then installed on the two adjacent attach points of the backs 70a and 72a of the two middle fingers 70 and 72, respectively adding to thirty two and thirty six, with the process continuing as desired. The story preferably relates to the subject of love in some manner, as the hand pattern of the two middle fingers folded forwardly with the thumb, index, and last fingers extended, represents the sign or symbol for "love" in American Sign Language, as noted further above. This provides a further mnemonic for learning and memorizing the counting process.

The present system may be used for other operations than counting, by appropriate procedure. For example, the "four" hand pattern of FIG. 3A may be used to multiply or divide any number, using four as the multiplier (for multiplication) or as the divisor (for division). To multiply any number by four, the student need only count the number of fingers in sequence (beginning with the thumb), and continue until reaching the number of the multiplicand. As an example of multiplication, seven times four may be quickly and easily multiplied once a student understands the process of counting by fours using the present system. A student would count to the seventh finger (starting over with the thumb after the initial five count, to reach the index finger for a second time) to arrive at twenty eight, as described above for the counting process.

Division is also accomplished quickly and easily using the present system for teaching mathematics. As an example of division, assume thirty six is to be divided by four, using the "fours" hand pattern of FIG. 3A. To divide thirty six by four, the student need only count by fours using the four pattern described above. Upon reaching the last or little finger 74 (with its count of twenty), the procedure continues by starting again at the thumb (twenty four) until arriving at the third or ring finger (finger 72 of FIG. 3A), with its count by fours of thirty six. The student ascertains that a total of nine fingers have been counted to arrive at this "four count pattern" of thirty six. Hence, the answer is nine. It will be seen that any practicable numbers may be multiplied and divided by four using the above described system and process, with the procedure being essentially the same for the two and three patterns described above, and for other higher number patterns described further below.

Fractions are also easily understood using the present system. It will be seen that the "four" hand pattern may be used to represent any practicable fraction which is equivalent to one fourth. The process is similar to that used for dividing, with the student counting by the factor of the hand pattern in use to arrive at the denominator of the fraction, and then counting each individual finger in consecutive sequence (by ones) until arriving at the denominator finger. This provides the numerator for the fraction.

As an example, assume that a student is to find an equivalent fraction to one fourth, in which the numerator is three. The student need only count three digits, using the "four" pattern, to arrive at the third or ring finger 72 of the glove 64, which has a value of twelve. Hence, the solution to the above problem is three twelfths is equal to one fourth.

The present system is applicable to determining the solution to other fractional problems, as well. For example, the "four" hand pattern may be used to find the quantity equal to one fourth of thirty two. The student need only count by fours until arriving at thirty two, using the system described further above. The student then counts sequentially by ones until arriving at the thirty two finger, to find that this is the eighth finger, or the second finger 70 of the glove 64 of FIG. 3A. Again, this system may be used for virtually any practicable fraction, by using the appropriate hand pattern (twos, threes, eights, nines, etc.).

In the event of a problem where the numerator is greater than one (e.g., three quarters of thirty two), the student may use the "three" hand pattern to count to the thirty second digit (repeating as required to arrive at the second finger of the hand after six repetitions), to arrive at a first step answer of ninety six. (For smaller numbers, the student may use a hand pattern representing that number, and count to the numerator finger, e.g., the third finger in this example.) The student then counts by fours, using the "four" hand pattern, until arriving at a count of ninety six, or the twenty fourth finger. Thus, the answer is twenty four.

Factors of numbers are also easily found using the present system. For example, to find the factors of the number twenty four, the student need only try different hand patterns to see if the number which is to be factored, comes up. In this case, using the "fours" hand pattern, one need only count to the sixth sequential finger to arrive at a count or value of twenty four. Thus, the student knows that six, and also the four of the "fours" hand pattern are both factors of the number twenty four. The process may continue, trying other hand patterns, to produce additional factors. The "twos" hand pattern will resolve the above factors into a three and three twos (2×2×2).

Figure 4A:
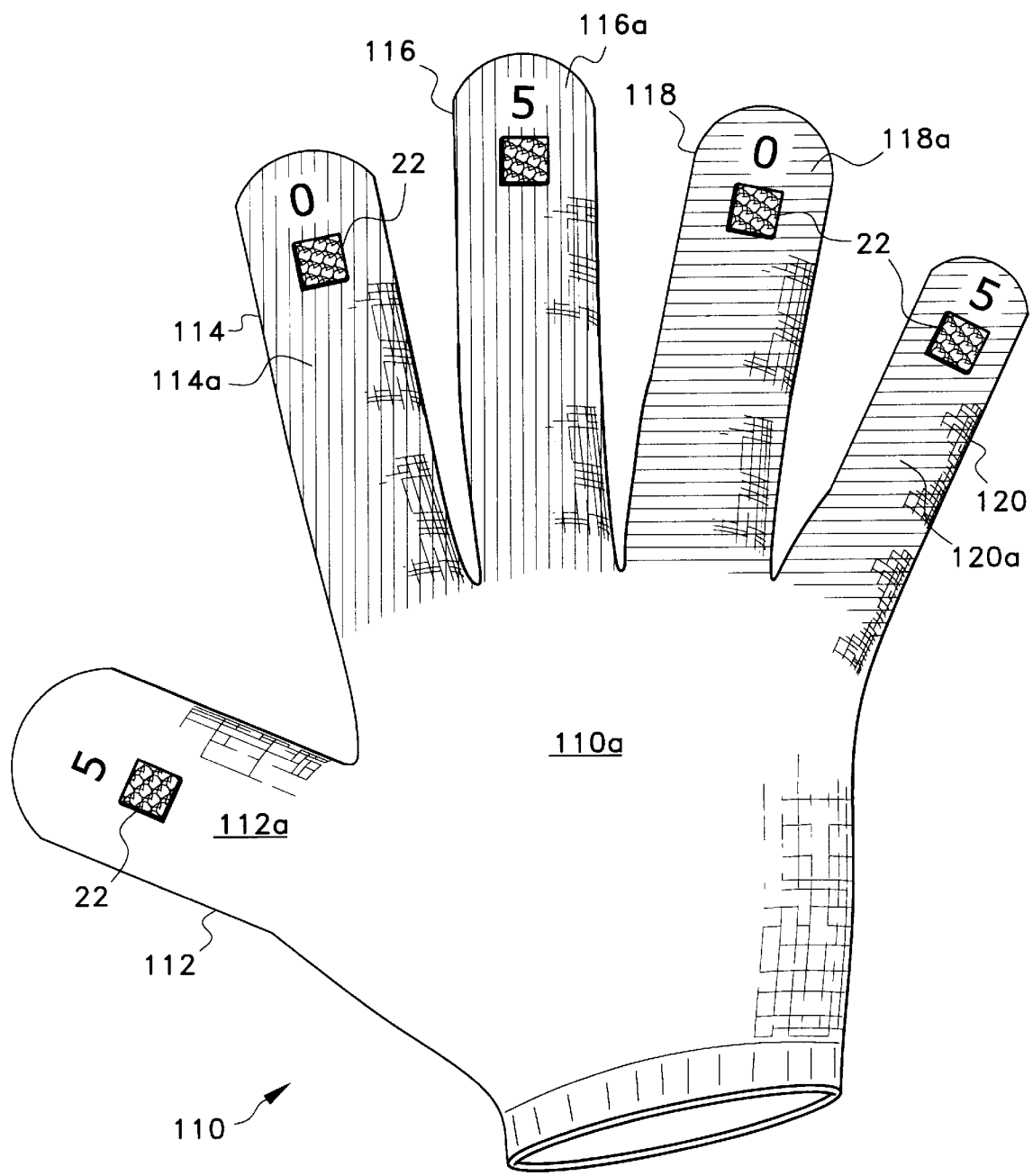
FIGS. 4A and 4B are perspective views respectively of the palm and back of a left hand glove for teaching counting and numerical manipulation by a factor of five, with digits representing numbers below ten, ten and fifteen, twenty and twenty five, thirty and thirty five, and forty and forty five being colored or marked differently from one another.
Figure 4B:
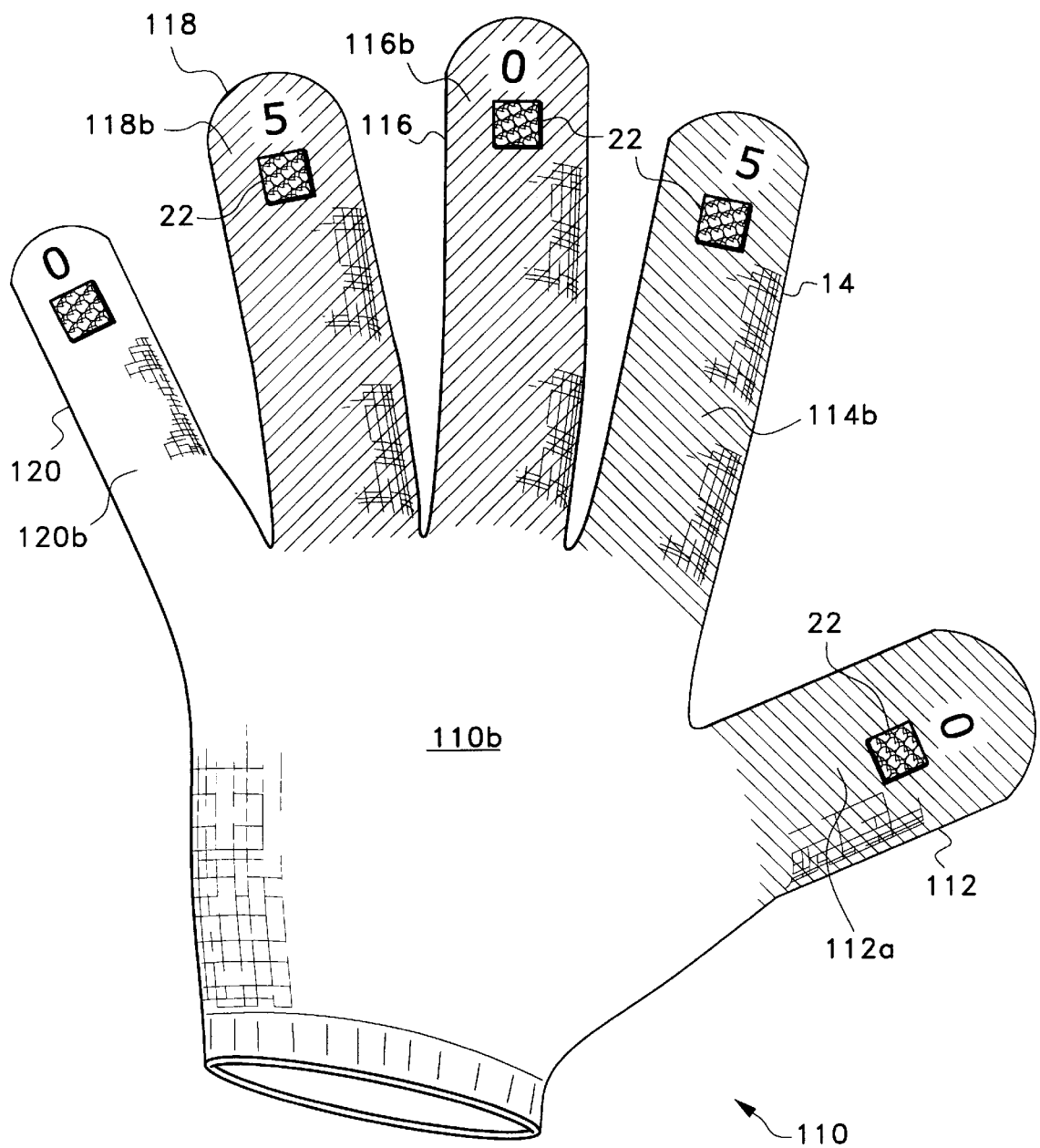

As noted further above, the present system is applicable to many different numbers, including most of the "teen" series, by using appropriate hand patterns and mnemonic aids. FIGS. 4A and 4B illustrate a "five" glove 110, with the palm side 110a of the right hand glove 110 being shown in FIG. 4A and the reverse back side 110b of the glove 110 illustrated in FIG. 4B. The five fingers 112 or digits through 120 (including the thumb) are respectively indicated from left to right, starting with the thumb 112 in FIG. 4A. As both sides 110a and 110b of the same glove 110 are used for the five pattern, each of the fingers or digits 112 through 120 has a side 112a through 120a shown in FIG. 4A and an opposite side 112b through 120b shown in FIG. 4B. Thus, a total of ten increments may be counted using the glove 110 of FIGS. 4A and 4B, by turning the hand over after the first five digits or increments have been counted.

It will be noted that different fingers or digits of the "five" glove 110 are colored, shaded, or marked differently from one another. This serves as a further reminder or memory aid for students when counting by fives using the five glove 110 of FIGS. 4A and 4B.

Counting by fives is accomplished by starting with the thumb digit 112 of the palm side 110a of the glove 110, and proceeding from left to right across the remaining digits. When advancing from the five of the thumb 112 to the ten of the index finger 114 (using sides 112a and 114a of the two digits), it will be noted that the tens digit index finger side 114a is colored or otherwise marked differently than the first side 112a of the thumb digit 112. This alerts the student that ten must be added to the first side 114a of the index finger 114, in order to have a total of ten at that position. (Position holders 86 through 104 of FIG. 3B, used with the "fours" glove 64 of FIG. 3A, may also be used with the "fives" glove 110 of FIGS. 4A and 4B.)

The second finger or digit 116 has its first side 116a colored or marked identically to the first side 114a of the first finger or digit 114. This indicates that the ten position holder or additive number carries over from the first finger 114, i.e., ten is added to the five of the first side 116a of the second finger 116 to obtain a total of fifteen, just as ten was added to the first side 114a of the first finger 114 to obtain a total of ten, since the first side 114a of the first finger 114 is marked with a zero.

The third or ring finger 118 has its first side 118a marked or colored with yet another color or marking, to indicate to the student that another ten (or a total of twenty) must be added to the zero of the ring finger first side 118a, to arrive at the next number in the series. The first side 120a of the last finger 120 is colored or shaded identically with the first side ring finger shading, to indicate that a total of twenty must be added to this digit to arrive at the next number in the series, i.e., twenty five.

At this point, the count is continued by turning the hand over, continuing the count from right to left beginning with the back side 112b of the thumb digit 112. Again, this surface 112b is marked or shaded differently than previously counted digits, as yet another ten (for a total of thirty) must be added to the zero of the second side 112b of the thumb 112 to arrive at the next number of thirty. The same markings are continued on the second side 114b of next (index finger) digit 114, as the thirty carries over to be added to the five of the 114b surface for a total of thirty five.

The above process continues in the same manner, with the differently marked or colored second sides 116b and 118b of the second and third digits 116 and 118, signify that forty must be added to these two positions to continue the count. Finally, the student arrives at the final position, i.e., the second side 120b of the last finger 120, which is marked with yet another different marking to indicate the need to add a total of fifty to this position 120b.

The above described pattern and method of counting by fives may also be used to multiply, divide, work fraction problems, and to factor numbers, using the methods described above in the discussion of these various mathematical operations using the "four" glove 64 of FIG. 3A. Also, it will be seen that the exemplary orientation and arrangement of the "five" glove 110 may be reversed, if desired, with the front and back surfaces 110a and 110b switched one for the other to provide a mirror image arrangement. Also, while a left glove 110 is illustrated, it will be seen that the present process may be just as easily applied to a right hand glove, if so desired. It should also be noted that while no caricatures were shown for the numbers of the "fives" glove 110, that such caricatures may be either temporarily or permanently installed upon the glove 110, if so desired, in order to provide greater reinforcement of the concepts by means of a related story.

Figure 5:
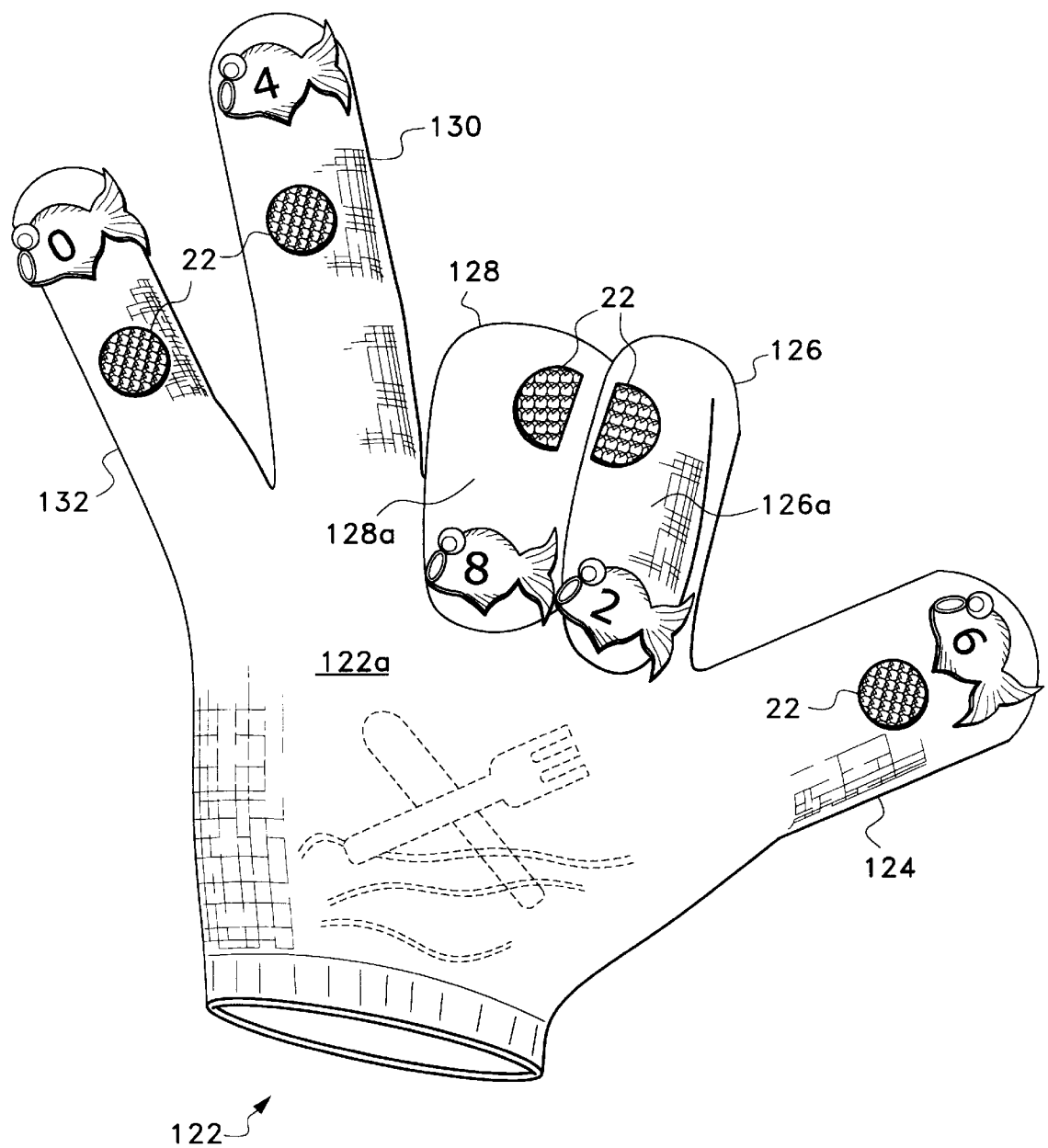
FIG. 5 is a perspective view of a right hand glove palm for teaching counting and numerical manipulation by a factor of six, and showing the hand pattern used.

FIG. 5 illustrates a "six" pattern glove 122. In the example of FIG. 5, the glove 122 shown is a right hand glove, with the palm side 122a facing the viewer of the drawing. The "six" pattern glove 122 permits all counting and other math operations as described further above to be performed using only the right hand (or the left hand, for a mirror image glove 122). The "six" pattern glove initiates its count using the thumb 124, progressing along the index finger 126, second finger 128, third or ring finger 130, and fourth or little finger 132. Each finger or digit represents an increment of six over the preceding digit.

The method used in teaching a non-sequential numerical series using six as the factor is similar (but not identical) to that used in teaching the counting of a series using four as the factor, i.e., counting by fours. As in the "four" glove 64, two of the fingers are folded to lie against the palm surface 122a of the glove 122. However, the index and second fingers 126 and 128 are folded with their respective upper or back surfaces 126a and 128a being visible from the palm side 122a of the glove 122, rather than the two middle fingers as in the case of the "fours" glove 64.

Counting using the "six" glove proceeds from right to left as viewed in FIG. 5, with the first or thumb digit 124 comprising only a single digit of six. The next two (folded down) digits 126 and 128 comprise two digit numbers, respectively twelve and eighteen, and accordingly are positioned to accept a "tens" place holder (as shown in the place holders 86 through 104 of FIG. 3B) across the adjacent hook and loop material 22 disposed upon the back surfaces 126a and 128a of the glove 122. The fourth or ring finger digit 130 represents the number twenty four, and accordingly accepts a "twenty" place holder, such as the place holder 88 of FIG. 3B. Finally, the last or little finger digit 132 represents the number thirty, and accordingly accepts a "thirty" place holder 90. As the five number series represented by the thumb 124 and four fingers 126 through 132 ends in a zero, it will be seen that the above described sequence may be repeated as desired, adding tens to each number as described above in order to arrive at the next number in the series.

As noted further above, the various numbers shown in each of the visual and tactile aids (finger puppets, gloves) may be in the form of various caricatures, such as "froggies," etc. In the "six" pattern glove 122 of FIG. 5, the caricatures represent fish, in keeping with a story developed by the present inventor for providing auditory reinforcement of the mathematical concepts taught by the present invention. However, it will be seen that virtually any caricatures or symbols, or none at all (as in the "fives" glove of FIGS. 4A and 4B), may be used with an appropriate story or mnemonic aid for carrying out the teaching methods of the present invention.

Figure 6:
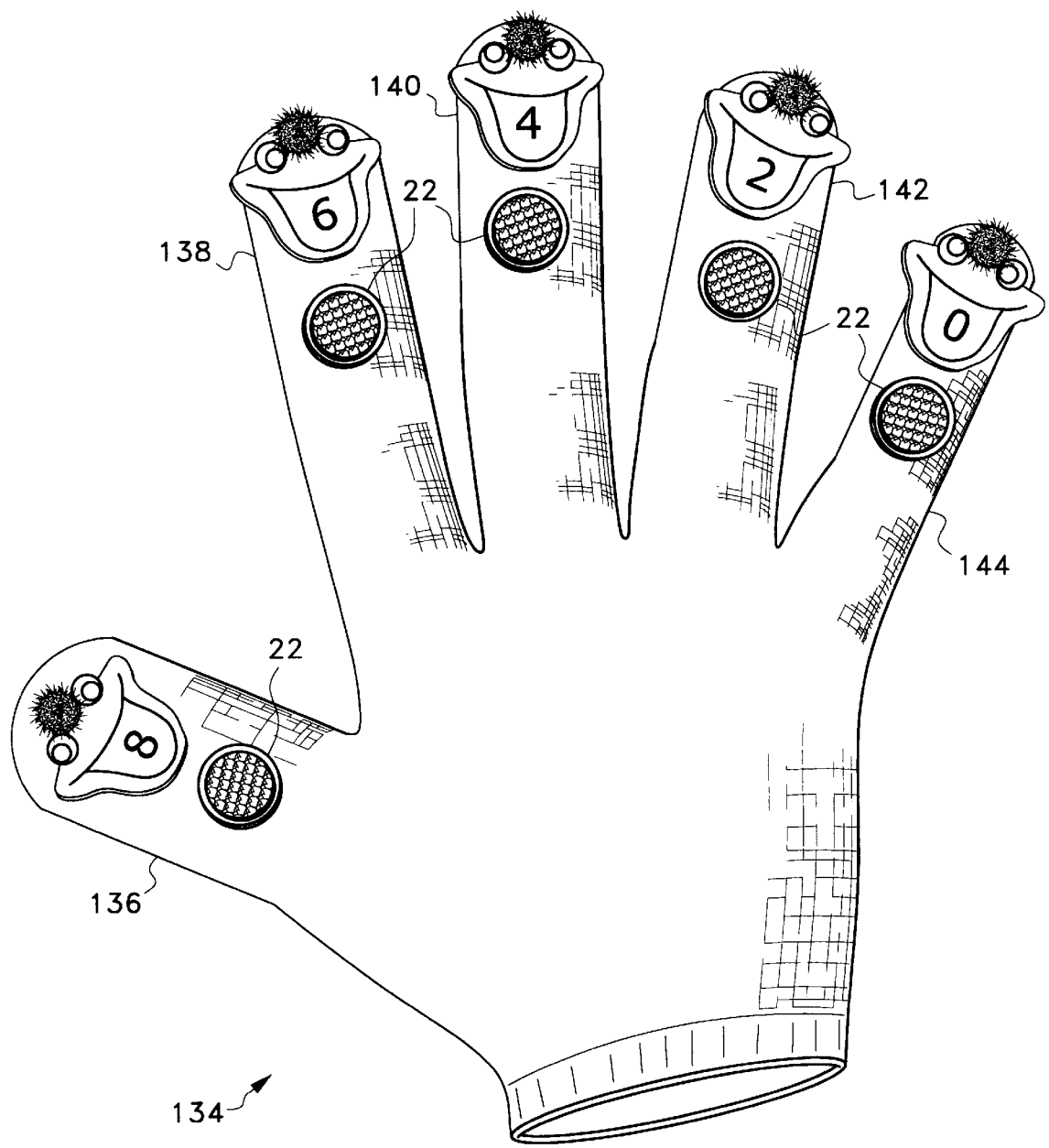
FIG. 6 is a perspective view of a left hand glove palm for teaching counting and numerical manipulation by a factor of eight.

FIG. 6 illustrates an "eight" pattern glove 134, with its five digits from thumb to little finger being designated as fingers or digits 136 through 144. It will be noted that the "eight" pattern glove 134 is similar to the "two" pattern finger puppets of FIG. 1. However, the initial number in the series is eight, as shown on the first or thumb digit 136, with each successive number decreasing by two on the remaining fingers 138 through 144. This occurs because additive eight reduces the total by two, from the addition of a tens place indicator. Thus, the eight of the first digit 136 is two less than ten, the sixteen (with ten added to the six) of the index finger 138 is four less than twenty, the twenty four (with twenty added to the four) of the second finger 140 is six less than thirty, etc. These relationships are apparent when viewed as a series of evenly spaced, non-sequential numbers having a common factor, as provided by the present system.

Counting using the "eight" glove 134 is accomplished in much the same manner as that described above for other gloves or visual and tactile aids (finger puppets, etc.). The eight digit 136 is a single digit number, with no other numbers added. The index finger digit 138 has a ten added to make sixteen. The second finger digit 140, carrying the number four, has twenty added to equal twenty four. The process continues until reaching the little finger 144 with its zero indicator, where four tens (or forty) are/is added. It will be seen that multiplication, division, fractions, and factors may be calculated using the same methods and procedures described further above for the "four" glove 64 of FIG. 3A. Also, it should be noted that while no specific visual and tactile aids and/or story is provided for the number seven (or seventeen) in the present disclosure, that such could be developed essentially in accordance with the processes and methods of the present invention, if so desired.

Figure 7A:
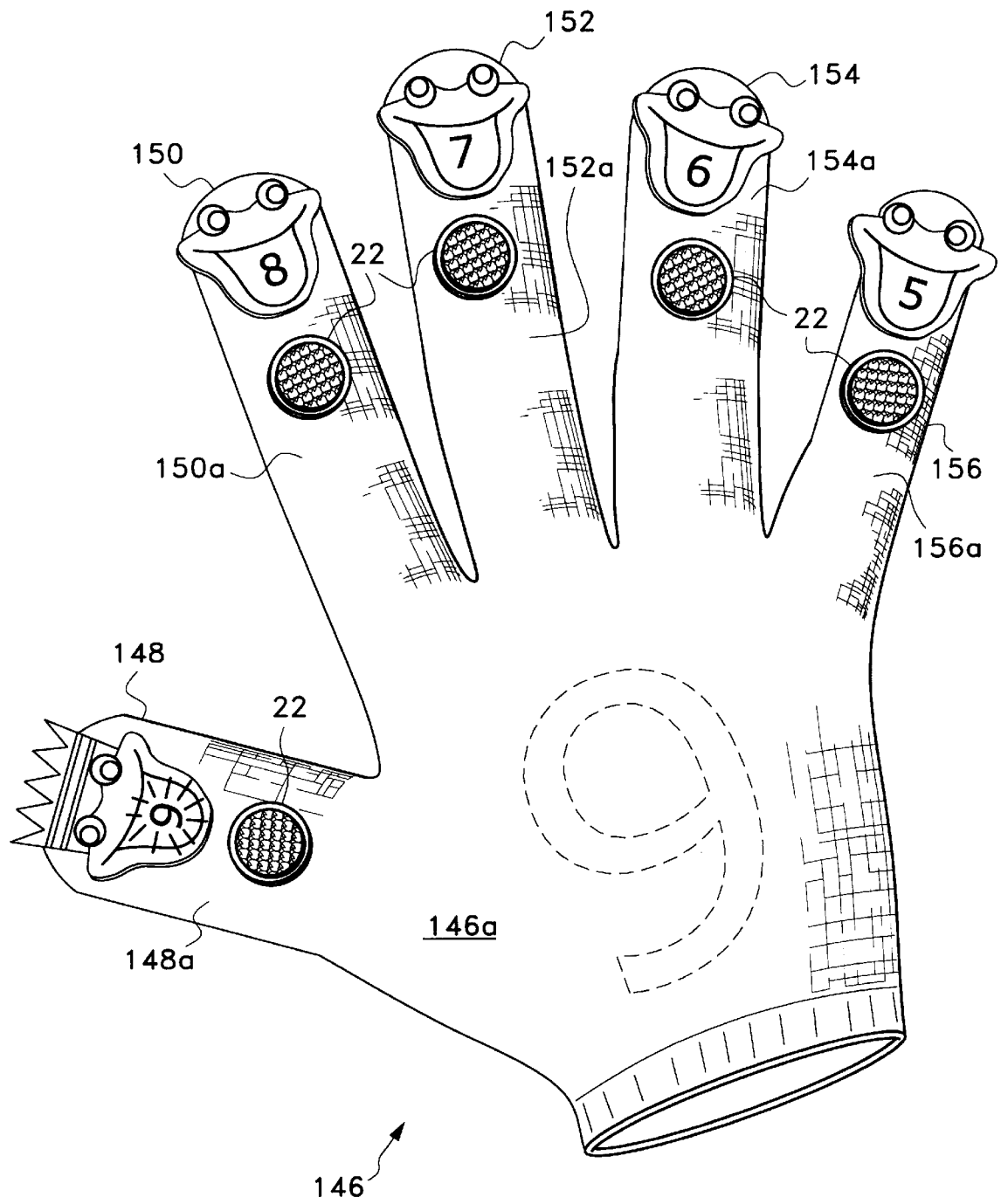
FIGS. 7A and 7B are perspective views respectively of the palm and back of a left hand glove for teaching counting and numerical manipulation by a factor of nine.
Figure 7B:
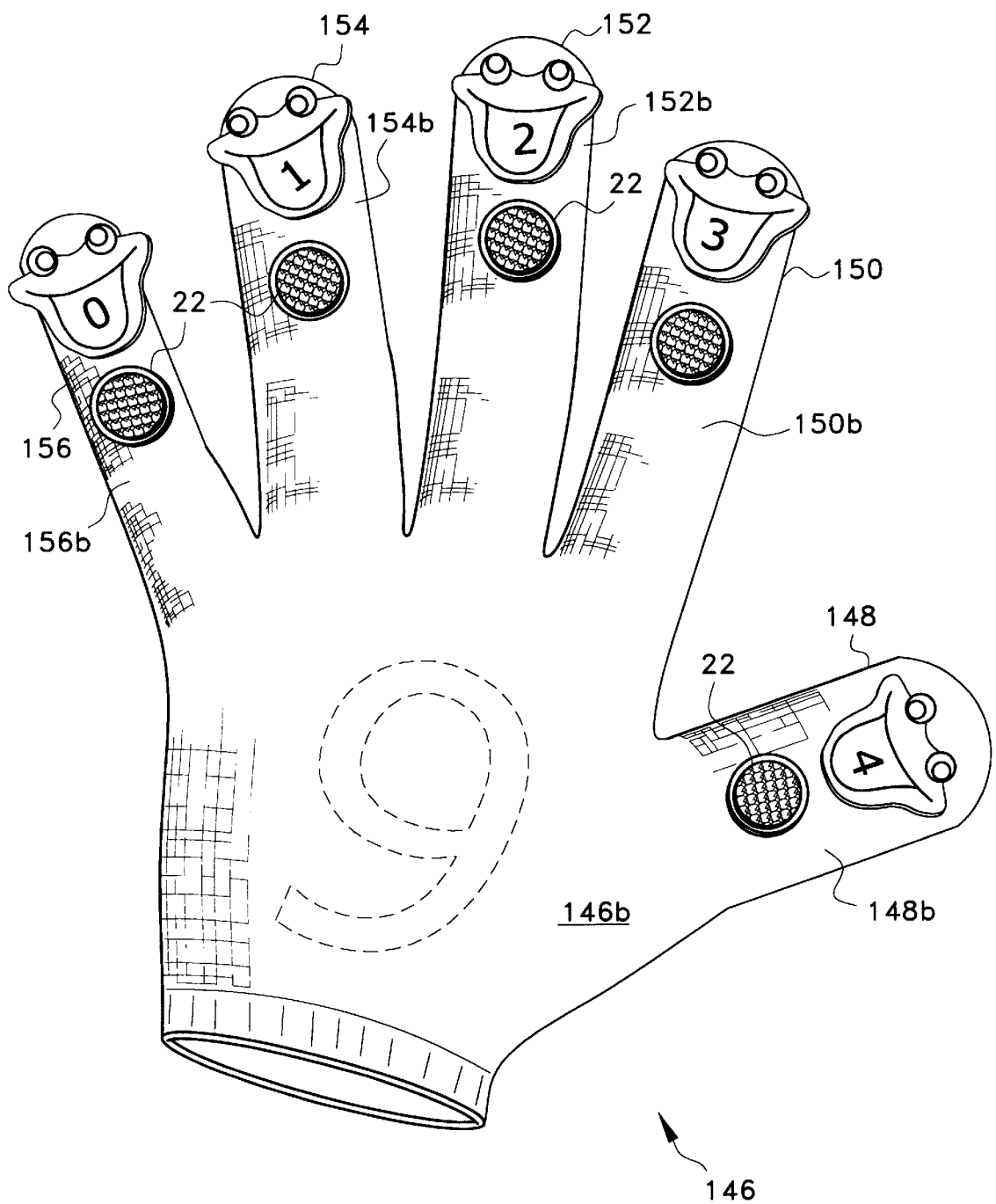

FIGS. 7A and 7B respectively illustrate the front or palm side and back side of a "nines" pattern glove 146. As with other odd numbers, a multiple of five results in the last digit of the product ending in five. Accordingly, the "nines" pattern glove 146 utilizes the palm side 146a and opposite back side 146b, with the five counting digits 148 through 154 each having a front side, respectively 148a through 154a, and an opposite back side, respectively 148b through 154b. It will be noted that the numbers of each digit decrease by one (without the addition of a ten to each), as each additive nine is one less than ten.

Counting using the "nines" glove 146 uses a similar process to those described further above with other gloves and finger puppets, with the first side 148*a* of the first digit (thumb 148) designated by the number nine. (The caricature used may include various embellishments, such as a crown, etc., in keeping with the story accompanying the teaching of counting by nines.) The next number in the series is eighteen, achieved by adding a "ten" numerical place indicator, such as the "ten" indicator 86 of FIG. 3B, to the eight of the first side 150*a* of the next digit (index finger 150). The process continues, with a "twenty" numerical position indicator being added to the seven of the first side 152*a* of the next digit 152, to make twenty seven, and so on until reaching the first side 156*a* of the last digit 156, where forty is added to make a total of forty five.

At this point, the hand and glove 146 are turned over to present the back side 146*b* of the glove. Counting continues as described above, from the back side 148*b* of the thumb 148 and adding a "fifty" position indicator to the four of the side 148*b*, to equal fifty four. Counting continues through the remaining digits by adding further position indicators to each digit to equal further multiples of nine, until reaching the back side 156*b* of the last digit 156. At this point, a "ninety" position indicator is applied to the zero of the back side 156*b*, to complete the series. It will be seen that the series may be continued by turning the hand again to the first side, and adding the "ninety" indicator to the front side 148*a* of the thumb 148 to equal 99, etc.

Figure 8A:
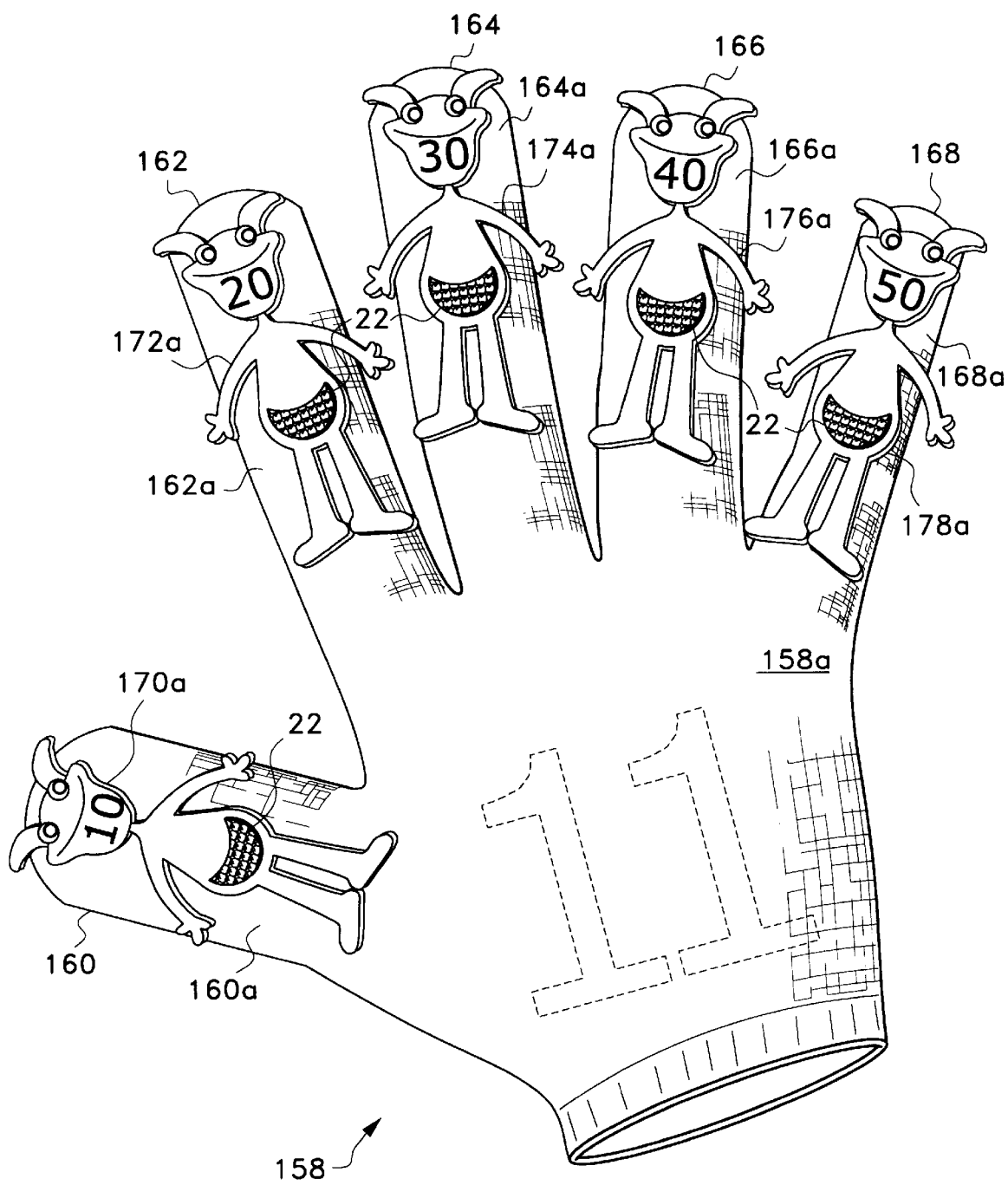
FIGS. 8A and 8B are perspective views respectively of the palm and back of a left hand glove for teaching counting and numerical manipulation by a factor of eleven.
Figure 8B:
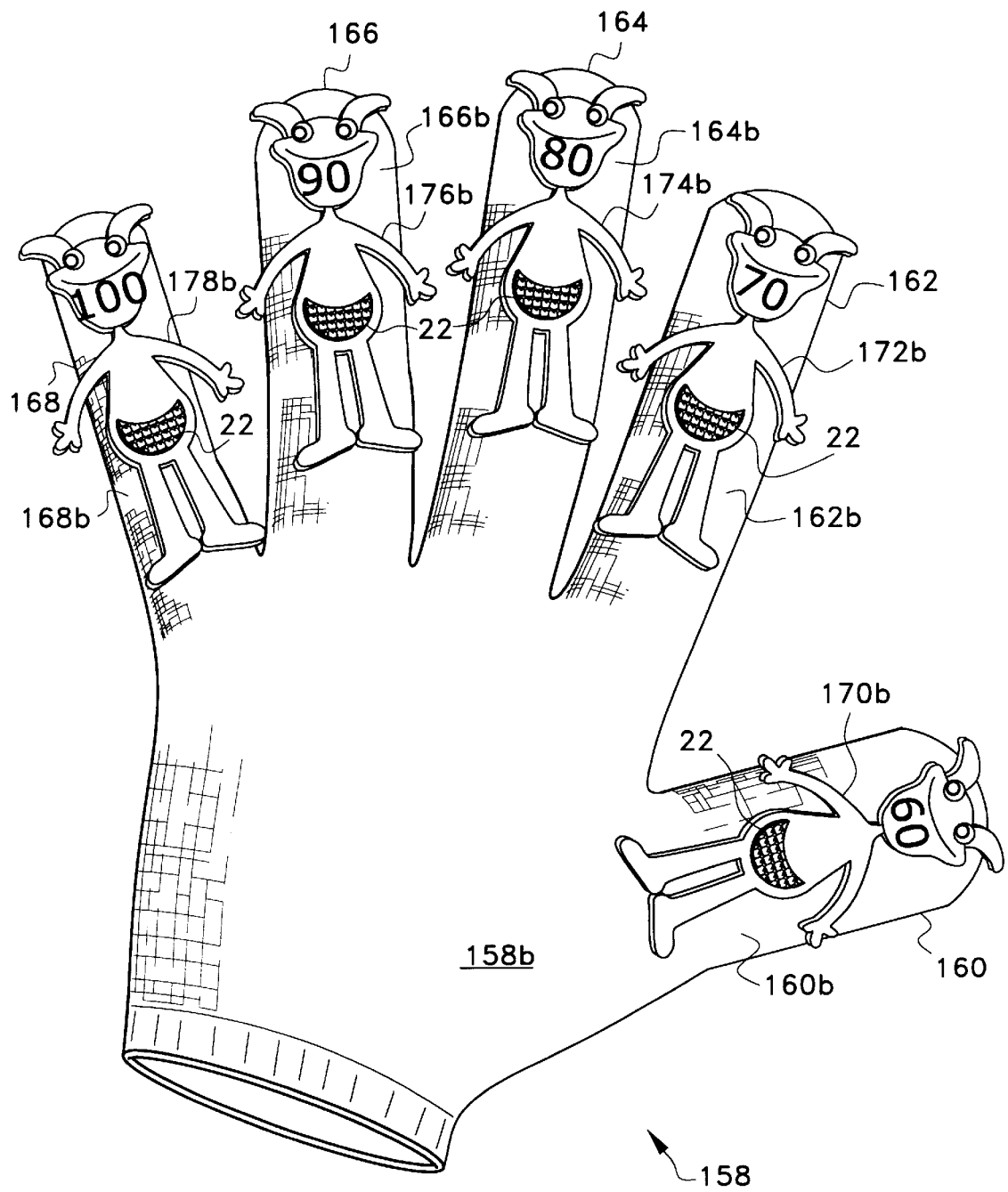
Figure 8C:
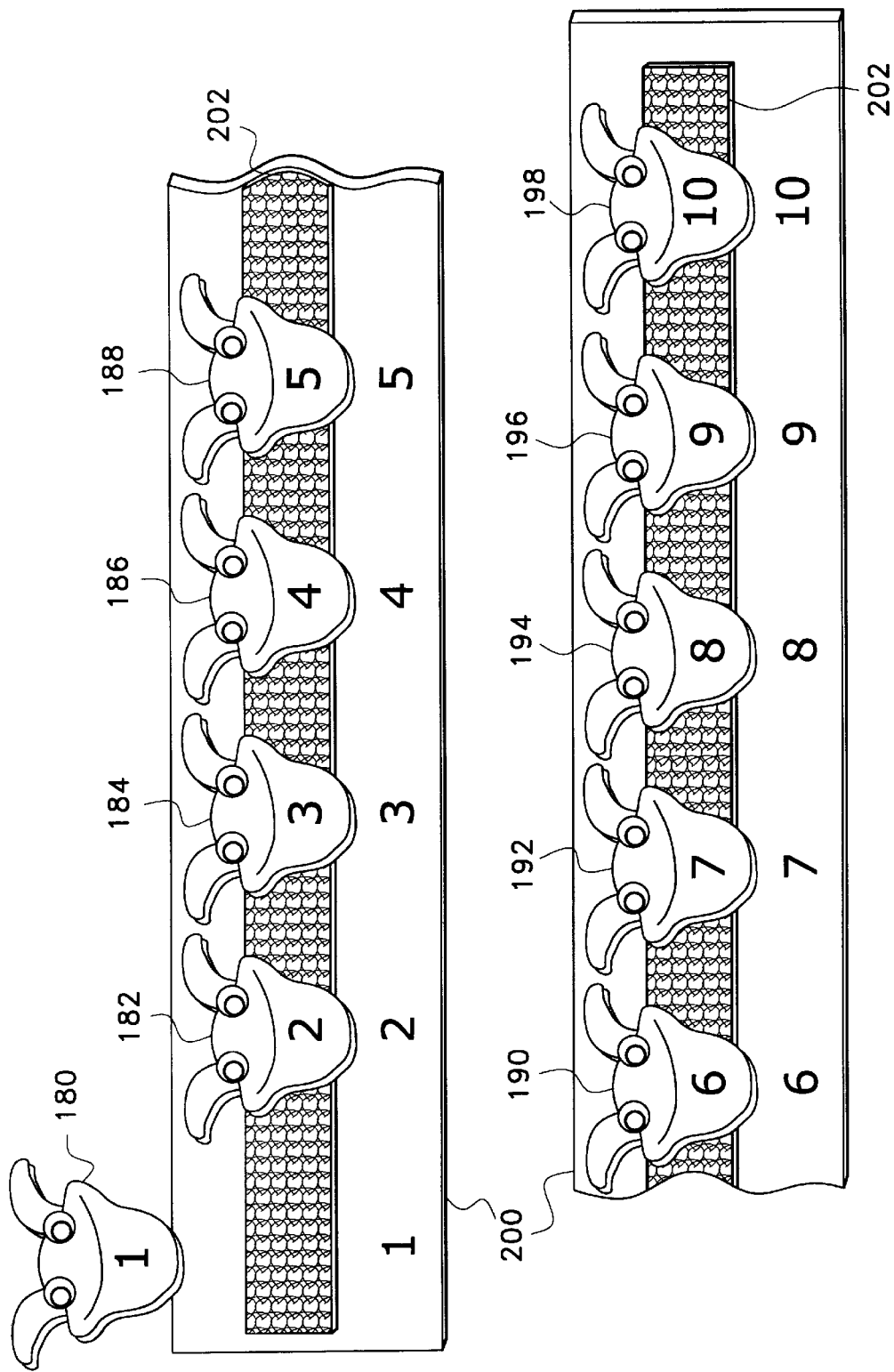
FIG. 8C is a top plan view of a board for holding single digit numbers, and one two digit number, for removable attachment to the glove of FIGS. 8A and 8B.

FIGS. 8A and 8B respectively illustrate the front or palm side 158*a* and back side 158*b* of an "elevens" glove 158. The present system does not specifically provide a visual and tactile aid for learning to count and perform other mathematical operations by tens, as such operations are trivial using the decimal system. However, it will be seen that the glove 158 of FIGS. 8A and 8B could be used for counting by tens, if so desired, by omitting use of the numerical position indicators shown in FIG. 8C. Also, while a glove 158 is shown in FIGS. 8A and 8B (and in other Figures disclosing devices for learning mathematical operations for higher numbers, it should again be pointed out that the finger puppet configurations illustrated in FIGS. 1, 2A, and 2B are adaptable for use with higher numbers, if so desired.

The "elevens" glove 158 includes five digits, respectively 160 through 168, from the thumb 160 through the last or little finger 168. Each of these digits 160 through 168 has a front or palm side, respectively 160*a* through 168*a*, as shown in FIG. 8A, and an opposite back side, respectively 160*b* through 168*b*, shown in FIG. 8B. Each of these positions 160*a* through 168*b* includes a caricature thereon, such as the somewhat kangaroo-like caricatures 170*a* through 178*b* shown in FIGS. 8A and 8B, which may coincide with a story for describing the counting and other mathematical operations which may be accomplished using the "elevens" glove 158. The removable attachment means (hook and loop fastener material 22, etc.) may be positioned to be reminiscent of a female kangaroo's "pouch" on such kangaroo-like caricatures, if so desired.

A series of numerical position indicators 180 through 198 is provided, with the indicators being removably attached to a board 200 by means of a hook and loop fastener strip 202, or other suitable temporary attachment means. The indicators 180 through 198 may be removably attached to the hook and loop attachment points 22 associated with the corresponding ten digits or positions 160*a* through 168*b*, for counting by elevens using the glove 158.

Counting is accomplished by beginning with the first side 160*a* of the first (thumb) digit 160, representing a value of ten. The first position indicator 180 is removably secured to the attachment point 22 of the first digit first side 160*a*, totaling eleven for that position. The next indicator 182 having a value of two is removably secured to the first side 162*a* of the second digit (index finger) 162, to total twenty two. The process continues through the first side 168*a* of the fifth digit 168 (little finger), whereupon the hand and glove are turned over to continue the process.

Using the second or back side 158*b* of the glove 158, additional position indicators 190 through 198, representing the numbers six through ten, are placed upon the characters 170*b* through 178*b* of the respective second sides 160*b* through 168*b*, finally reaching the second side 168*b* of the last digit 168 with its caricature 178*b* having a value of one hundred. The positioning of the final position indicator 198, with its value of ten, upon the attachment point 22 of the final caricature 178*b*, provides a total value of one hundred and ten for the tenth digit position.

Figure 9A:
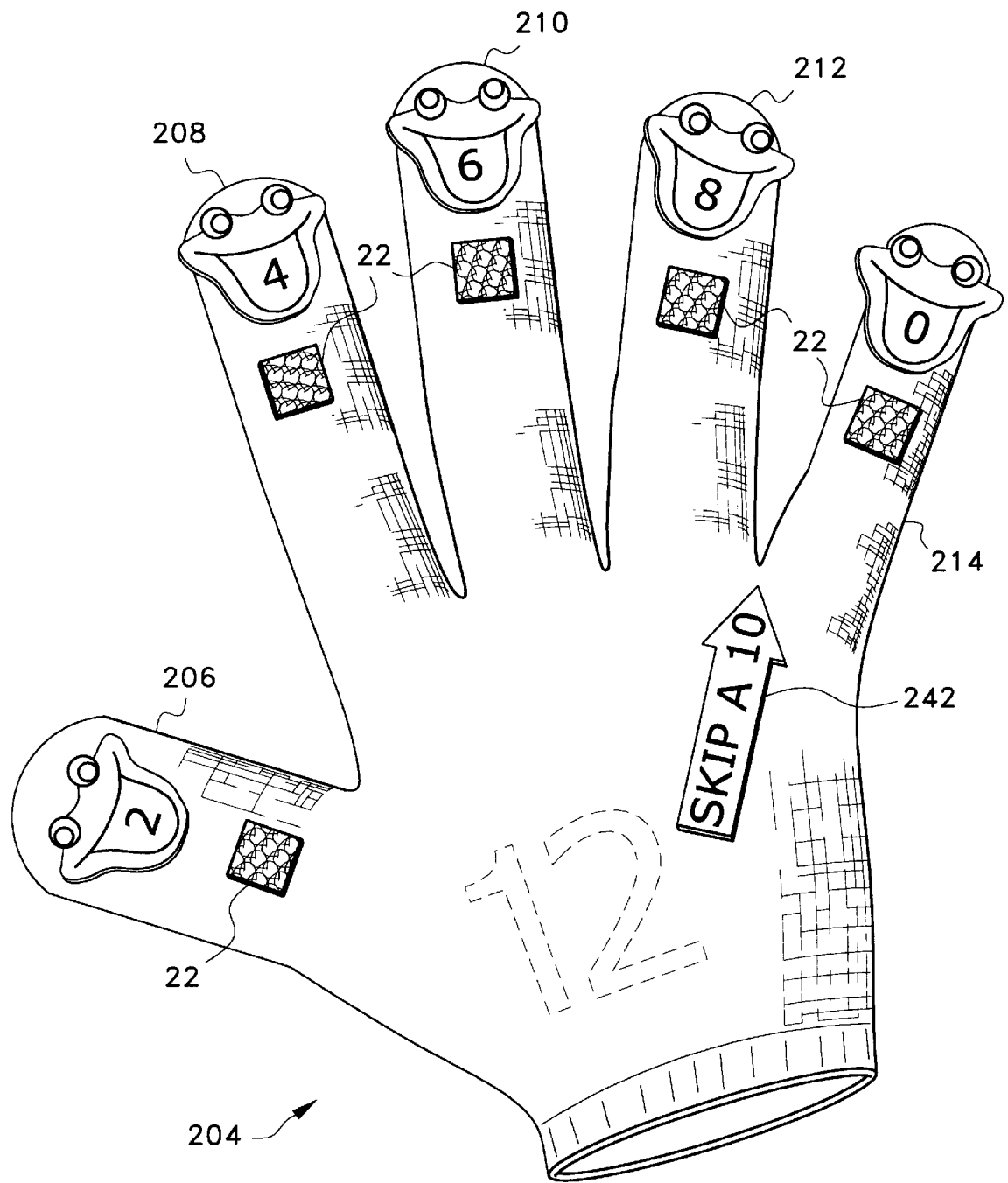
FIG. 9A is a perspective view of a left hand glove palm for teaching counting and numerical manipulation by a factor of twelve.

FIG. 9A illustrates the "twelves" glove 204 of the present system. As the glove 204 uses an even number (twelve) as the numerical factor, the fifth digit will end in a zero. Hence, only one side of the glove 204 is required for counting to one hundred and twenty, by twelves. The glove 204 has five digits, ranging from the first digit (thumb) 206 through the last digit (little finger) 214. Each digit 206 through 214 has a number thereon, with the numbers increasing from two (on the thumb 206) to zero (on the last finger 214) by increments of two. Attachment points 22 are provided for the removable attachment of various numerical place holders, illustrated in FIG. 9B of the drawings. The numbers of the digits 206 through 214 may include some form of caricatures therewith, corresponding to a story for auditory reinforcement of the concepts, as in the other gloves and devices for teaching operations involving other numerical factors, as discussed above.

Figure 9B:
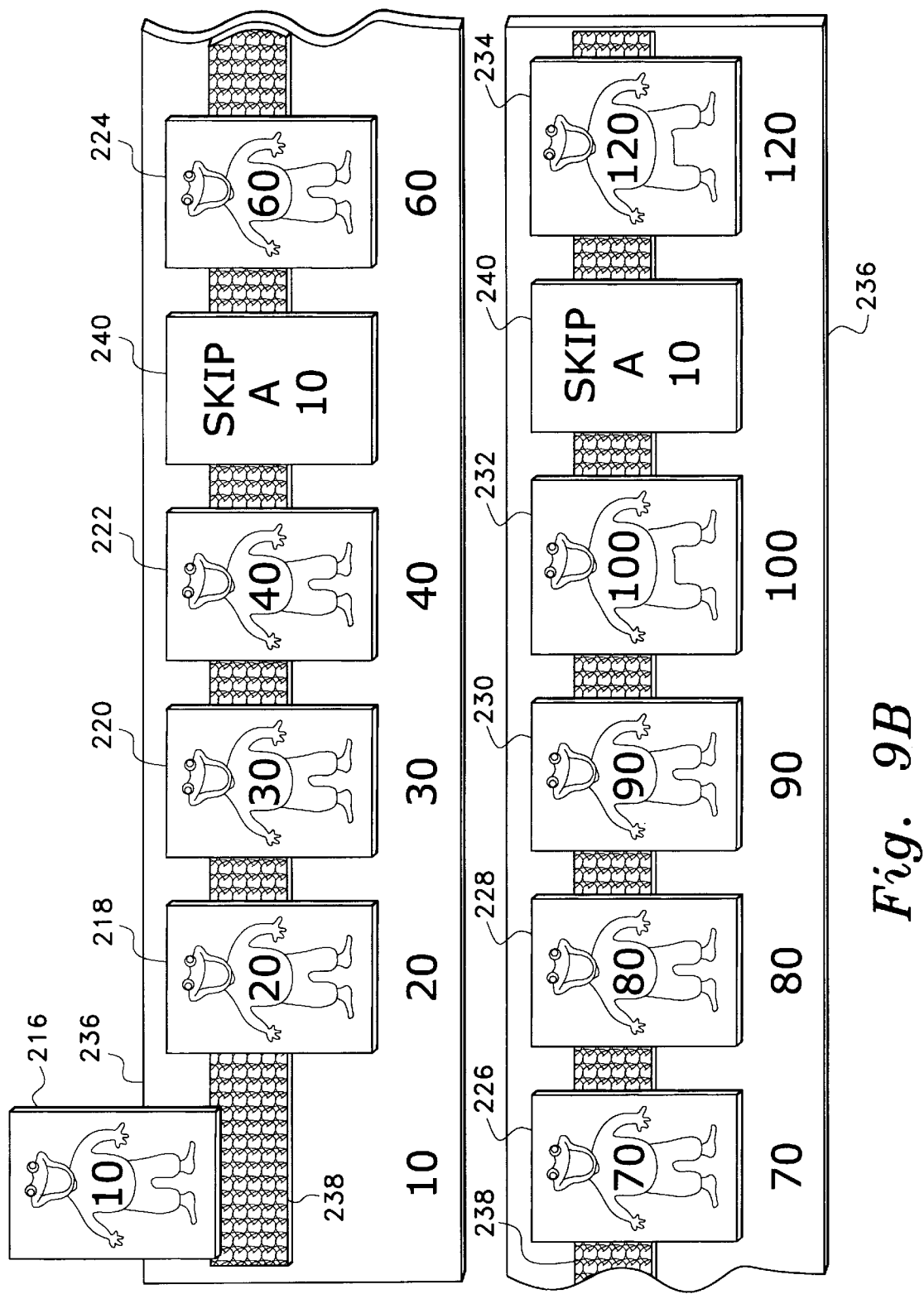
FIG. 9B is a top plan view of a board for holding two digit numbers for removable attachment to the glove of FIG. 9A.

FIG. 9B shows the series of ten numerical place holders, respectively designated as place holders 216 through 234, which are removably secured to a board 236 using a strip of hook and loop fastener material 238 or other suitable means. It will be noted that two "skip a 10" positions 240 are provided on the board 236, for reasons described below. The glove 204 includes a similar "skip a 10" instructional arrow 242 thereon, which relates to the "skip a 10" positions 240. The two "skip a 10" positions 240 on the board 236 may be permanently secured to the board 236 if so desired, as they need not be applied to the attachment means 22 of the digits or fingers 206 through 214 of the glove 204.

Counting by twelves is accomplished somewhat like counting by twos, with the exception that ten is added to each digit. Thus, the tens numerical place holder 216 of FIG. 9B is applied to the thumb or first digit 206 of the glove 204 of FIG. 9A, with the ten and two adding to twelve. The twenties position holder 218 is then applied to the next digit (index finger 208) of the glove 204, equalling twenty four. This process is continued to arrive at a total of thirty six for the second digit 210, and forty eight for the third digit 212 of the glove 204.

At this point, the student encounters the "skip a 10" arrow 242 of the glove 204. This arrow 242 instructs the student to go from the forties place holder 222, applied to the fourth digit (ring finger 222), to the sixties place holder 224, applying it to the last finger 214 for a total of sixty plus zero=sixty for that finger, thereby skipping a fifties position. This is also indicated by the first "skip a 10" position 240 on the board 236, between the forties and sixties position holders 222 and 224.

The process continues by returning to the thumb 206, removing the tens holder 216, and installing the next position holder, i.e., the seventies holder 226, thereon, for a total of seventy two for that digit. The next tens holder in sequence is placed upon each sequential digit, until arriving at the "skip a 10" arrow 21 again. The corresponding position on the board 236 is the second "skip a 10" holder 240 between the "hundred" and "hundred twenty" holders 232 and 234, instructing the student to skip one hundred ten and add the one hundred twenty holder 234 to the last digit 214.

It will be seen that the above described process of counting by twelves using the apparatus of FIGS. 9A and 9B, may be continued so long as desired. As in the other counting systems discussed to this point, and those following, it will be seen that various mathematical operations (multiplication, division, fractions, and factoring numbers) may be easily accomplished using the "twelves" glove 204 and apparatus for those numbers for which they are applicable. For example, in order to divide 150 by 12, the student need only count the number of digits required to reach that total (actually, 144, six less than 150), finding that twelve digits were counted. Hence, the quotient is twelve, with a remainder of six. The remainder fraction of six twelfths may be reduced to one half, using the present system as applied to the "fours" glove 64, described further above.

Figure 10A:
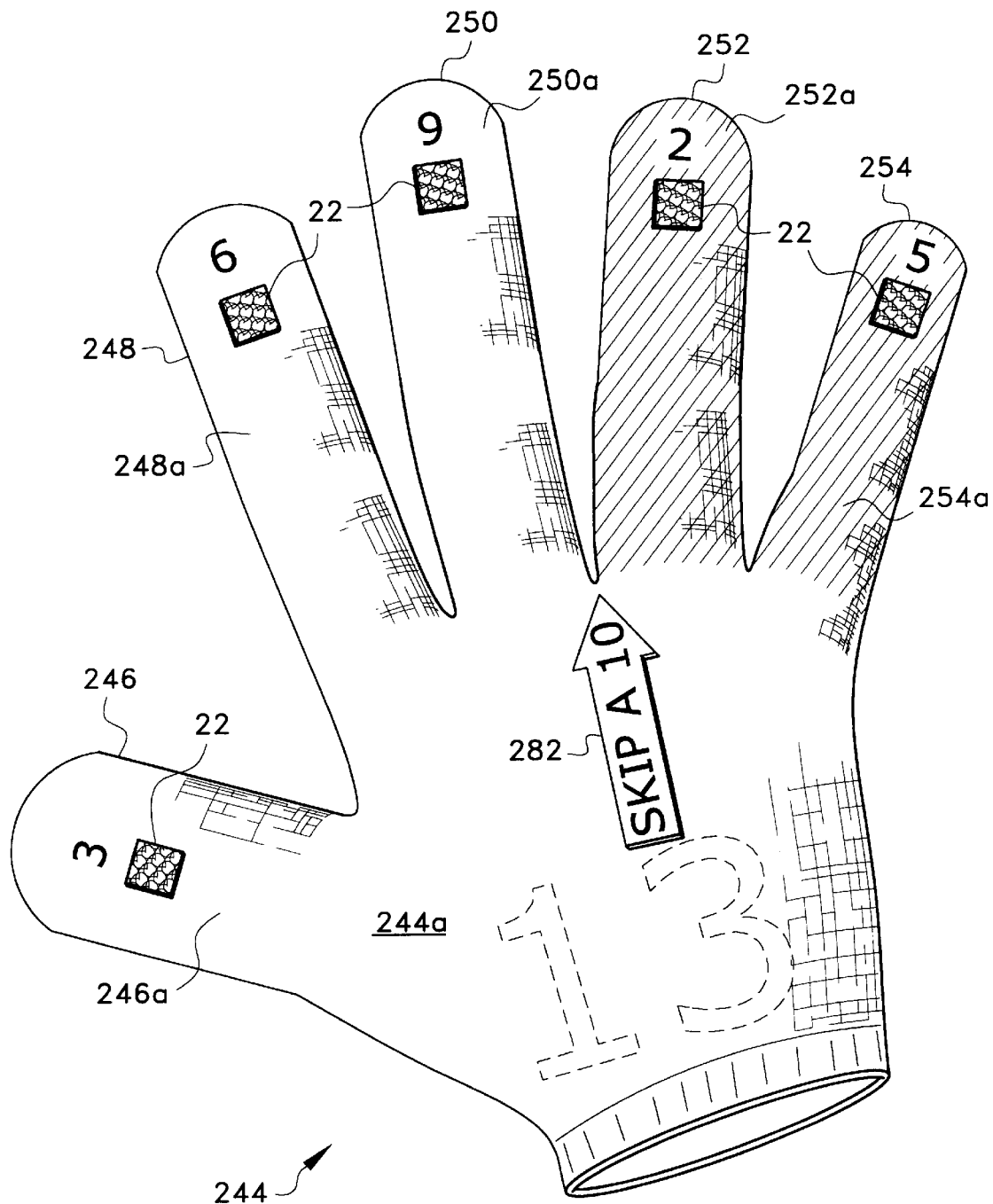
FIGS. 10A and 10B are perspective views respectively of the palm and back of a left hand glove for teaching counting and numerical manipulation by a factor of thirteen, with digits representing numbers below 40, from 52 through 78, and from 91 through 117 being colored or marked differently from one another.
Figure 10B:
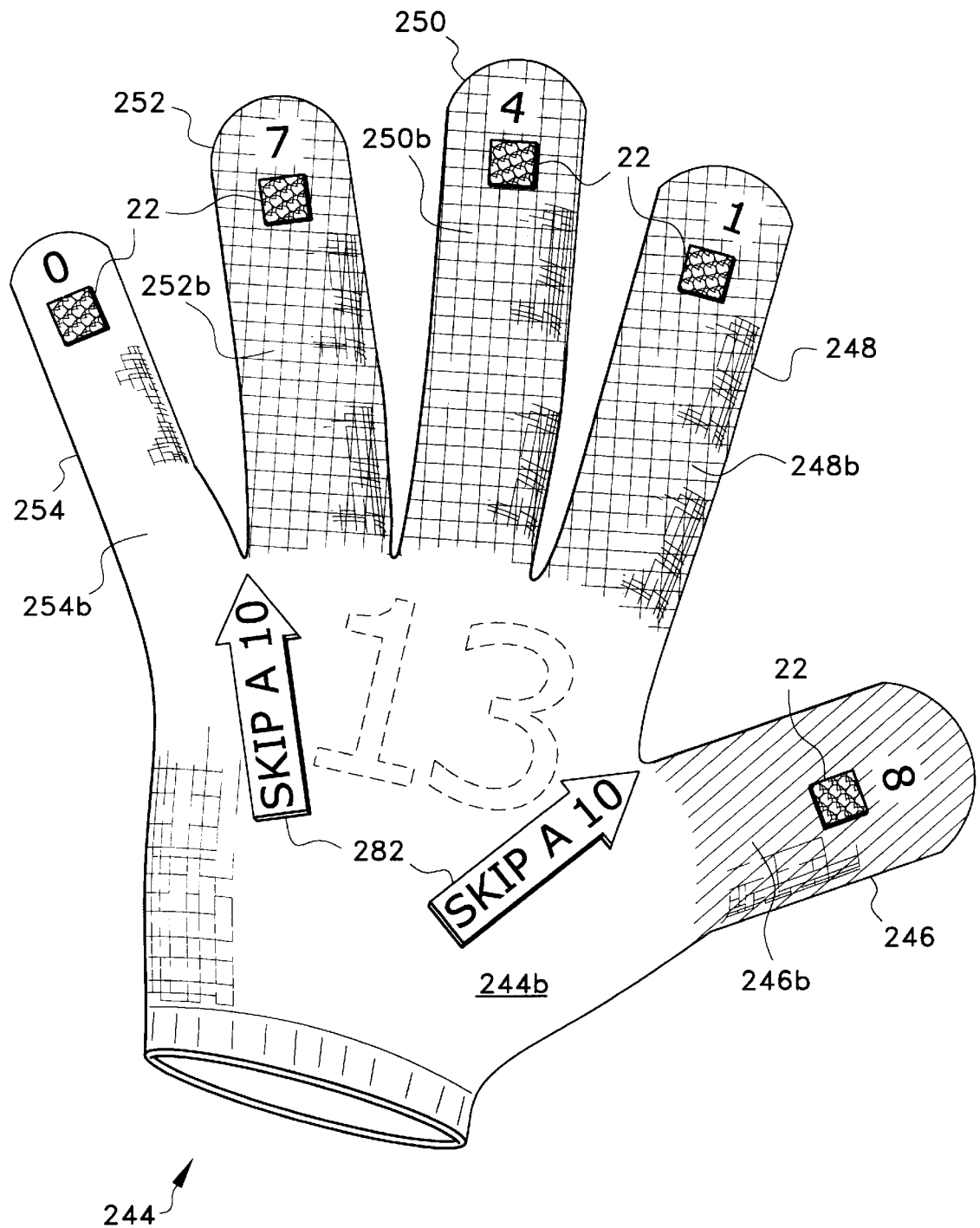

FIGS. 10A and 10B illustrate the "thirteens" glove 244, with the front or palm side 244a being shown in FIG. 10A and the opposite back side 244b being shown in FIG. 10B. As in other gloves and finger puppets used for teaching the non-sequential counting of odd numbers, both sides of the glove 244 are used, with the hand being turned over after completing the count of digits of the first side. Accordingly, the five digits from thumb to last finger are designated as 246 through 254, with the first or palm sides of the digits designated as 246a through 254a and the opposite back sides of the digits designated as 246b through 254b.

Figure 10C:
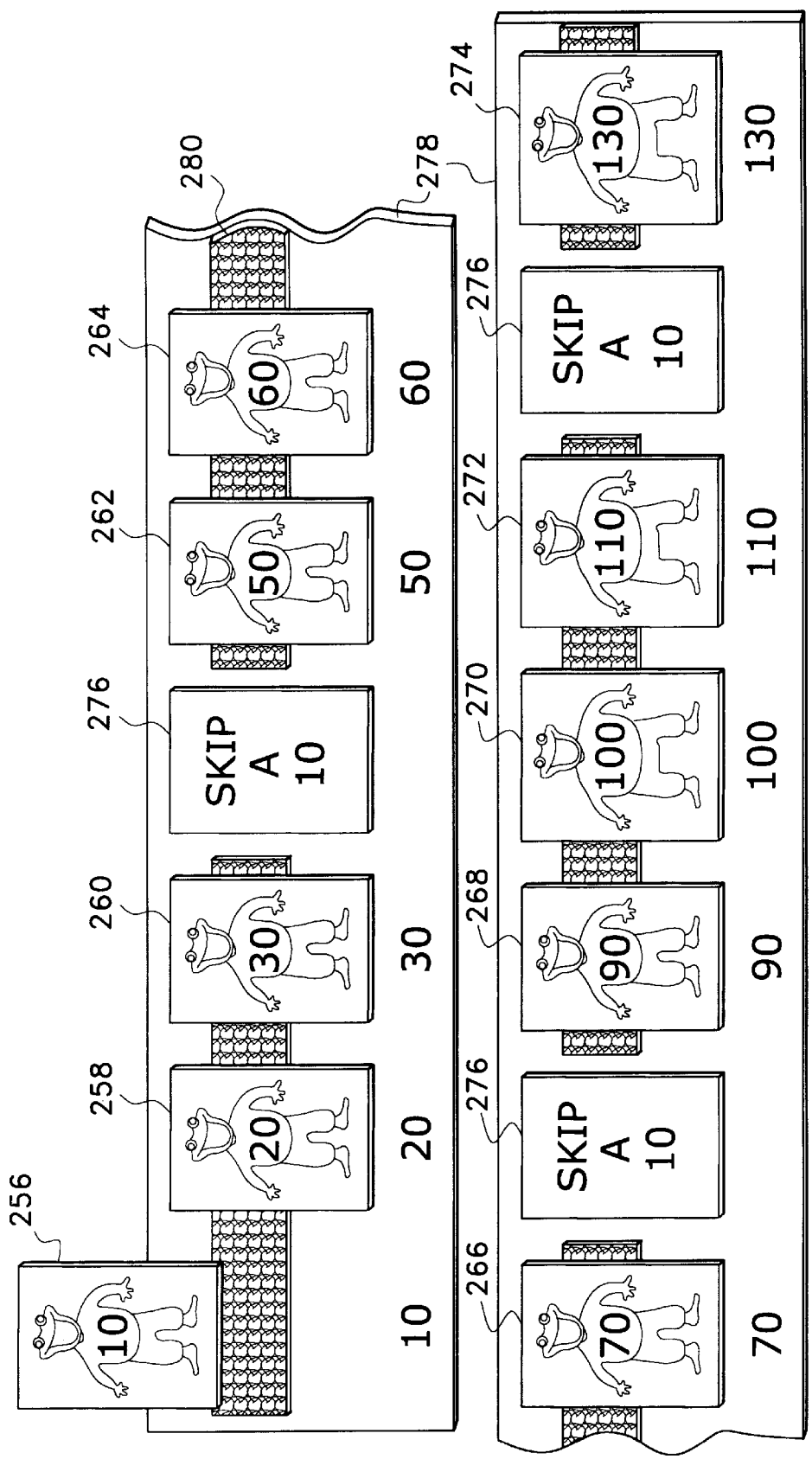
FIG. 10C is a top plan view of a board for holding two digit numbers for removable attachment to the glove of FIGS. 10A and 10B.

FIG. 10C discloses a total of ten numeral position holders, designated as holders 256 through 274. As in the case of the "twelves" position holders 216 through 234 of FIG. 9B, the numeral position holders 256 through 274 of FIG. 10C are not sequential, but include breaks where certain positions are skipped, as indicated by the "skip a 10" locations 276 on the board 278. While the position holders 256 through 274 are removably secured to the board by suitable means, e.g., mating hook and loop material, with one portion 280 shown permanently secured in a discontinuous strip along the board 278, the "skip a 10" locations 276 may be permanently applied to the board 278 between appropriate tens markers, as the "skip a 10" positions are not removed from the board 278 during the use of the present method or process.

Counting using the "thirteens" glove 244 of FIGS. 10A and 10B is accomplished in a similar manner to that used with the "twelves" glove 204 of FIG. 9A. The first side 246a of the first or thumb digit 246 has the number three disposed thereon, with the first position holder 256 being secured by the attachment means 22 to the thumb first side 246a to provide a total of thirteen for that digit. The next, or "twenty" position holder 258 is placed upon the first side 248a of the index finger 248 to make a total of twenty six for that digit. The process continues with the third position holder 260 being added to the first side 250a of the next finger or digit, to provide a total of thirty nine.

At this point, a "skip a 10" arrow or indicator 282 points between the third and fourth digits 250 and 252 of the glove 244, indicating that there is no "forties" position holder, but that the series jumps from the "thirties" holder 260 to the "fifties" holder 262. Correspondingly, the first "skip a 10" marker 276 is provided on the board 278, between the "thirties" holder 260 and the "fifties" holder 262, to indicate that there is no forties position or number when counting by thirteens.

It will also be noted that the next three digits in the series (the first sides 252a and 254a of the fourth and fifth digits 252 and 254 of FIG. 10A, and the second side 246b of the thumb digit 246 of FIG. 10B) are colored, shaded, or marked differently than the first two digits in the series, in order to indicate that a ten is skipped between the two differently colored or marked sets of digits. In other words, consecutive digits having the same color or marking, increase by ten when counting by thirteens, with a break in color or marking (along with the "skip a 10" arrow) indicating a jump of twenty in the tens place of the counting sequence.

The counting sequence continues, with the addition of the markers 262, 264, and 266 respectively to the first sides 252a and 254a of the fourth and fifth digits 252 and 254, and to the second side 246b of the thumb digit 246, resulting in the numbers fifty two, sixty five, and seventy eight being placed upon those respective digits.

The next number in the series (ninety one) does not have an eight in its tens digit. In other words, another "skip a 10" point is encountered between the numbers seventy eight and ninety one, as indicated by the second "skip a 10" marker 282 on the second side 244b of the glove 244, pointed between the first digit or thumb 246 and the index finger 248. As a further indication, the second sides 248b, 250b, and 252b of the next three digits (index finger 248 and the following two fingers 250 and 252) are shaded or marked identically to one another, but differently from the preceding three digit sides. Also, a "skip a 10" position 276 is provided on the board 278, between the "seventies" place or position holder 266 and the "nineties" holder 268. The count is continued accordingly, with the second sides 248b, 250b, and 252b of the digits 248, 250, and 252 respectively displaying totals of ninety one, one hundred and four, and one hundred seventeen.

Another "skip a 10" marker 282 is provided between the fourth and fifth digits (ring finger 252 and little finger 254), on the second side 244b of the glove 244. This indicates another break in the tens sequence, from one hundred ten to one hundred thirty. The second side 254b of the last digit 254 is also colored or marked differently, to indicate this "skip a 10" in the series. The final "skip a 10" position 276 on the board 278, between the "110" and "130" position holders 272 and 274, also serves to indicate that no "120" position holder is used with this series. The process may continue by returning to the first side 246a of the first or thumb digit 246, and providing appropriate numerical position holders.

Figure 11A:
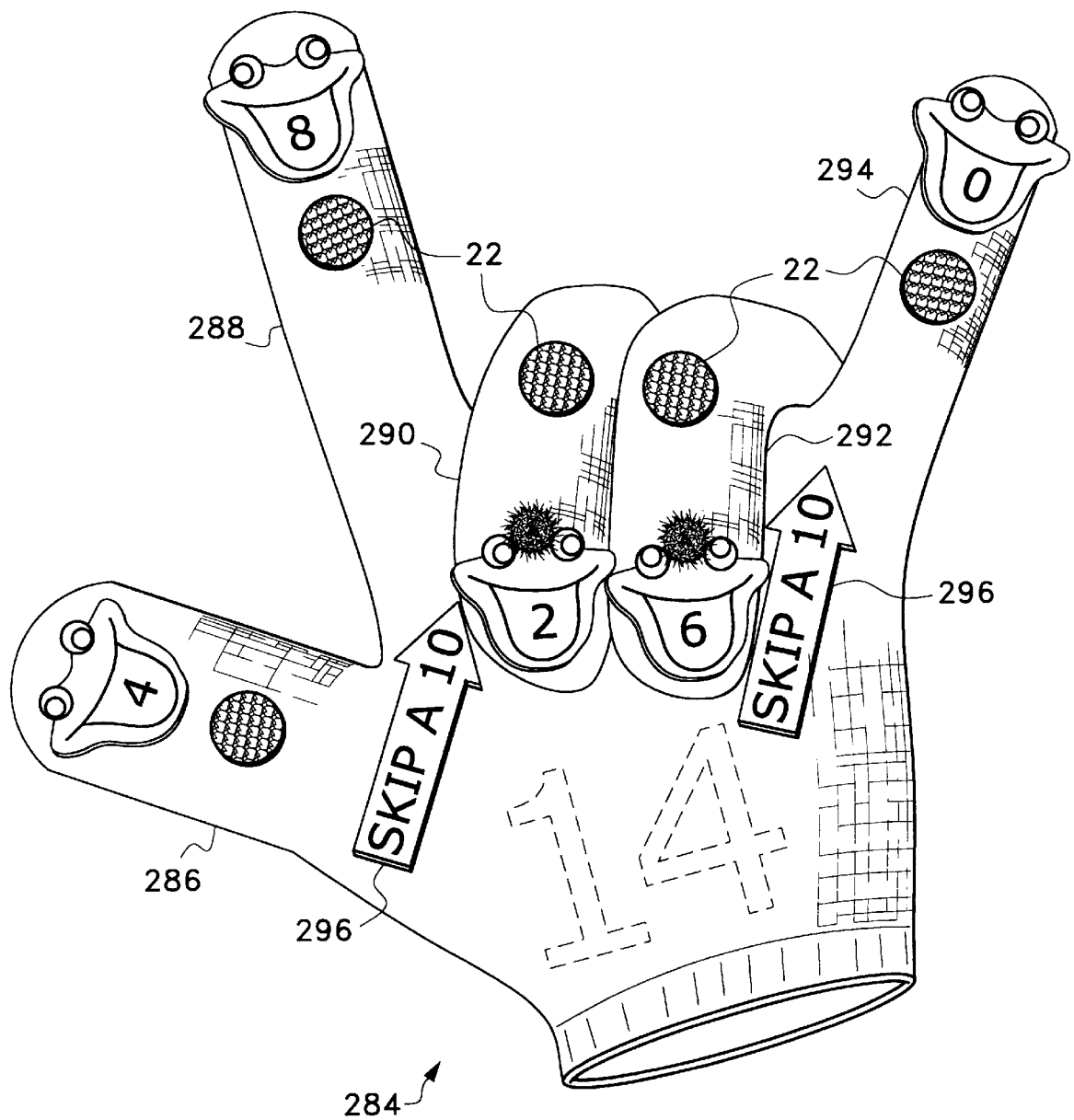
FIG. 11A is a perspective view of the palm of a left hand glove for teaching counting and numerical manipulation by a factor of fourteen, and showing the hand pattern used.

FIG. 11A illustrates a "fourteens" glove 284 having first through fifth digits, respectively 286 through 294. The general configuration of the "fourteens" glove 284 resembles that of the "fours" glove 64 of FIG. 3A, with the two middle fingers 290 and 292 folded over together to allow their back surfaces 290a and 292a to face in the same direction as the palm of the glove 284. The difference between the two gloves 64 and 284 is the addition of two "skip a 10" positions 296 in the palm of the glove 284, to provide for counting by fourteens, rather than by fours. As in other gloves or finger puppets described herein, the numbers of the digits 286 through 294 of the glove 284 may include caricatures therewith, in keeping with a story developed to provide auditory reinforcement of the counting principle involved.

Figure 11B:
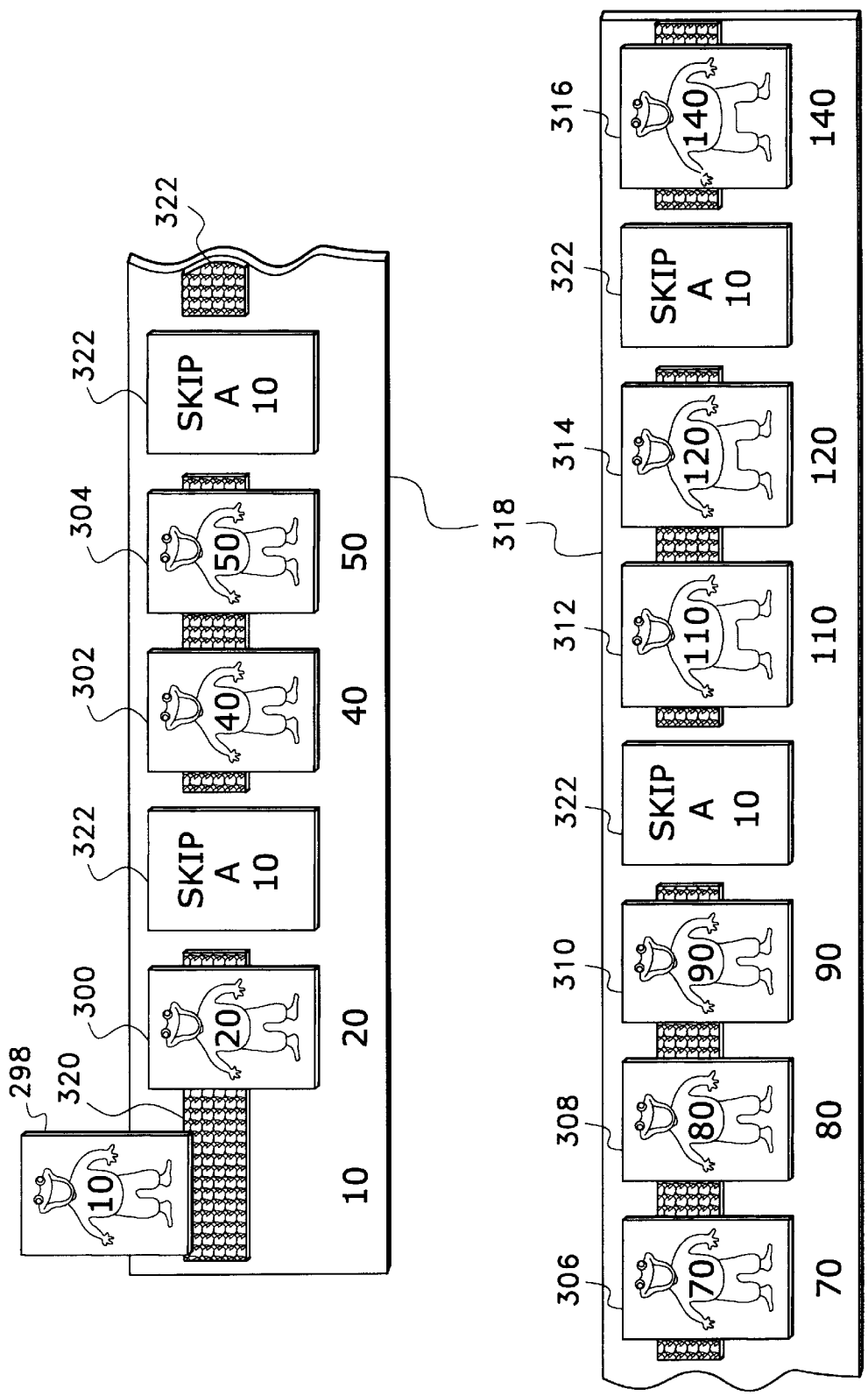
FIG. 11B is a top plan view of a board for holding two and three digit numbers for removable attachment to the FIG. 11A glove.

FIG. 11B displays a series of tens place holders, respectively 298 through 316 for the numerical place holders from ten through one hundred forty by tens (with certain positions skipped, as described below). As in other numerical position holder series, a board 318 is provided, including removable attachment means 320 for removably attaching the place holders 298 through 316 to the board 318. The "skip a 10" positions 322 may be permanently secured to the board 318 between breaks in the discontinuous attachment strip 320, as the "skip a 10" indicators 322 are not removed from the board 318 for teaching any mathematical operations according to the present invention.

Counting by fourteens is accomplished using the glove 284 by starting with the first or thumb digit 286 and adding the first or "tens" numerical holder 298 thereto to make a total of fourteen for that digit 286. Counting continues by adding the "twenties" holder or marker 300 to the second digit (index finger) 288 to form a total of twenty eight on that digit.

At this point, the first "skip a 10" indicator 296, pointing between the index finger 288 and second finger 290, is encountered, and the first "skip a 10" marker 322, between the "twenties" holder 300 and "forties" holder 302, instructs the student to place the "forties" holder 302 upon the second finger (third digit) 290 for a total of forty two on that digit. The following digit 292 increases by ten plus the difference of four between the two digits 290 and 292, thus adding fourteen to the digit 292 for a total of fifty six for the digit 292.

Here, the second "skip a 10" marker 296, pointing between the ring finger 292 and little or last finger 294, is encountered. Another "skip a 10" position 322, between the "fifties" marker 304 and "seventies" marker 306, is correspondingly positioned on the board 318 to indicate that there is no sixties marker or holder in the counting by fourteen series. Accordingly, the "seventies" marker 306 is removably installed upon the last digit 294 of the glove 284, to complete the first five numbers of the "fourteens" series. The process continues as desired, with the "tens" marker 298 being removed from the thumb 286 and replaced by the "eighties" holder 308 to equal eighty four, etc.

Figure 12A:
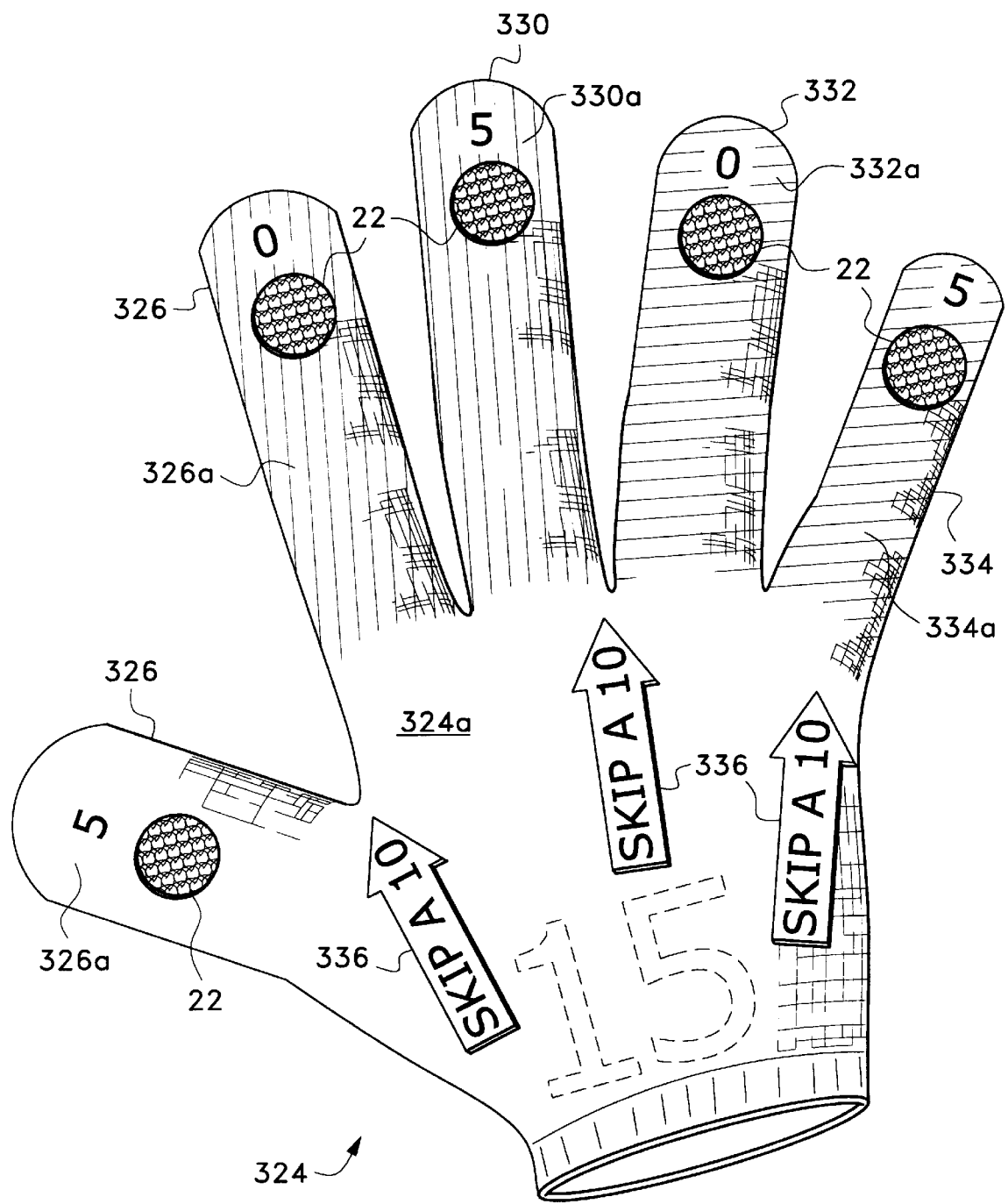
FIGS. 12A and 12B are perspective views respectively of the palm and back of a left hand glove for teaching counting and numerical manipulation by a factor of fifteen, with digits representing numbers 30 and 45, 60 and 75, 90 and 105, and 120 and 135 being colored or marked differently from one another.
Figure 12B:
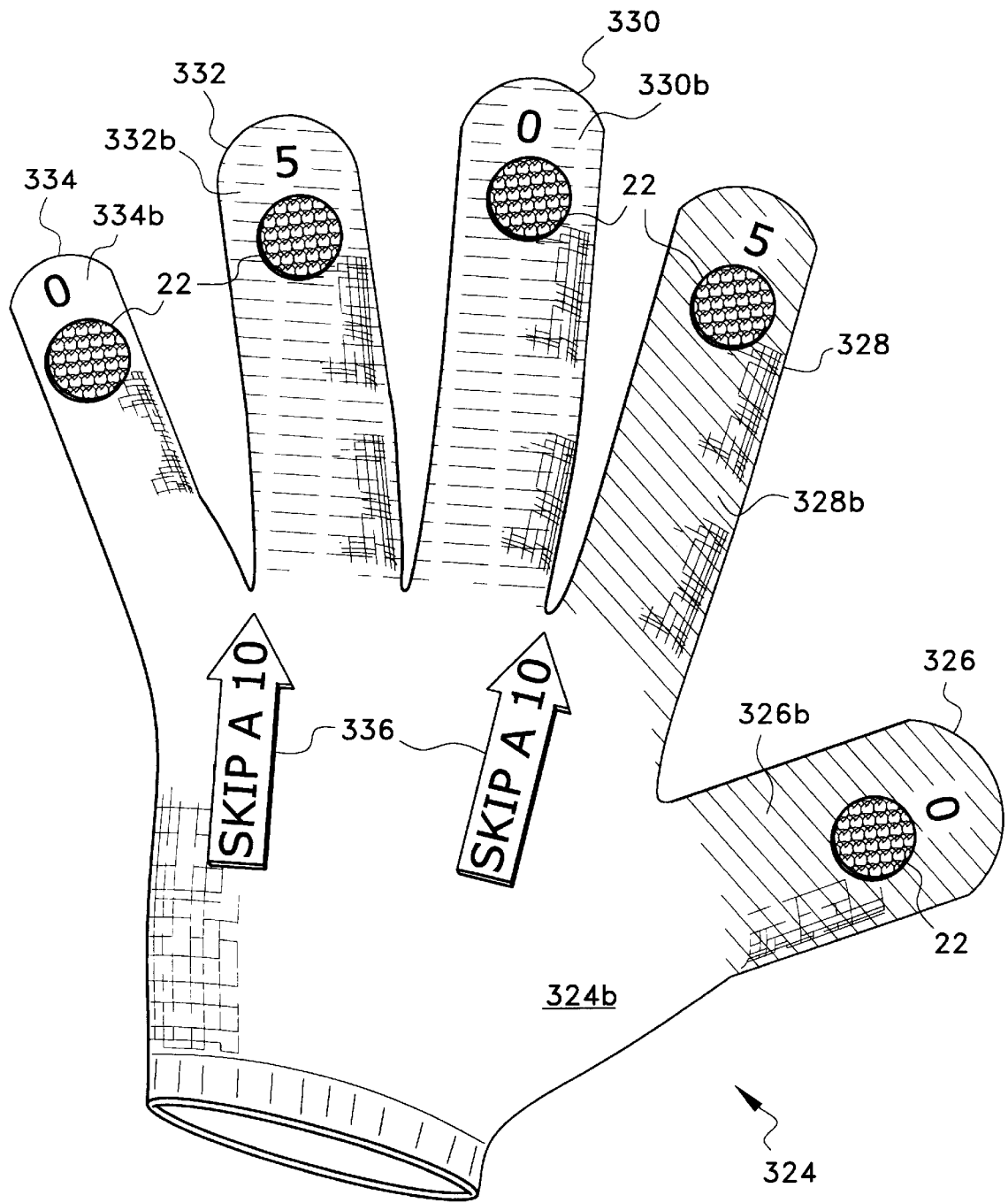

FIGS. 12A and 12B respectively disclose the front or palm side 324a and back side 324b of a "fifteens" glove 324. The five digits, respectively 326 through 334, each have a front or palm side 326a through 334a and a reverse or back side 326b through 334b. The digits alternate between values of five and zero, starting with five on the first side 326a of the first digit or thumb 326a. The glove 324 is marked or colored somewhat similarly to the "thirteens" glove 244 of FIGS. 10A and 10B, having differently colored, shaded, or marked digits and "skip a 10" instructions 336 located at appropriate points.

Figure 12C:
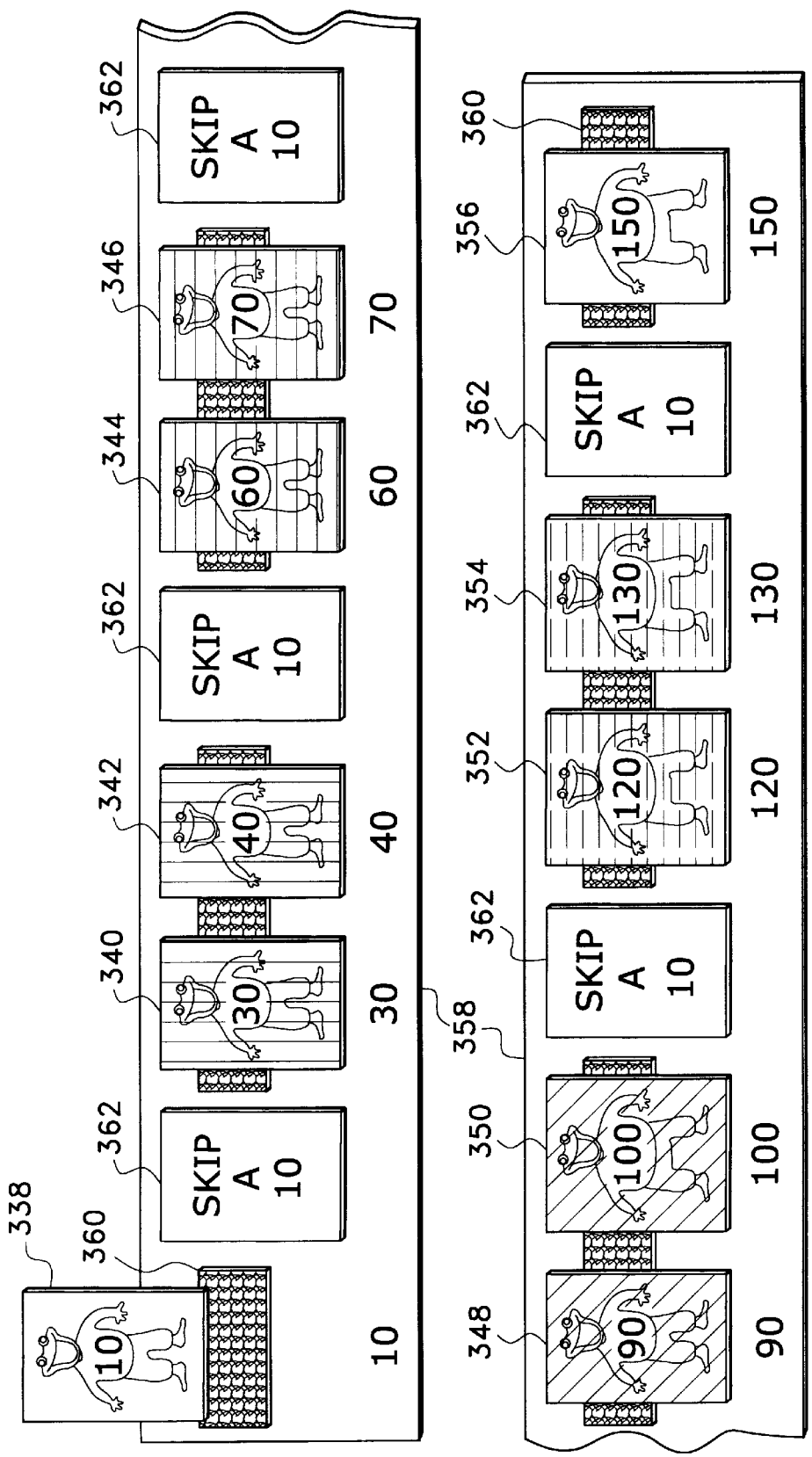
FIG. 12C is a top plan view of a board for holding two and three digit numbers for removable attachment to the glove of FIGS. 12A and 12B.

FIG. 12C provides a view of the numeral position holders or indicators, respectively 338 through 356, used with the glove 324 of FIGS. 12A and 12B. The holders 338 through 356 are removably secured to a board or the like 358 by removable attachment means 360, as in the case of other position holders used in the present system. Several "skip a 10" positions 362 are interspersed with the removable position holders, between the "ten" holder 338 and "thirty" holder 340, the "forty" holder 342 and the "sixty" holder 344, the "seventy" holder 346 and the "ninety" holder 348, the "hundred" holder 350 and the "hundred twenty" holder 352, and between the "hundred thirty" holder 354 and the "hundred fifty" holder 356. It will be noted that the various numerical place holders 338 through 356 are colored, shaded, or otherwise marked to match one another between each "skip a 10" position 362, and in accordance with like colors, shadings, or markings on the first and second sides 326a through 334b of the five digits 326 through 334.

Counting using the "fifteen" glove 324 proceeds by starting with the first side 326a of the thumb digit 326, and adding the first or "tens" position holder 338 thereto, making a total of fifteen. The first "skip a 10" indicator 336 is positioned between the thumb 326 and the index finger 328, instructing the student to skip a twenty holder (none is provided, as that position on the board 358 is taken by the corresponding first "skip a 10" position 362) and apply the next numerical position holder, i.e., the "thirties" holder 340, to the first side 326a of the index finger 326, for a total of thirty for that digit. The next digit 330 has the next, or "forty" holder 342 applied thereto, for a total of forty five for that digit 330.

It will be noted that after the first or thumb digit 326, that each two consecutive digits are colored, shaded, or marked the same, and the corresponding holders, i.e., the second and third or "thirties" and "forties" holders 340 and 342, are also shaded or marked identically and also identically to their corresponding digits, i.e., the first sides 326a and 328a of the index and second fingers 326 and 328. This provides a further aid to the student learning to count by fifteens using the present method.

Upon reaching the first side 334a of the final digit 334, the hand and glove 324 are turned over to continue. Counting continues with the second side 326b of the thumb 326 by applying the "nineties" holder or indicator 348 thereto, continuing with the "hundreds" holder 350 being applied to the five count of the second side 328b of the index finger 328, continuing as desired.

Figure 13A:
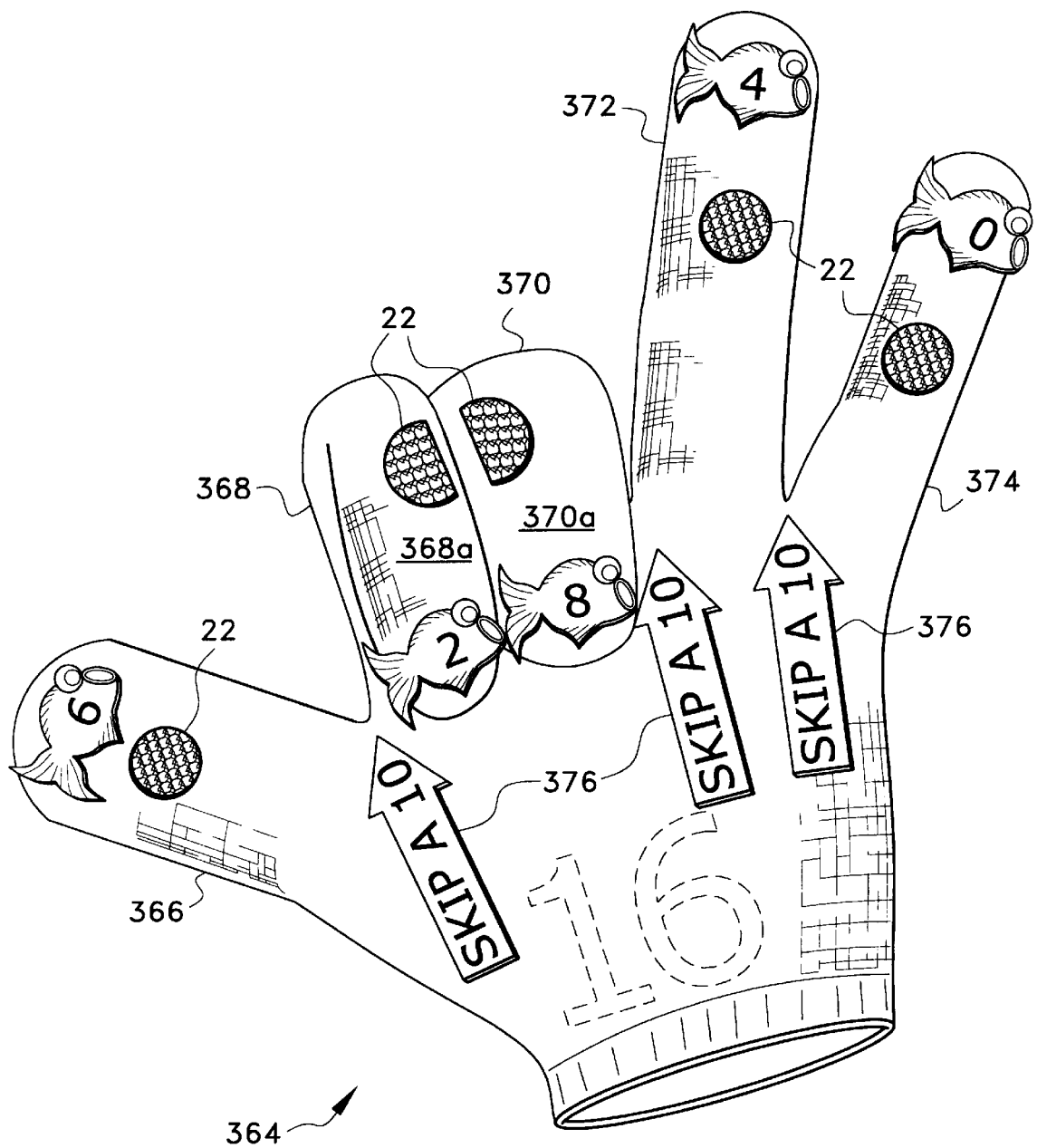
FIG. 13A is a perspective view of the palm of a left hand glove for teaching counting and numerical manipulation by a factor of sixteen, and showing the hand pattern used.
Figure 13B:
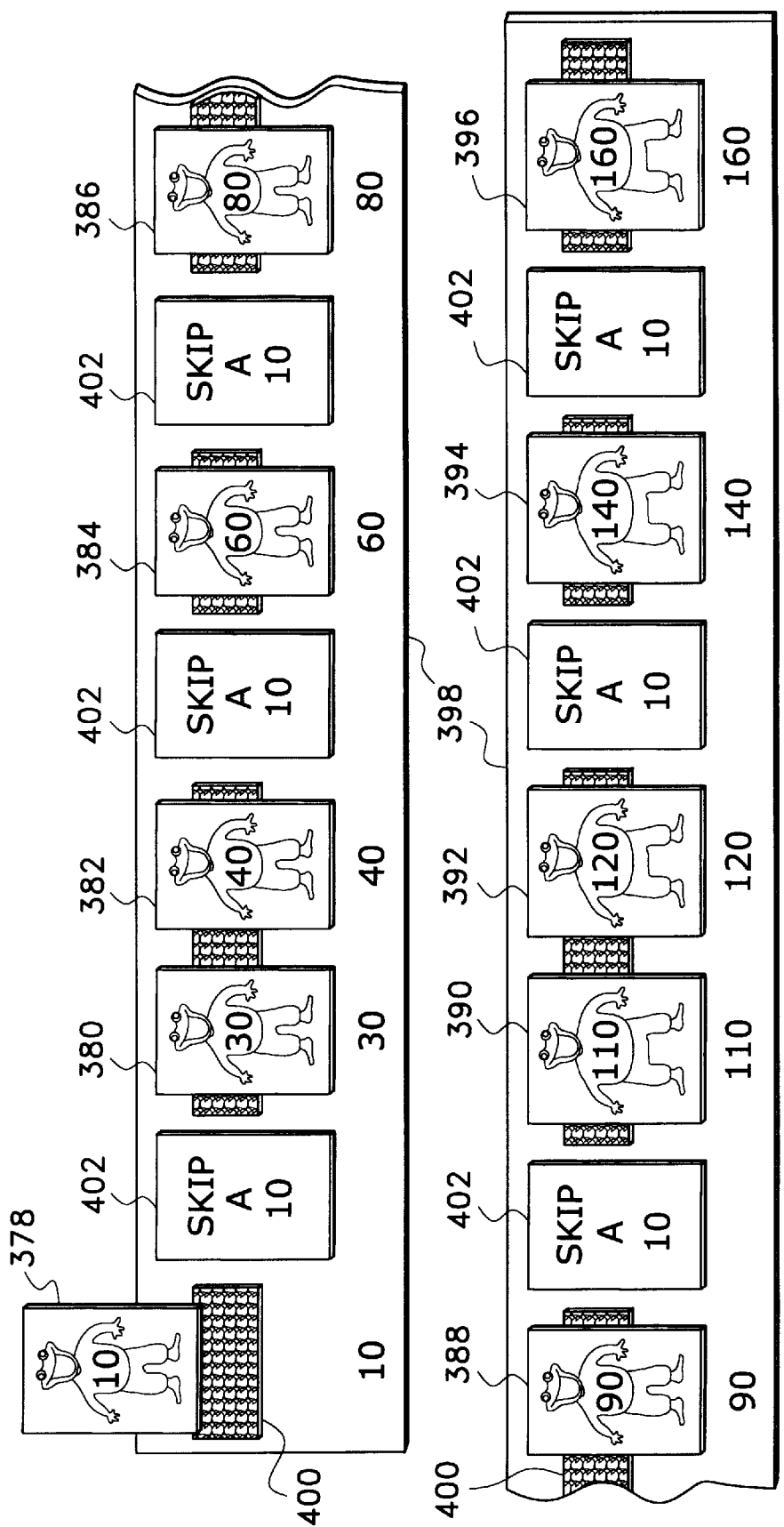
FIG. 13B is a top plan view of a board for holding two and three digit numbers for removable attachment to the FIG. 13A glove.

The "sixteen" glove 364 of the present invention is shown in FIG. 13A of the drawings, with corresponding numerical place or position holders or markers being shown in FIG. 13B. The sixteen glove 364 includes five digits, respectively referenced as digits 366 through 374, with the hand pattern being similar to that of the "six" glove 122 of FIG. 5. The index and adjacent fingers or digits 368 and 370 are folded over to position their upper or back surfaces, respectively 368a and 370a, to be visible from the palm side of the glove 364. The two gloves 122 and 364 are mirror images of one another, with the "six" glove 122 being configured for the right hand and the "sixteen" glove 364 configured for the left hand. However, it will be seen that any of the gloves or visual and tactile mathematic teaching aids of the present invention may be reversed as desired, for application to either hand as desired, as noted further above. It will be noted that the "sixteen" glove 364 includes three "skip a 10" indicators 376, in order to provide for counting by intervals of sixteen.

The numerical position markers or holders of FIG. 13B comprise a total of ten such devices, respectively indicated as holders 378 through 396. As in the other embodiments using such removably installable numerical position markers, holders, or indicators, the indicators 378 through 396 of FIG. 13B are removably secured in place on a board 398 by releasable attachment means 400 (hook and loop fastener material, etc.). A series of "skip a 10" positions 402, corresponding to the "skip a 10" indicators 376 of the glove 364, is also provided on the board 398.

Counting by intervals of sixteen is done with the "sixteens" glove 364 by adding the "tens" position holder 378 of the board 398 of FIG. 13B, to the thumb digit 366 of the glove 364 of FIG. 13A. The original six of this digit, with the ten of the position holder 378, equal a total of sixteen for this first digit 366. When sixteen is added to the original sixteen of the first digit, the resulting number (32) incorporates a three in its tens place, rather than a two. Accordingly, a "skip a 10" instruction 376 is positioned between the thumb 366 and index finger 368, instructing the student to apply the "thirty" position holder 380 to the index finger 368, providing a total of thirty two with the two originally provided on that digit 368. A corresponding first "skip a 10" position 402, between the first and second numerical position indicators 378 and 380, also serves to indicate the need to bypass the twenties digit of the number and proceed to the thirties digit.

The next number (48) does not skip a ten, as is apparent from the closely adjacent folded digits or fingers 368 and 370 and the lack of any "skip a 10" instructions between the two fingers 368 and 370 of the glove 364 and corresponding position holders 380 and 382 in FIG. 13B. However, the next number in the series (64) requires that the fifties digit be skipped, as indicated by the second "skip a 10" 1 arrow 376 pointing between the middle two fingers 370 and 372 of the glove 364, and the corresponding two place markers or holders 382 and 384 of FIG. 13B. The counting process continues by adding tens position holders according to the "skip a 10" instructions 376 of the glove and 402 of the board.

Figure 14A:
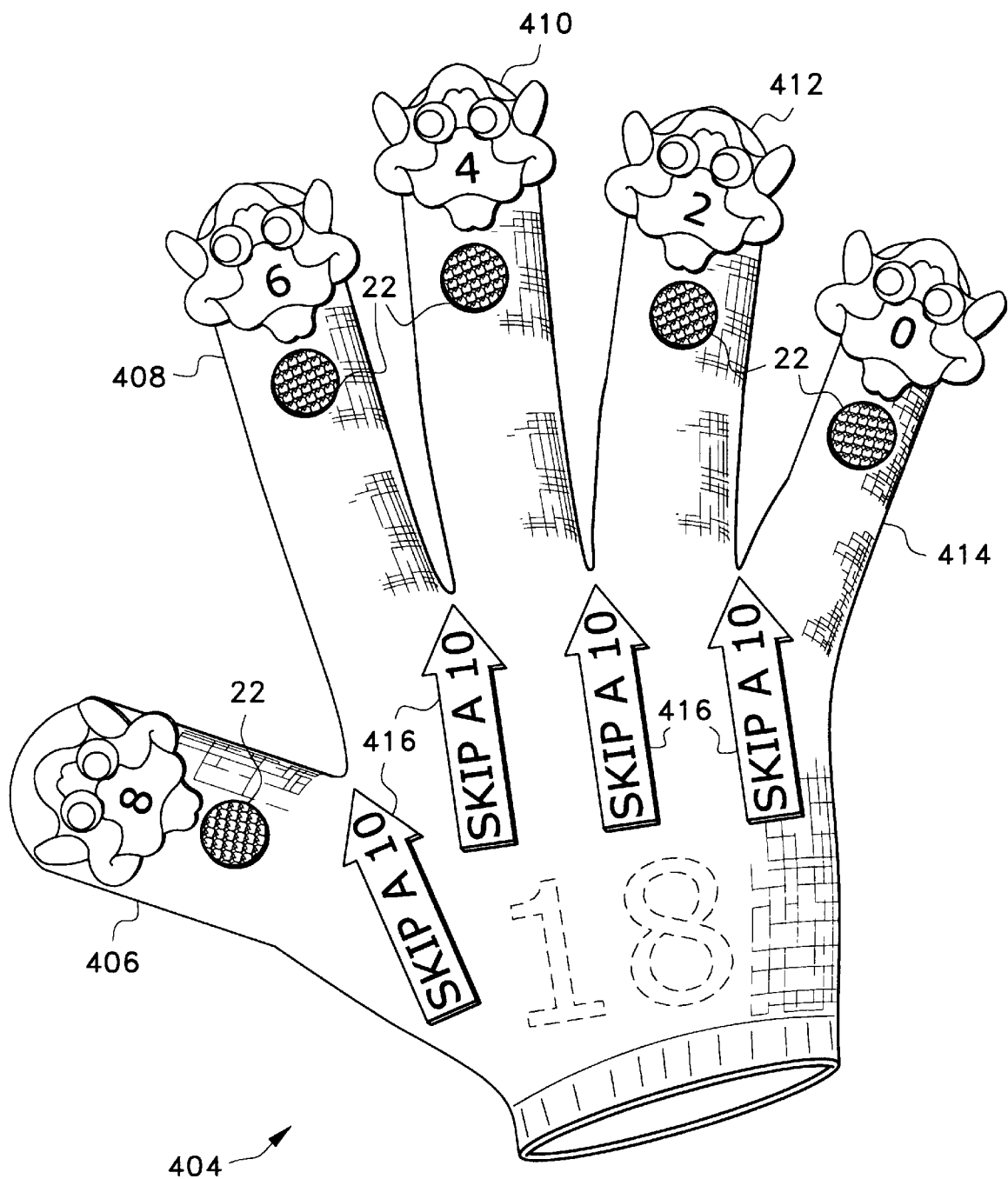
FIG. 14A is a perspective view of the palm of a left hand glove for teaching counting and numerical manipulation by a factor of eighteen.
Figure 14B:
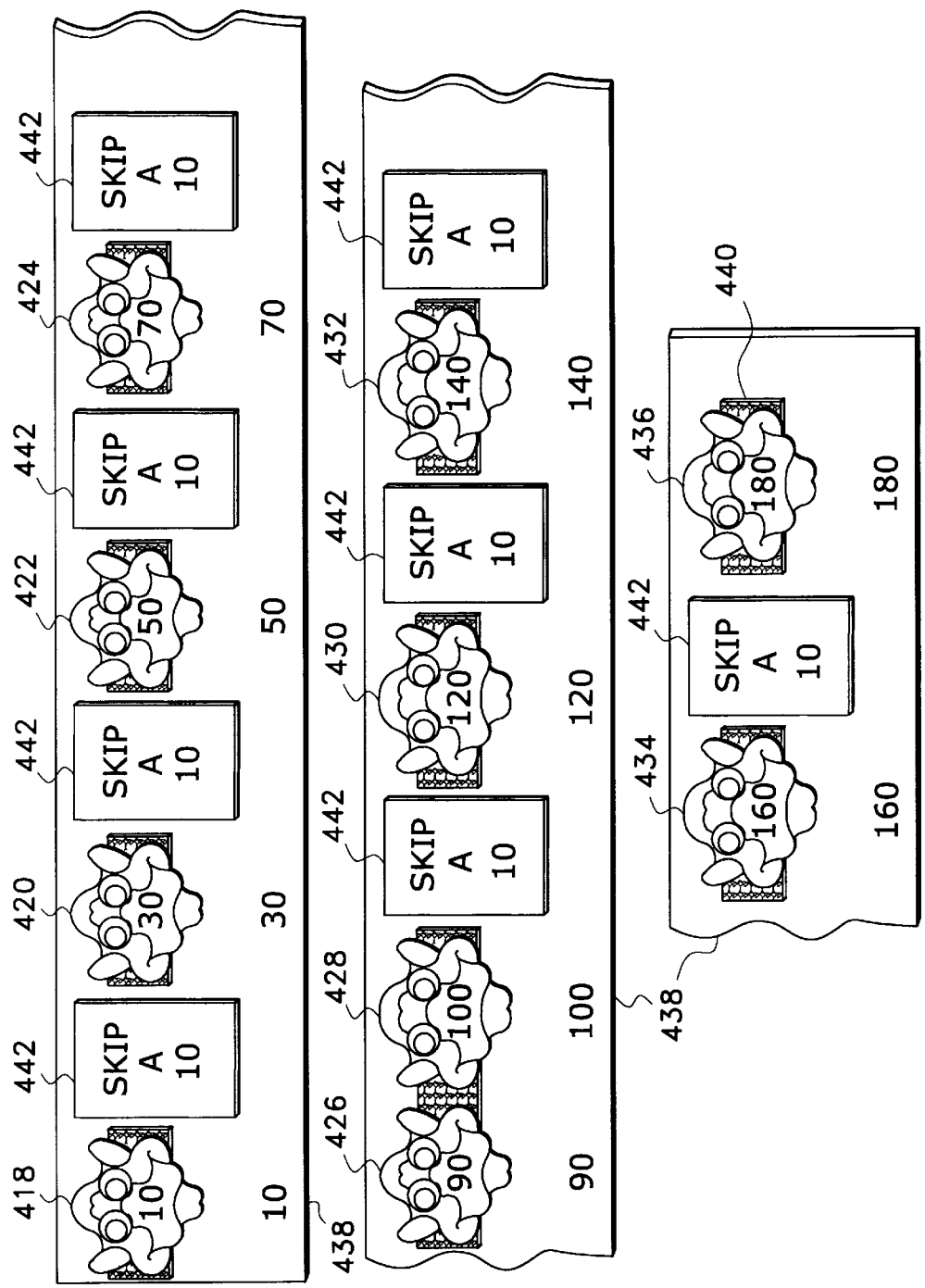
FIG. 14B is a top plan view of a board for holding two and three digit numbers for removable attachment to the FIG. 14A glove.

FIG. 14A illustrates an "eighteen" glove 404 in accordance with the present inventive system, with FIG. 14B disclosing a series of numerical place or position holders or markers for use therewith. (While no "seventeen" apparatus or method is described in the present disclosure, it will be seen that such apparatus and method may be developed in accordance with the various articles and specific methods described herein, if so desired.) The five digits of the eighteen glove 404 are indicated respectively as first through fifth digits 406 through 414. The digits 406 through 414 are numbered from eight to zero by twos, in descending order. The numbers may be accompanied by a caricature (e.g., monkey or other animal, etc.) to relate each number and the counting process to a story, as described further above. Four "skip a 10" indicators 416 are positioned between each of the five digits 406 through 414.

A series of ten numerical position holders or indicators, respectively 418 through 436, is shown in FIG. 14B. The position holders 418 through 436 are removably secured to a board 438 by some form of removable attachment means 440 (hook and loop fastening means, etc.) for removable installation thereto, and to the hook and loop material 22 or other removable attachment means of the glove 404, as in the other visual and tactile aids described herein. A series of "skip a 10" positions 442 is also provided on the board 438, with one such position 442 located between each of the numerical position indicators 418 through 436, excepting the "ninety" and "hundred" indicators 426 and 428, which are positioned adjacent one another on the board 438 in their proper positions.

Counting is accomplished with the "eighteens" glove 404, beginning with the first or thumb digit 406 and adding the first or "ten" place holder 418 thereto, which with the eight of the thumb digit 406, provides a total of eighteen for that digit 406. The next number in the series (36) contains a three for its tens place digit, so accordingly the first "skip a 10" indicator 416 is positioned between the first and second digits 406 and 408 on the glove 404, with a corresponding "skip a 10" indicator 442 being positioned between the first and second numerical position holders 418 and 420 on the board 438. Thus, the second position holder 420 has a value of thirty, which added to the six of the second digit 408, results in a total of thirty six for that digit 408.

The process continues, with each alternating tens digit being skipped, and with position holders representing only every other multiple of ten (i.e., fifty, seventy, ninety) being added to the numbers of the digits to produce multiples of eighteen. The only exception occurs following the fifth (nineties) digit 414, where the next number in the series is one hundred eight. Thus, two sequential tens position holders 426 and 428, representing the numbers ninety and one hundred, are added to successive positions, i.e., the last digit 414 and to the first digit 406 (after removing the first holder 418 from the first digit 406), to continue the series through the numbers ninety and one hundred eight. The sequence continues in the manner described above, but with the numbers each being ninety more than numbers of the corresponding digits for the first count of the digits.

Figure 15A:
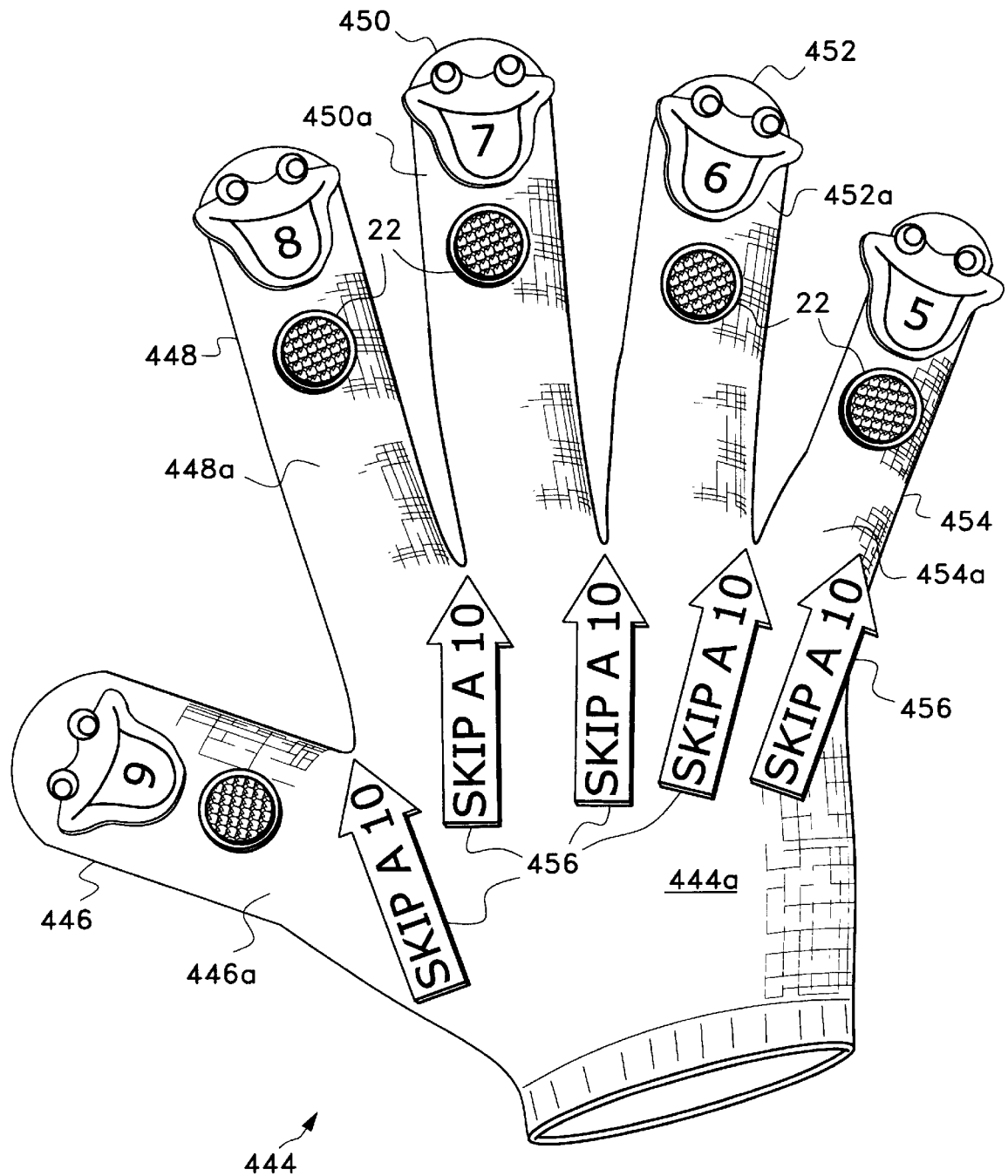
FIGS. 15A and 15B are perspective views respectively of the palm and back of a left hand glove for teaching counting and numerical manipulation by a factor of nineteen.
Figure 15B:
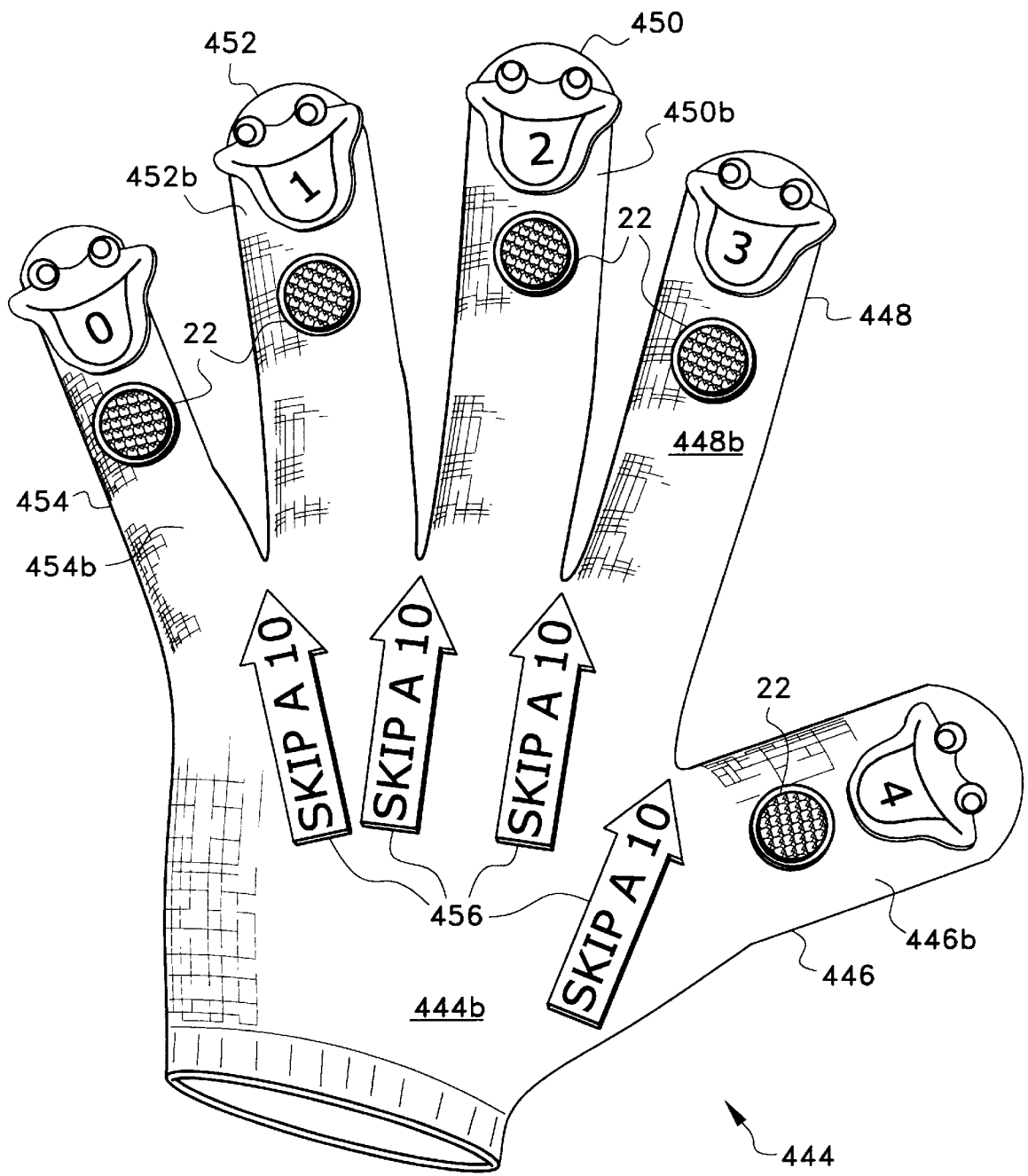

FIGS. 15A and 15B respectively illustrate the front or palm side 444a and opposite back side 444b of a "nineteens" glove 444. As in the other gloves or visual and tactile aids disclosed herein, the glove 444 includes five digits, respectively 446 through 454, from the first or thumb digit 446 through the last or little finger digit 454. These fingers or digits 446 through 454 each include a first or palm side, respectively 446a through 454a, and an opposite back side, respectively 446b through 454b. The sides of the digits 446a through 454b are numbered consecutively from nine to zero in descending order, from the front side 446a of the first digit 446 to the second side 454b of the last digit 454. This arrangement is similar to that of the "nines" glove 146, shown in FIGS. 7A and 7B of the drawings and discussed further above. However, the "nineteens" glove 444 includes a series of "skip a 10" indicators 456, with one indicator 456 positioned between each of the digits 446 through 454 and between the first side 454a of the last digit 454 and the second side 446b of the first digit 446.

Figure 15C:
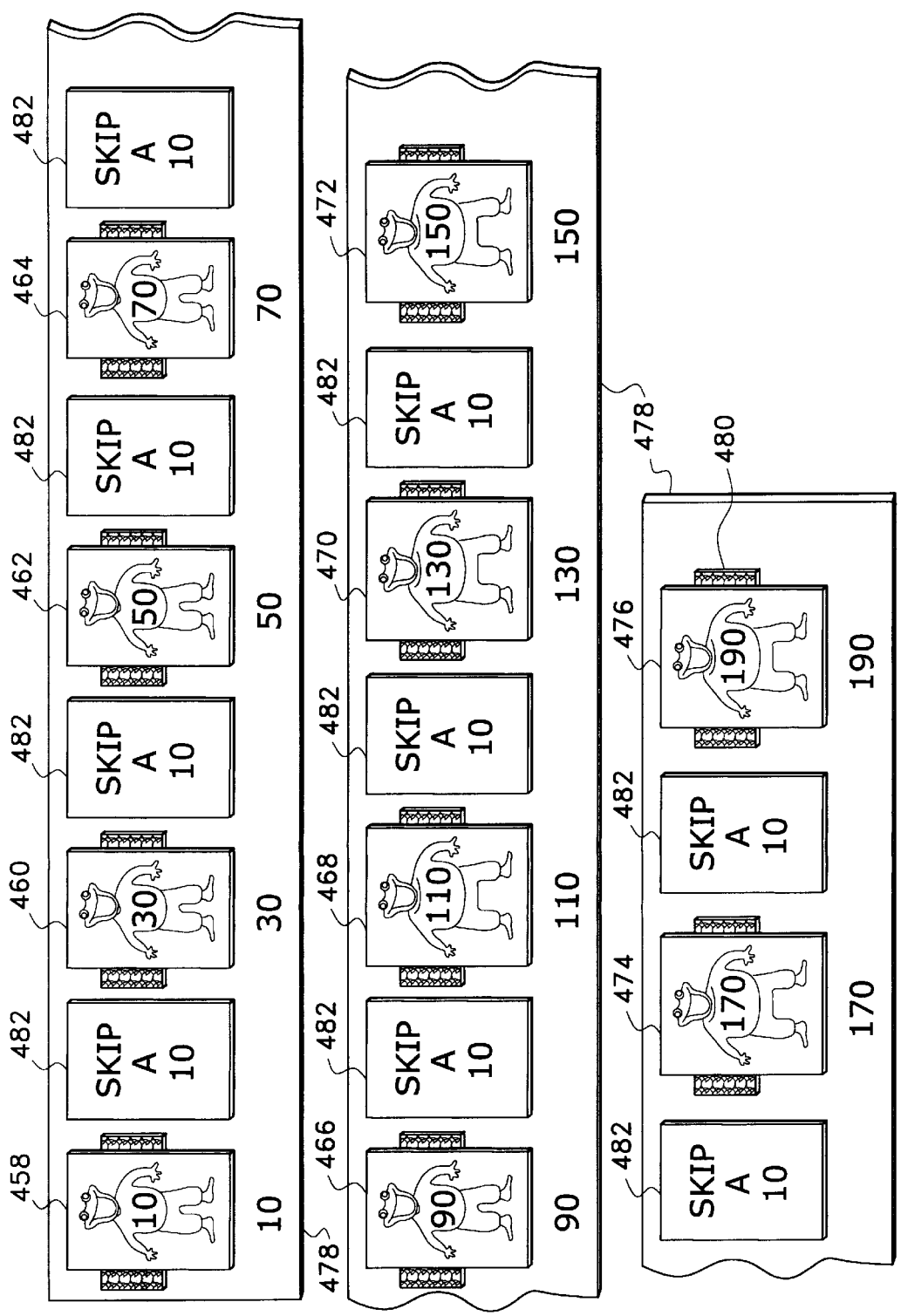
FIG. 15C is a top plan view of a board for holding two and three digit numbers for removable attachment to the glove of FIGS. 15A and 15B.

FIG. 15C shows the series of ten numerical position holders, respectively 458 through 476, for use with the "nineteens" glove 444 of FIGS. 15A and 15B. The position holders 458 through 476 are removably positioned on a board 478 by a suitable form of removable attachment means 480, as in the other position holders and boards discussed herein. A "skip a 10" marker or indicator 482 is positioned between each of the holders 458 through 476, with the holders representing numbers which are twenty apart from one another, i.e., increasing by twenty from the first to last holder.

Counting by nineteens using the glove of FIGS. 15A and 15B is accomplished in much the same manner as that used for the eighteens glove 404 of FIG. 14A, with the exception that every successive digit includes a "skip a 10" indicator 456 therebetween. Thus, The first or "ten" position holder 458 is removed from the board 478, and added to the first or "nine" digit of the first side 446a of the thumb 446 to make a total of nineteen. The "skip a 10" instruction 456 of the glove 444, and corresponding instruction 482 of the board 478, send the student to the next or "thirty" holder 460 of the board 478, which is added to the first side 448a of the next or index finger digit 448, for a total of thirty eight for the first side 448a of the index finger 448. The procedure continues in the above manner, to arrive at a sum of fifty seven for the first side 450a of the middle finger 450, seventy six for the first side 452a of the ring finger 452, and ninety five for the first side 454a of the little finger 454.

The process continues by turning the hand over to the second side 444b of the glove 444, continuing with the second side 446*b* of the thumb 446. The sixth or "110" position holder 468 is added to the four of the second side 446*b* of the thumb 446, for a total of one hundred fourteen. Proceeding in the same manner results in totals of one hundred thirty three for the second side 448*b* of the index finger 448, one hundred fifty two for the second side 450*b* of the middle finger 450, one hundred seventy one for the second side 452*b* of the ring finger 452, and one hundred ninety for the second side 454*b* of the little finger 454.

It will be seen that the above process may be continued to even higher numbers, by returning to the first side 446*a* of the thumb digit 446 and applying higher numerical position indicators (not shown) to the consecutive digits in the manner described above. Also, it will be apparent that the various mathematical operations described above with the "four" glove 64 of FIG. 3A, i.e., multiplication, division, fractions, and factoring numbers, may be accomplished using the nineteens glove 444 of FIGS. 15A and 15B, for numbers having a factor of nineteen. As a further point, it should be noted that while a twenties glove or visual and tactile aid is not shown herein, it will be apparent that such counting and other mathematical operations by twenties is relatively trivial, and the numerical position holders 458 through 476 of FIG. 15C may be used for such, if desired.

The above described counting and mathematical operation methods and processes each depend upon some form of digital (i.e., using the fingers and thumbs) visual and tactile aid (finger puppets, gloves or the like). However, it will be seen that the above methods and processes may be applied to the bare hand or hands, once the basic system or systems are committed to memory. Accordingly, FIGS. 16 through 21B illustrate various methods of counting by twelves, thirteens, fourteens, sixteens, eighteens, and nineteens, using the bare hand or hands along with the methods for counting by those numerical factors as described further above.

Figure 16:
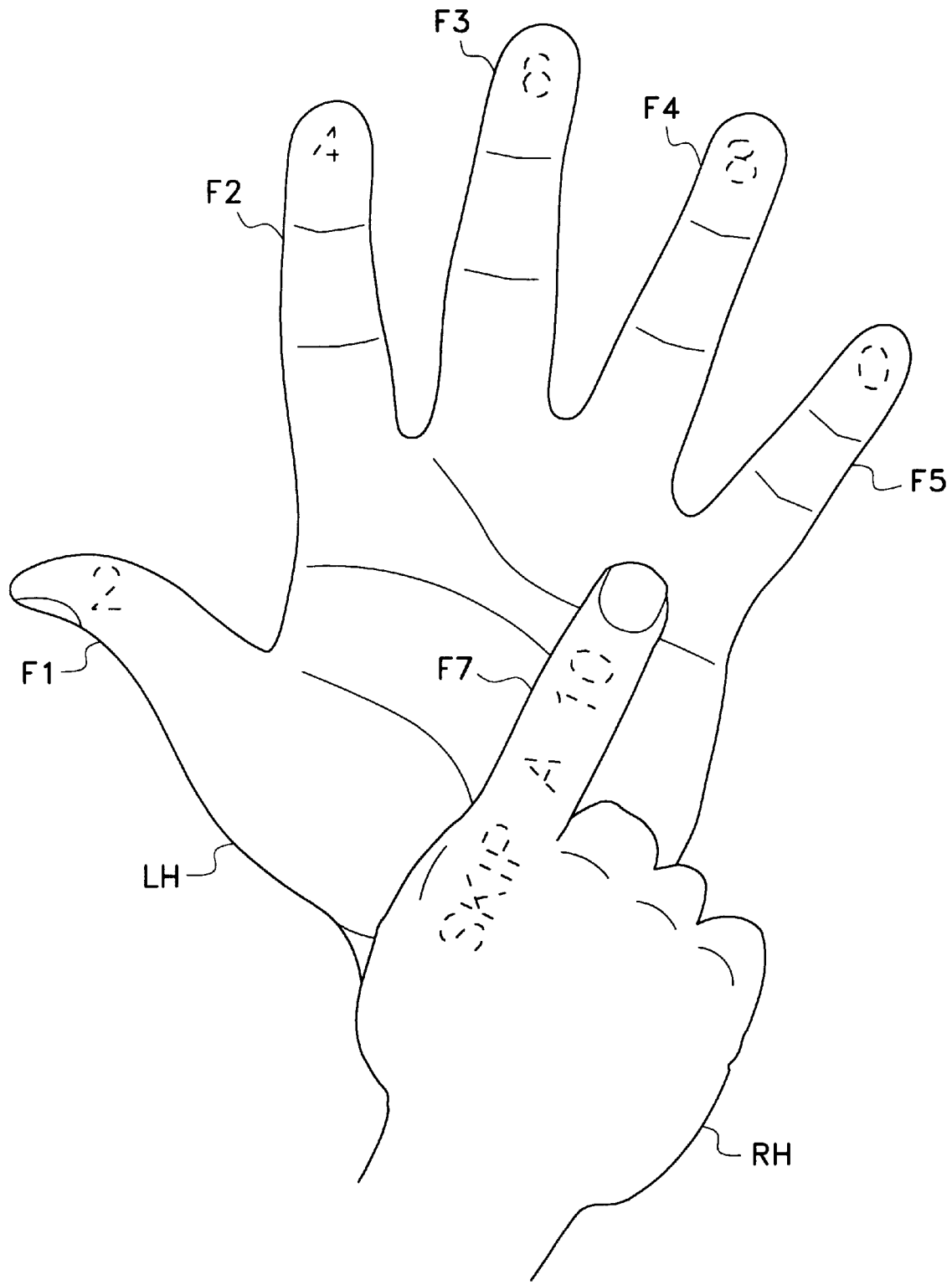
FIG. 16 is a perspective view of two hands being used to form the "twelve" pattern for numerical manipulation using twelve as the numerical factor.

FIG. 16 illustrates a hand pattern for teaching counting by twelves, using the left hand LH and its five digits comprising the thumb through the little finger, designated as first through fifth digits F1 through F5. The hand pattern used will be seen to be the same as that used for counting by twos or twelves, but no additional visual and tactile aids (finger puppets, gloves, etc.) are used, and no "skip a 10" instruction is provided, as in the "twelves" glove 204 of FIG. 9A. The numbers two, four, six, eight, and zero shown in broken lines on the five digits F1 through F5 of the left hand LH, may be envisioned by the student who has been taught and is familiar with the system.

A student using the "twelves" hand pattern of FIG. 16 begins with the thumb or first digit F1, adding ten to the two represented by that thumb or digit to equal twelve. The process continues in the same manner, with the student adding ten to each of the next three fingers or digits F2, F3, and F4, respectively representing the numbers four, six, and eight, as shown in broken lines on those fingers, to arrive at totals of twenty four, thirty six, and forty eight for those three fingers F2, F3, and F4. The student uses a finger (e.g., the index finger, designated as digit or finger F7 in the drawing FIG.s) to represent a "skip a 10" operational indicator between the fourth and fifth digits or fingers F4 and F5 of the left hand LH. This tells the student that there is no "fifties" number to be added, but that the number fifty is skipped when continuing to the fifth finger F5, and sixty is added thereto to produce the fifth number in the counting by twelves series.

It will be seen that the teaching of additional mathematical operations, i.e., multiplication, division, fractions, and factors of numbers, may also be taught by using the bare hand patterns described herein. As an example, the division of a number (e.g., eighty four) by twelve may be taught using the "twelve" hand pattern of FIG. 16. The student need only count by twelves using the hand pattern of FIG. 16, until arriving at the digit representing the number being divided (or the next closest number, in the case of a number having a remainder), i.e., the seventh digit, or the index finger F2 of the left hand LH after starting a second round of counting from the thumb F1. The total number of fingers counted, i.e., seven, is the answer to the problem. Other types of mathematical operations (fractions, factors, multiplication) may be performed using the bare hand patterns described herein as well, in a manner similar to that described further above for the mathematical operations using the "four" glove 64 of FIG. 3A.

Figure 17A:
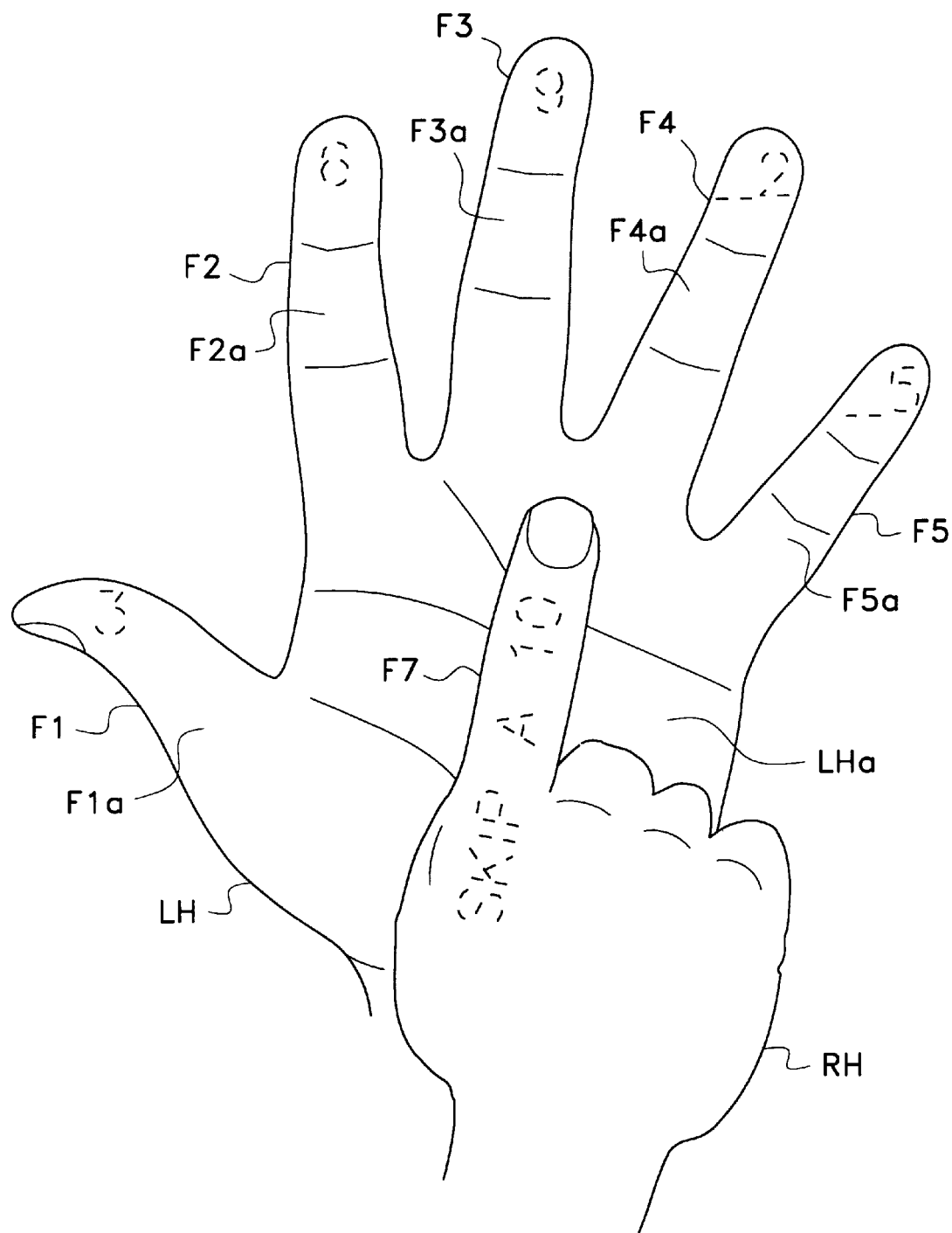
FIGS. 17A and 17B are perspective views of two hands being used to form the "thirteen" hand pattern for numerical manipulation using thirteen as the numerical factor.
Figure 17B:
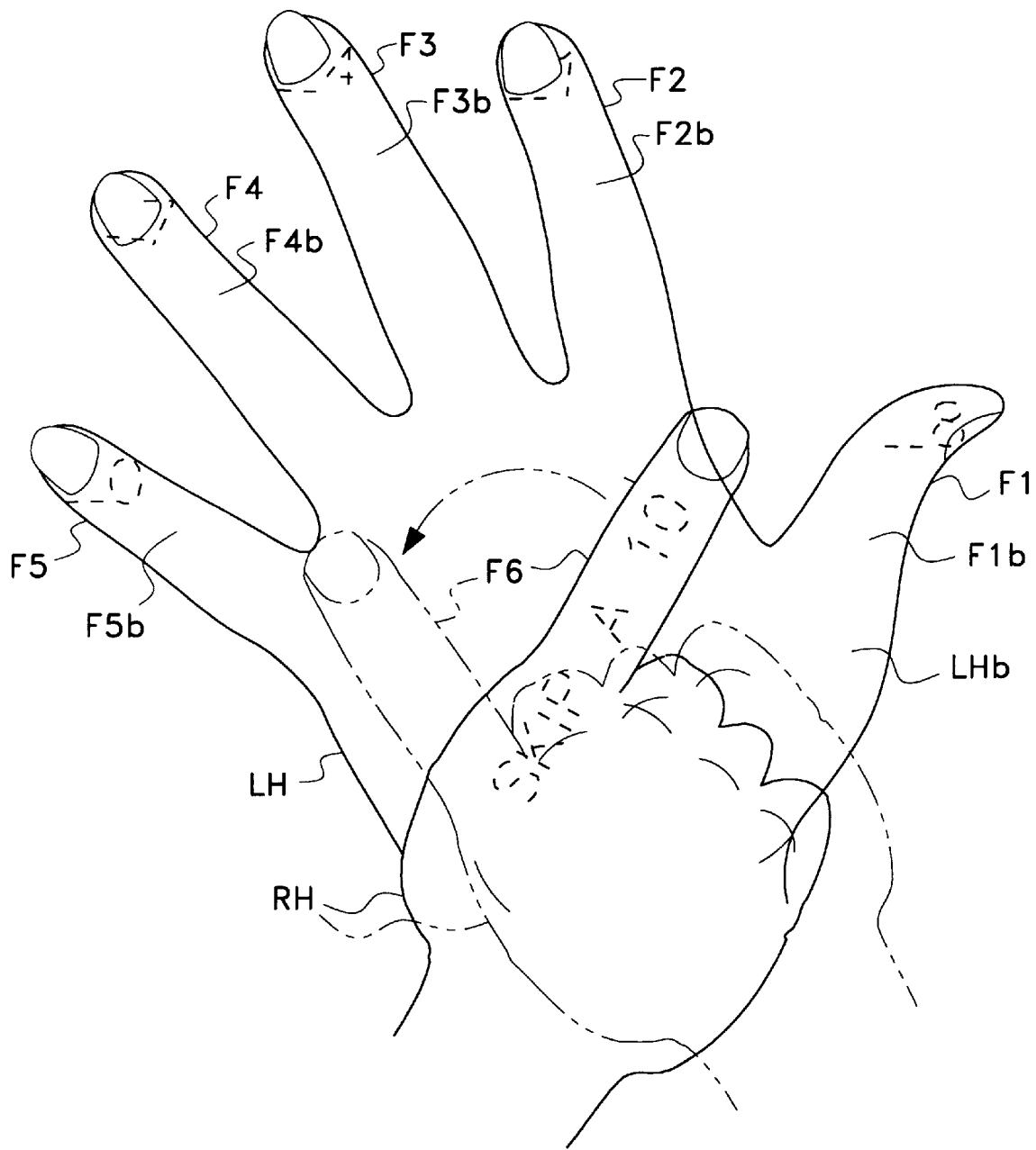

FIGS. 17A and 17B show the hand patterns used for counting by a factor of thirteen. The "thirteens" hand patterns are somewhat similar to those of the "thirteens" glove 244 of FIGS. 10*a* and 10*b*, and comprise the use of the first or palm side LHa of the left hand LH and the opposite back side LHb of the hand LH. The corresponding digits or fingers F1 through F5 each have two sides, designated as digit first or palm sides F1*a* through F5*a* for the palm side LHa of the hand, and digit second or back sides F1*b* through F5*b* for the second or back side LHb of the hand.

One of the digits, e.g., the second or index finger digit F7 the right hand RH, is used as an operations indicator to indicate the "skip a 10" operation required at various points when working with a numerical factor of thirteen in accordance with the present methods. Counting is accomplished essentially as described using the "thirteens" glove 244 of FIGS. 10A and 10B, with the student proceeding with the counting system taught using the "thirteens" glove, with the numbers of the individual digit sides F1*a* through F5*b* having been previously learned. The student begins with the first side F1*a* of the first digit (thumb) F1, adding ten to the three represented by that digit for a total of thirteen. The next two finger or digit sides F2*a* and F3*a* are used to form the numbers twenty six and thirty nine, respectively. At this point, the "skip a 10" indicator of the right index finger F7 is reached, signifying that the next "tens" position to be added to the next digit side F4*a* is fifty, rather than forty, for a total of fifty two.

The process continues with the first side F5*a* of the last digit F5 used to form sixty five, and the hand is turned over to continue the count on the back side LHb of the left hand LH, in the manner used for counting using the "thirteens" glove and described further above. The back of the thumb F1*b* represents a total of seventy eight, with the "skip a 10" right finger F7 indicating that twenty is added to the back of the index finger F2*b* for a total of ninety one. The process continues through one hundred four and one hundred seventeen, skipping a ten (as indicated by the broken line showing of the finger F7) to a final number of one hundred thirty.

Figure 18:
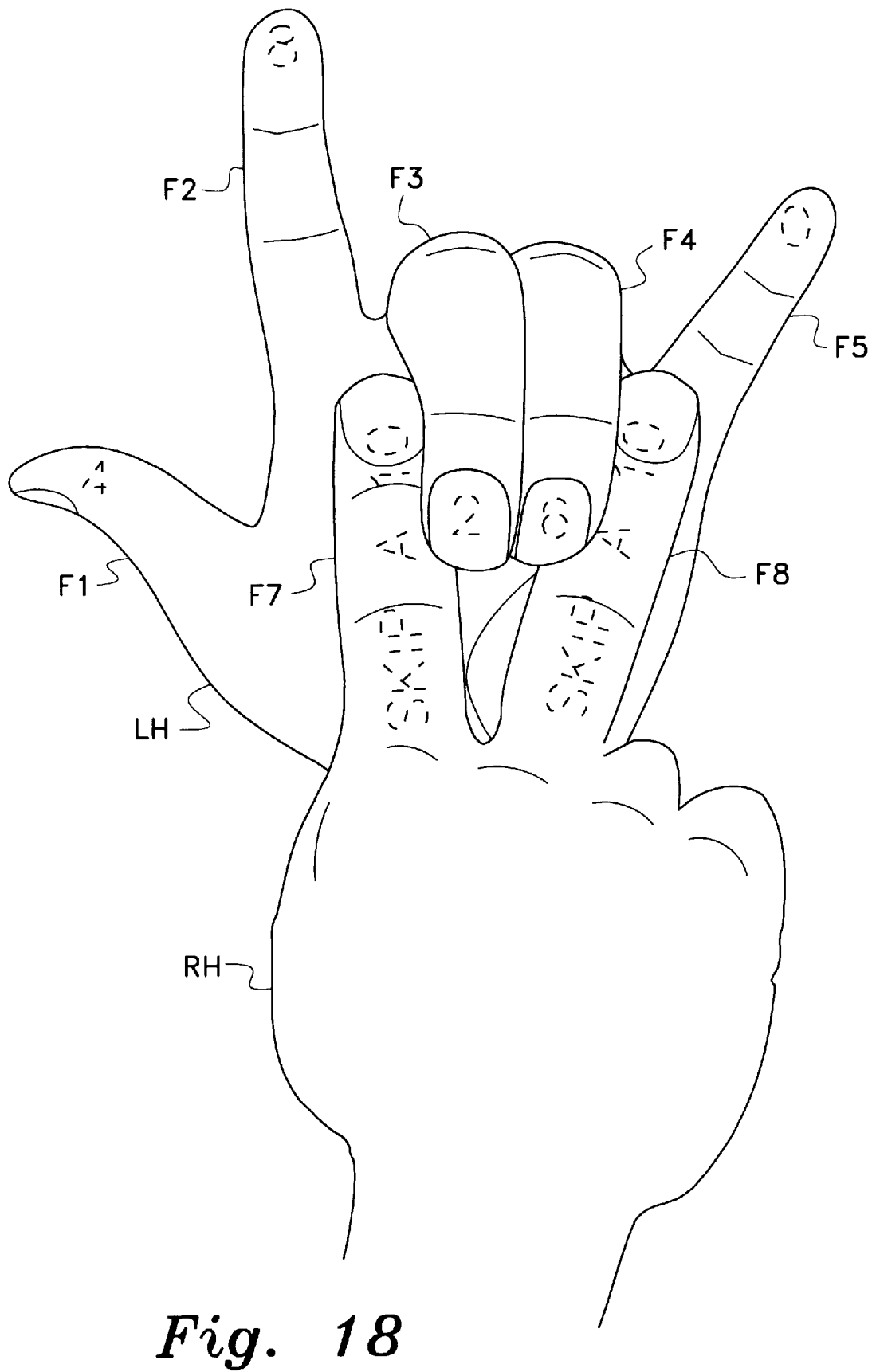
FIG. 18 is a perspective view of two hands being used to form the "fourteen" pattern for numerical manipulation using fourteen as the numerical factor.

FIG. 18 shows the bare hand pattern used for counting by a factor of fourteen. The left hand LH pattern is similar to the pattern used for teaching counting by factors of four and fourteen, discussed further above, with the right hand RH used for the "skip a 10" operational indicators required for counting by fourteens. The five digits F1 through F5 of the left hand LH represent the respective single digit numbers four, eight, two, six, and zero, shown in broken lines on the digits F1 through F5 of the left hand LH. The second (index finger) digit F7 and third (middle finger) digit F8 of right hand RH are used as the "skip a 10" indicators for the hand pattern of FIG. 18. (Other digits of the right hand may be used as desired, but these two fingers are generally the most convenient to use as a pair of extended pointing fingers.)

Counting using the hand pattern of FIG. 18 proceeds by starting with the thumb F1 of the left hand LH and adding ten thereto, for a total of fourteen for that digit F1. Another ten is added to the second digit F2 (index finger) of the left hand, for a total of twenty eight for that digit. A "skip a 10" indicator finger F7 of the right hand RH extends between the index and middle fingers F2 and F3 of the left hand, signifying that the next addition to the finger F3 will be forty, rather than thirty, for a total of forty two for the middle finger F3. The next ten in sequence (fifty) is added to the ring finger F4, totaling fifty six for that finger F4. Finally, another "skip a 10" is represented by the middle finger F8 of the right hand RH, indicating that seventy is to be added to the zero of the last finger F5 of the left hand.

Figure 19:
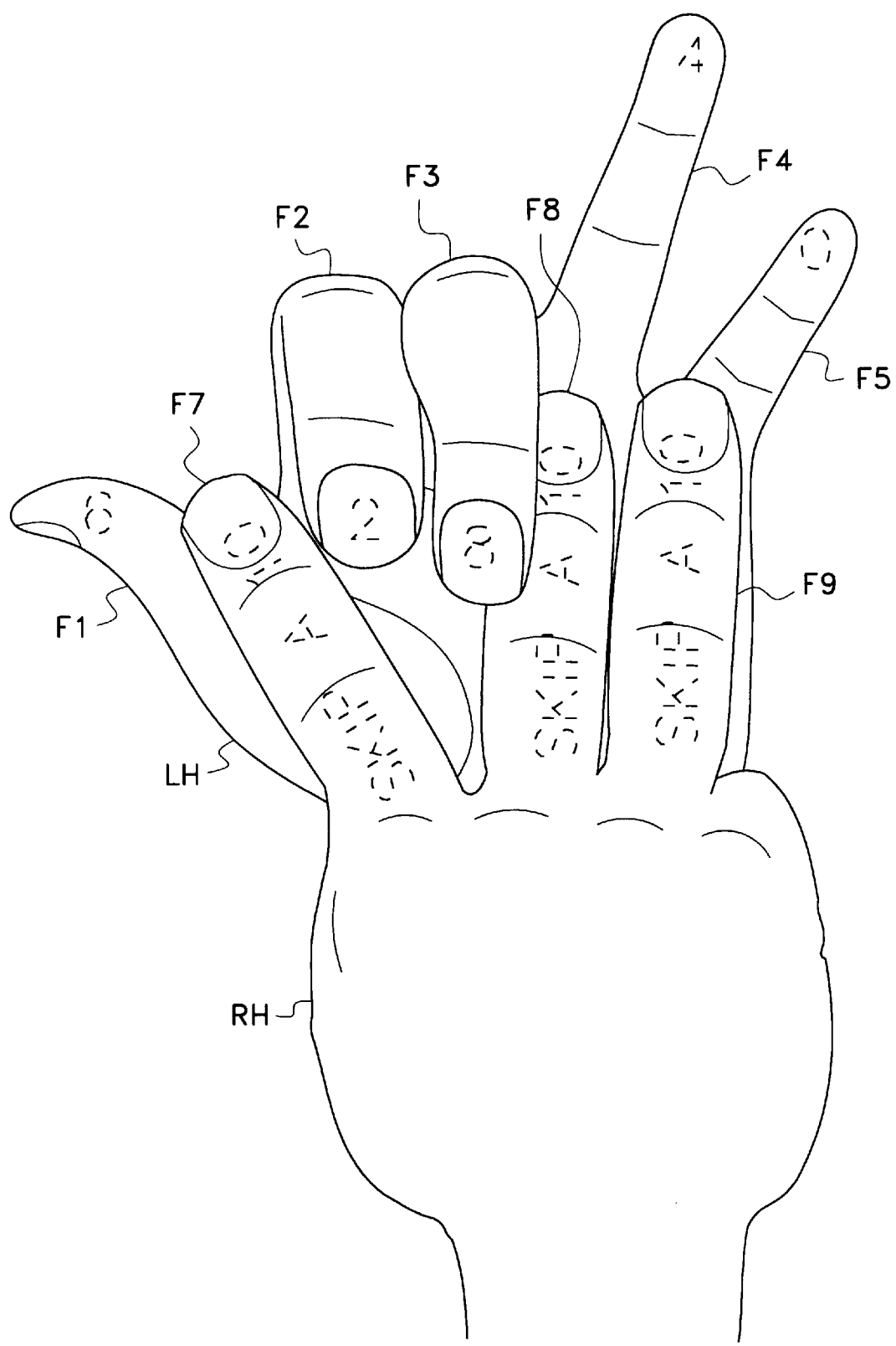
FIG. 19 is a perspective view of two hands being used to form the "sixteen" pattern for numerical manipulation using sixteen as the numerical factor.

FIG. 19 illustrates the bare hand pattern for counting by sixteens, according to the present system. The left hand LH is configured similarly to the pattern used for counting by factors of six and sixteen, respectively using the gloves 122 of FIG. 5 and 364 of FIG. 13A, with the index and middle fingers F2 and F3 folded and other digits F1, F4, and F5 extended. The only two digits between which a "skip a 10" instruction is not indicated, are the two adjacent folded digits F2 and F3. The right hand RH pattern is in accordance with this, with a first "skip a 10" indicator being provided by the second digit F7 of the right hand RH between the thumb and index finger F1 and F2 of the left hand LH, and two additional "skip a 10" operational indicators provided by the third and fourth fingers F8 and F9 of the right hand RH positioned respectively between the middle and ring fingers F3 and F4, and the ring and last fingers F4 and F5 of the left hand LH.

Counting proceeds by adding ten to the six represented by the first (thumb) digit F1 of the left hand LH to produce a count of sixteen for that digit. The right hand RH "skip a 10" finger F7 reminds the student to add thirty (rather than twenty) to the two represented by the folded index finger F2 of the left hand LH, to total thirty two for finger F2. The next number when counting by tens is forty, which is added to the eight of the left hand LH third finger F3 for a count of forty eight for finger F3. Two "skip a 10" fingers F8 and F9 of the right hand RH instruct the student to add sixty and eighty to the next two fingers F4 and F5 of the left hand LH, for totals of sixty four and eighty for those fingers.

Figure 20:
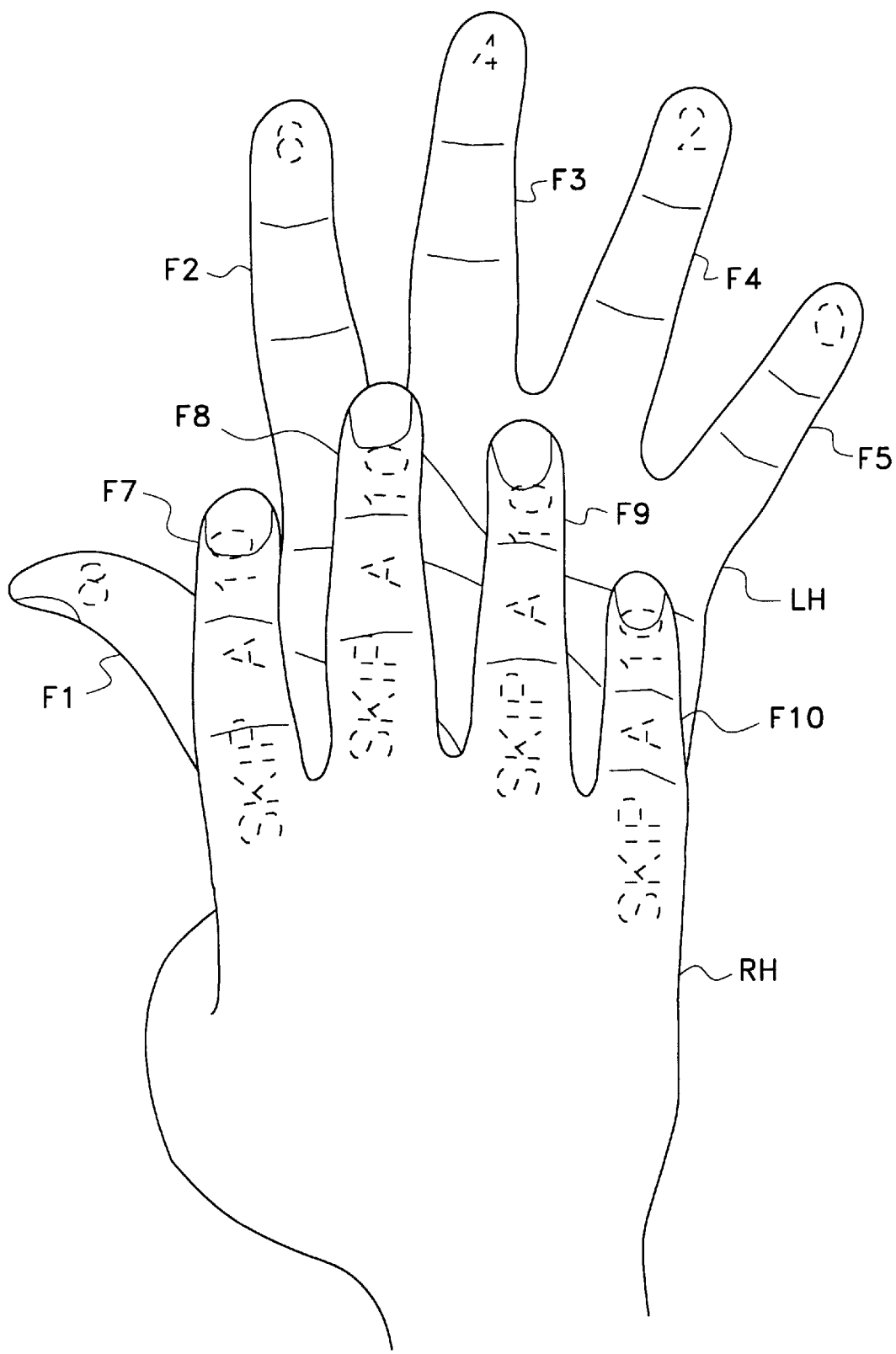
FIG. 20 is a perspective view of two hands being used to form the "eighteen" pattern for numerical manipulation using eighteen as the numerical factor.

FIG. 20 illustrates the hand pattern for counting by eighteens in accordance with the present inventive method. (As noted further above in the discussion of the gloves or other visual and tactile aids according to the present system, a method and hand pattern for counting by seventeens could be developed if desired, but is not included in the present disclosure.) As in the other bare hand patterns disclosed herein, the hand pattern of FIG. 20 is similar to the numerically corresponding "eighteens" glove 404 of FIG. 14A. The five digits F1 through F5 of the left hand LH respectively represent the single digit numbers eight, six, four, two, and zero, and the four digits F7 through F10 of the right hand RH represent the "skip a 10" operational indicators, positioned between each of the digits F1 through F5 of the left hand LH.

Counting by eighteens by using the hand pattern of FIG. 20 proceeds by adding a ten to the eight represented by the first (thumb) digit F1 of the left hand LH, for a total of eighteen. A ten is skipped between each of the digits F1 through F5 of the left hand LH, as indicated by the "skip a 10" fingers F7 through F10 positioned therebetween. The student is thus instructed to add thirty, fifty, seventy, and ninety respectively to the six, four, two, and zero respectively represented by the second through fifth digits F1 through F5. The result is a count with each number increasing by a factor of eighteen, i.e., eighteen, thirty six, fifty four, seventy two, and ninety, as in the case of the "eighteens" glove 404 of FIG. 14A.

Figure 21A:
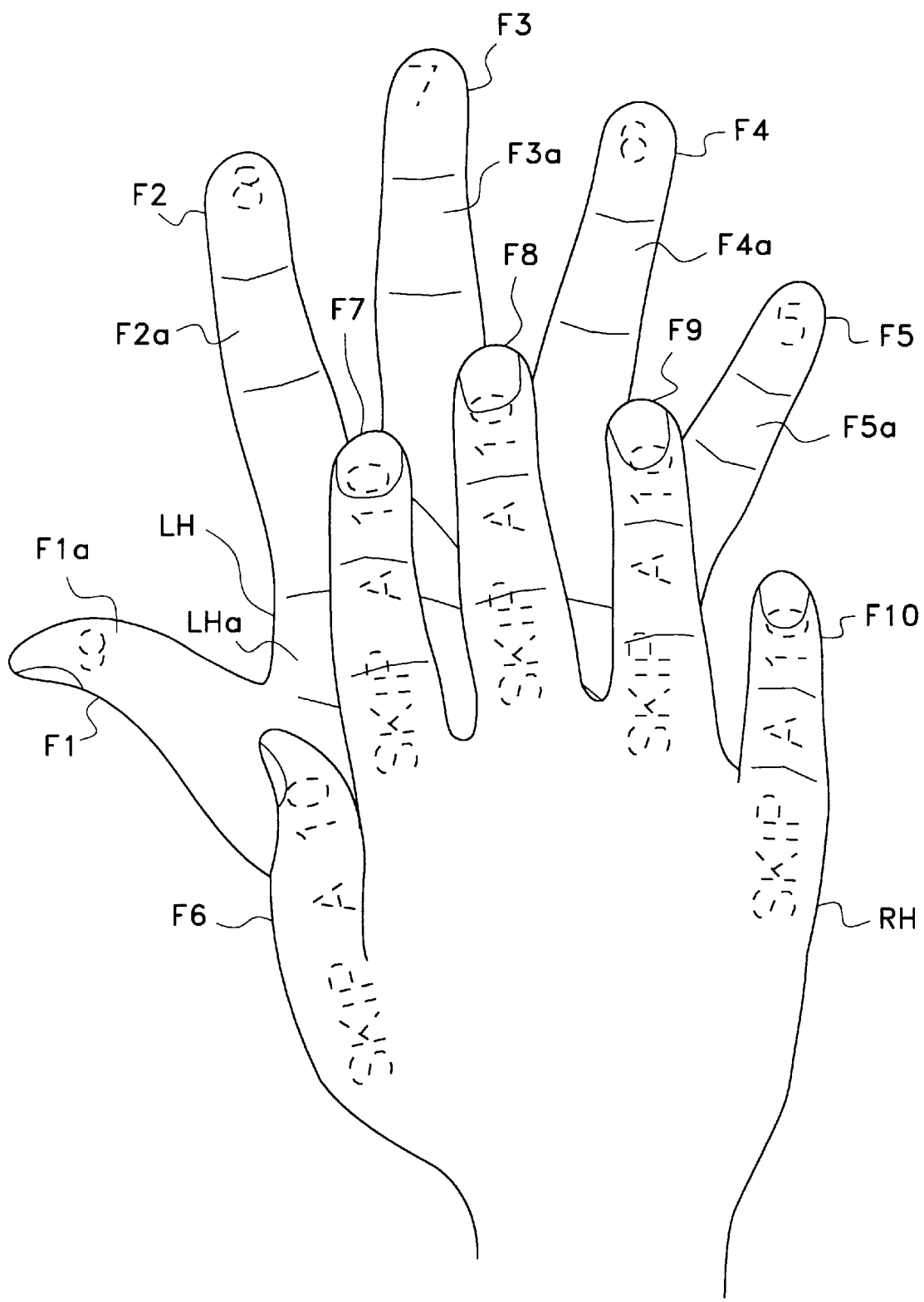
FIGS. 21A and 21B are perspective views of two hands being used to form the "nineteen" hand pattern for numerical manipulation using nineteen as the numerical factor.
Figure 21B:
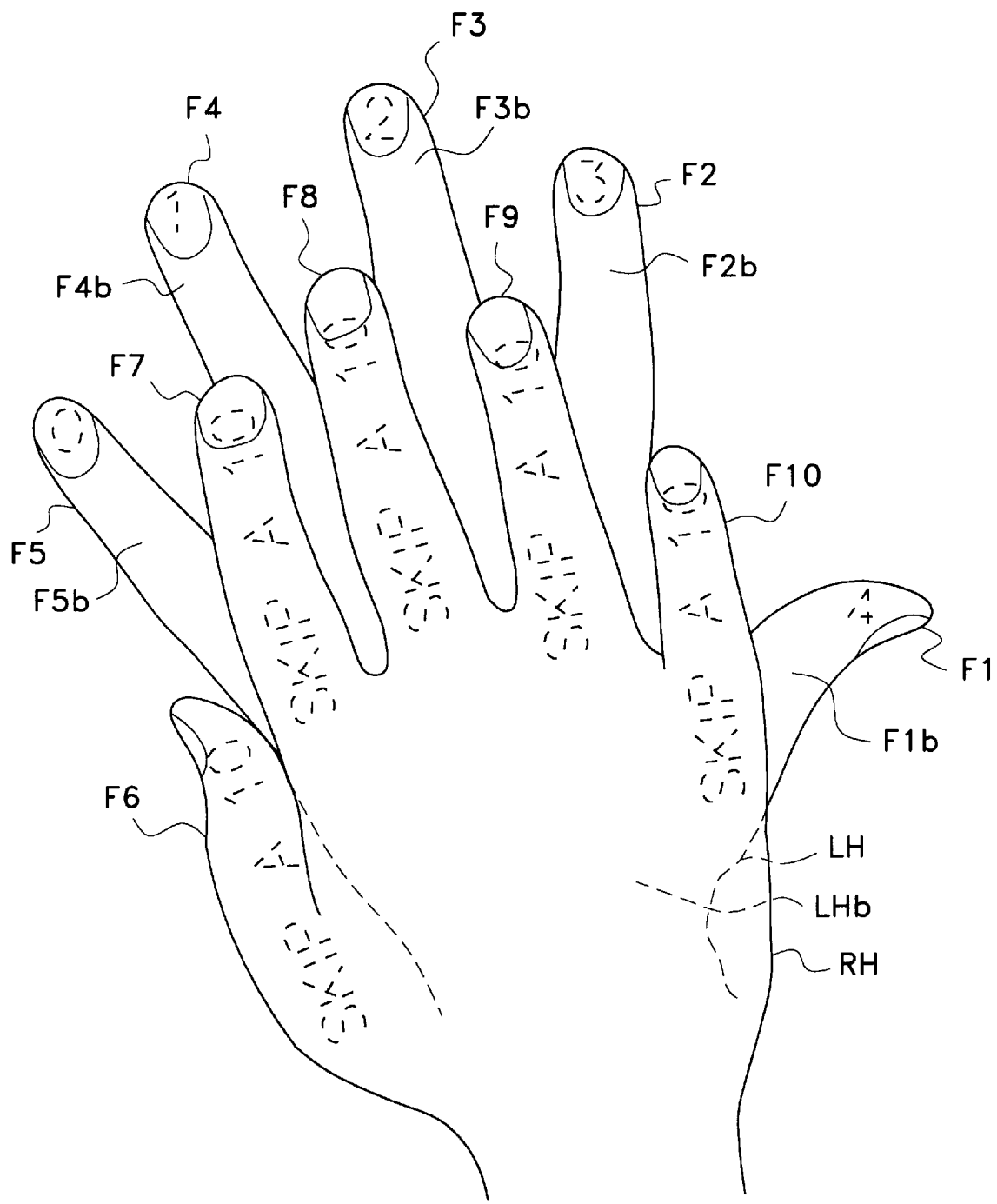

FIGS. 21A and 21B disclose the hand patterns used for counting by a factor of nineteen, in accordance with the present inventive methods and system. The front or palm side LHa of the left hand LH is shown in FIG. 21A, with the left hand LH being flipped or turned over to show the opposite back side LHb in FIG. 21B. The five digits F1 through F5 of the left hand LH respectively represent the single digit numbers nine, eight, seven, six, and five by their front sides, respectively F1a through F5a shown in FIG. 21A, and the single digit numbers four, three, two, one, and zero by their opposite back sides F1b through F5b shown in FIG. 21B. The five digits F6 through F10 of the right hand RH, representing the five "skip a 10" operational indicators of the "nineteens" counting method or system, are overlaid on the palm side LHa of the left hand LH in FIG. 21A, and on the back side LHb of the hand LH in FIG. 21B, with the result being a "skip a 10" indicator between each digit side F1a through F9b.

Counting using the "nineteens" bare hand patterns of FIGS. 21A and 21B, proceeds by adding a ten to the first side F1a of the first digit F1 of FIG. 21A, for a total of nineteen. A ten is skipped when adding ten to each of the other first or front sides F2a through F5a of the front side LHa of the left hand LH, resulting in additions of thirty to the front F2a of the second digit F2 to total thirty eight, fifty to the front F3a of the third digit F3 to total fifty seven, seventy to the front F4a of the fourth digit F4 to total seventy six, and ninety to the front F5a of fifth digit F5 to total ninety five for those respective digits.

At this point, the hand is turned over, with the "skip a 10" pattern of the five digits F6 through F10 of right hand RH being overlaid on the back LHb of the left hand LH, as shown in FIG. 21B. It will be noted that the little finger F10 of the right hand RH provided a "skip a 10" operational indicator following the little finger F5 of the left hand LH, in FIG. 21A. Accordingly, another ten is skipped as the left hand LH is turned over, with one hundred ten being added to the four represented by the second or back side F1b of the first or thumb digit F1 of the left hand LH, for a total of one hundred fourteen for that position F1b.

Tens continue to be skipped in accordance with the right hand RH "skip a 10" operational indicators provided by the digits F1, F9, F8, and F7 overlying the back side LHb of the left hand LH, with one hundred thirty, one hundred fifty, one hundred seventy, and one hundred ninety being added respectively to the single digit numbers three, two, one, and zero represented respectively by the back sides F2b through F5b of the fingers F2 through F5 of the left hand LH, to produce respective totals of one hundred thirty three, one hundred fifty two, one hundred seventy one, and one hundred ninety for those sides F2b through F5b of the digits F2 through F5 of the left hand LH. It will be seen that the above process of counting by nineteens may be continued if desired by again turning over the left hand and adding the next multiple of ten (two hundred) to the first side F1b of the thumb F1 of the left hand LH. Also, other mathematical operations as described herein may be accomplished using the nineteens hand pattern, if desired.

FIGS. 22 and 23 provide flow charts of the basic and general steps in the present methods or processes of teaching mathematics. The steps of FIG. 22 are applicable to the apparatus shown in drawing FIGS. 1 through 15C, using some form of visual and tactile aids having a series of finger and thumb digits (gloves, finger puppets, etc.) and including a series of numerical position holders as required for the specific operation. A separate set of such aids is provided to the student or students for each specific numerical factor being taught, as indicated generally in the first step 484 of FIG. 22.

A story is also provided corresponding to the specific visual aids (caricatures on the visual and tactile aids, etc.) and numerical factor being taught, as indicated in the second step 486 of FIG. 22. This provides additional auditory reinforcement of the principles being taught, in addition to the visual and tactile reinforcement provided by the visual and tactile aids of the present mathematical teaching system and methods.

Finally, the specific mathematical operation(s) are taught to the student(s), i.e., counting by some numerical factor, multiplication, division, fractions, and factoring numbers, in accordance with the present apparatus, system, and methods as indicated generally by the third step 488 of FIG. 22. It will be seen that specific details involved in these general steps 484 through 488, are disclosed further above in the disclosure of the inventive apparatus, system, and process described herein.

As noted in the description of the bare hand patterns of FIGS. 16 through 21B, the present mathematical teaching system and methods need not require any visual and tactile aids, once the student learns the hand patterns required for the various numerical factors and corresponding mathematical operations. The two steps shown generally in FIG. 23 of the drawings generally describe the process when using the bare hand patterns of FIGS. 16 through 21B.

The student is first provided with a visual and tactile hand pattern in accordance with one of the hand patterns shown in FIGS. 16 through 21B and corresponding to the mathematical operation being taught (e.g., counting by twelves, as shown in FIG. 1.6 of the drawings), as described generally in the first step 490 of the flow chart of FIG. 23. (It will be seen that other bare hand patterns than those disclosed in FIGS. 16 through 21B of the drawings may be provided, corresponding to the other visual and tactile aids shown in FIGS. 1 through 15C of the drawings.)

The specific hand pattern provided for the corresponding numerical factor is then shown and taught to the student, with the corresponding mathematical operation(s) being taught to the student by means of the specific hand pattern, as indicated generally in the second step 492 of FIG. 22. Again, other patterns than those shown in FIGS. 16 through 21B of the drawings may be provided, and additional operations (multiplication, division, fractions, and factoring numbers) may be taught using such bare hand patterns.

In summary, the present apparatus, methods, and system for teaching mathematics provides means for students to retain easily the specific mathematical steps involved in such mathematical operations. While each operation relating to each numerical factor described herein requires specific procedures, the procedures are easily remembered by students when presented with the auditory reinforcement of a story, along with the visual and tactile aids of finger puppets, gloves, etc. The present system, apparatus and methods for teaching mathematic operations serves to provide an easier means for students to retain the steps and procedures involved, with students being better able to retain the mathematical knowledge and skills gained than with traditional rote memory of such procedures.

It is to be understood that the present invention is not limited to the embodiments described above, but encompasses any and all embodiments within the scope of the following claims.

I claim:

1. A method of teaching mathematics, comprising the following steps:
   (a) defining at least one non-sequential numerical series and a numerical factor of the series, with the factor corresponding to the numerical difference between each number of the series;
   (b) providing at least one series of visual and tactile aids including a series of finger and thumb digits corresponding to the at least one non-sequential numerical series;
   (c) indicating each number of the non-sequential series on sequential ones of the visual and tactile aids;
   (d) providing a hand pattern corresponding to the non-sequential numerical series;
   (e) applying the visual and tactile aids to the hand of a student;
   (f) teaching the counting of the non-sequential series to the student using the visual and tactile aids and corresponding hand pattern; and
   (g) further teaching additional mathematical operations corresponding to the numerical factor of the non-sequential numerical series to the student using the visual and tactile aids and corresponding hand pattern.

2. The method of teaching mathematics according to claim 1, including the step of providing a plurality of finger puppets for the series of visual and tactile aids.

3. The method of teaching mathematics according to claim 1, including the step of providing at least one glove having a plurality of finger enclosures for the series of visual and tactile aids.

4. The method of teaching mathematics according to claim 1, including the step of providing a plurality of series of visual and tactile aids, with each series corresponding to a different non-sequential numerical series.

5. The method of teaching mathematics according to claim 1, including the steps of:
   (a) providing a plurality of numerical place indicators corresponding to two and three digit numbers, for removably installing on the visual and tactile aids; and
   (b) installing the place indicators on the visual and tactile aids corresponding to two and three digit numbers according to the counting and mathematical operations performed.

6. The method of teaching mathematics according to claim 1, including the step of providing a story corresponding to the at least one non-sequential numerical series being taught.

7. The method of teaching mathematics according to claim 6, including the step of providing a plurality of numbered caricatures corresponding to the story and corresponding to the at least one non-sequential numerical series.

8. The method of teaching mathematics according to claim 1, wherein the step of teaching additional mathematical operations includes the teaching of multiplication, division, fractions, and factoring using the numerical factor of the non-sequential numerical series.

9. A method of teaching mathematics, comprising the following steps:
   (a) defining at least one non-sequential numerical series and a numerical factor of the series, with the factor corresponding to the numerical difference between each number of the series;

(b) providing at least one visual and tactile hand pattern, corresponding to the non-sequential numerical series;

(c) applying the hand pattern to the first hand of a student;

(d) assigning each number of the non-sequential series to sequential fingers of the hand of the student;

(e) teaching the counting of the non-sequential series to the student using the corresponding visual and tactile hand pattern; and (f) further teaching additional mathematical operations corresponding to the numerical factor of the non-sequential numerical series to the student using the corresponding visual and tactile hand pattern.

10. The method of teaching mathematics according to claim 9, wherein the step of teaching additional mathematical operations includes the teaching of multiplication, division, fractions, and factoring using the numerical factor of the non-sequential numerical series.

11. The method of teaching mathematics according to claim 9, including the step of using the second hand of the student as an operational indicator.

12. A system for teaching mathematics, comprising:

at least one series of visual and tactile aids including a series of finger and thumb digits corresponding to at least one non-sequential numerical series having a numerical factor corresponding to the numerical difference between each number of the series, for teaching the counting of the numbers of the non-sequential series and additional mathematical operations using the numerical factor of the series; and each of said visual and tactile aids being arranged sequentially, and including a corresponding number of the non-sequential series disposed thereon.

13. The system according to claim 12, wherein said visual and tactile aids comprise a plurality of finger puppets.

14. The system according to claim 12, wherein said visual and tactile aids comprise at least one glove having a plurality of finger enclosures for the series of visual and tactile aids.

15. The system according to claim 12, including a plurality of series of visual and tactile aids with each series corresponding to a different non-sequential numerical series.

16. The system according to claim 12, including a plurality of numerical place indicators corresponding to two and three digit numbers, for removably installing on said visual and tactile aids.

17. The system according to claim 12, including a story corresponding to the at least one non-sequential numerical series being taught.

18. The system according to claim 17, including a plurality of numbered caricatures corresponding to said story and corresponding to the at least one non-sequential numerical series, and means for removably attaching said caricatures to corresponding ones of said visual and tactile aids according to the mathematical operation being taught.

19. The system according to claim 18, wherein said means for removably attaching said caricatures to corresponding ones of said visual and tactile aids comprises cooperating hook and loop fastening material.

20. The system according to claim 12, wherein at least some of said digits include markings for differentiating said at least some of said digits from others of said digits in accordance with the counting and mathematical operations conducted using the non-sequential numerical series and numerical factor corresponding to the numerical difference between each number of the series.

* * * * *